US010048424B2

(12) United States Patent
Saccomanno

(10) Patent No.: US 10,048,424 B2
(45) Date of Patent: Aug. 14, 2018

(54) SUBSTRATE WITH INDICIA CONFIGURED FOR OPTICAL COUPLING

(71) Applicant: Robert Saccomanno, Montville, NJ (US)

(72) Inventor: Robert Saccomanno, Montville, NJ (US)

(73) Assignee: Luminated Glazings, LLC, Montville, NJ (US)

( * ) Notice: Subject to any disclaimer, the term of this patent is extended or adjusted under 35 U.S.C. 154(b) by 0 days.

(21) Appl. No.: 15/159,314

(22) Filed: May 19, 2016

(65) Prior Publication Data

US 2016/0259111 A1 Sep. 8, 2016

Related U.S. Application Data

(60) Continuation of application No. 14/105,533, filed on Dec. 13, 2013, now Pat. No. 9,377,178, which is a (Continued)

(51) Int. Cl.
*G09F 13/18* (2006.01)
*F21V 8/00* (2006.01)

(Continued)

(52) U.S. Cl.
CPC .............. *G02B 6/0036* (2013.01); *F21V 3/04* (2013.01); *F21V 9/30* (2018.02); *F21V 13/04* (2013.01); *G09F 13/04* (2013.01)

(58) Field of Classification Search
CPC ...... F21V 7/0066; F21V 7/041; F21V 33/006; F21V 2200/20; F21Y 2105/00;

(Continued)

(56) References Cited

U.S. PATENT DOCUMENTS 1,816,220 A 7/1931 Hotchner
1,843,980 A 2/1932 Hotchner (Continued)

FOREIGN PATENT DOCUMENTS

CN 201326928 Y 10/2009
DE 40 39 034 6/1992

(Continued)

OTHER PUBLICATIONS

M. Nieto-Vesperinas et al., "Light Scattering from a Random Rough Interface with Total Internal Reflection," J. Opt. Soc. Am. A/vol. 9, No. 3, pp. 424-436, Mar. 1992.

(Continued)

*Primary Examiner* — Ismael Negron
(74) *Attorney, Agent, or Firm* — Neal Blibo LLC

(57) ABSTRACT

A first substrate includes indicium and a first surface configured for optically contacting a surface of a transparent substrate. When the first surface is placed in optical contact with the transparent substrate within which light is trapped by total internal reflection (TIR), light is extracted from the transparent substrate and illuminates a first indicium portion of the first substrate. The first substrate also includes a second indicium portion that is substantially not illuminated resulting from optical isolation elements within the first substrate. Both first and second indicium portions can be detected from a single point external to the first substrate and the transparent substrate.

27 Claims, 84 Drawing Sheets

Example of Various Extraction Features/Techniques
Coupling Material Between Prism and Window not Shown

Related U.S. Application Data division of application No. 13/659,357, filed on Oct. 24, 2012, now Pat. No. 8,727,581, which is a division of application No. 12/636,442, filed on Dec. 11, 2009, now Pat. No. 8,317,352.

(60) Provisional application No. 61/201,524, filed on Dec. 11, 2008.

(51) Int. Cl.

| | |
|---|---|
| ***F21V 3/04*** | (2018.01) |
| ***G09F 13/04*** | (2006.01) |
| ***F21V 13/04*** | (2006.01) |
| ***F21V 9/30*** | (2018.01) |

(58) Field of Classification Search

CPC ....... G09F 2013/049; G09F 2013/1843; G09F 2013/184; G09F 2013/1845; G09F 13/10; G09F 13/18

See application file for complete search history.

(56) References Cited

U.S. PATENT DOCUMENTS 2,215,900 A 9/1940 Bitner .......... 362/309
2,518,726 A 8/1950 Shlenker
2,594,081 A 4/1952 Shlenker .......... 41/22
2,623,313 A 12/1952 Fuchs
2,689,917 A 9/1954 Switzer
2,693,656 A 11/1954 Neugass
2,772,997 A 12/1956 Webster .......... 154/138
2,821,799 A 2/1958 Partridge
2,917,838 A 12/1959 Neugass
3,131,496 A 5/1964 Schropp
3,163,554 A 12/1964 Gessler
3,241,256 A * 3/1966 Viret .......... G01D 11/28 116/286
3,279,100 A 10/1966 Knott
3,349,511 A 10/1967 Aronoff
4,005,538 A 2/1977 Tung
4,011,665 A 3/1977 Port
4,141,058 A * 2/1979 Mizohata .......... F21S 10/005 362/328
4,385,343 A * 5/1983 Plumly .......... G02B 6/0021 362/223
4,386,476 A * 6/1983 Schulman .......... G02B 6/0086 40/361
4,545,642 A 10/1985 Auracher et al. .......... 350/96.19
4,673,609 A 6/1987 Hill .......... 428/187
4,791,745 A 12/1988 Pohn .......... 40/546
4,937,709 A 6/1990 Yanagi et al.
4,974,354 A * 12/1990 Hembrook, Jr. .......... B60Q 1/503 340/470
4,995,185 A 2/1991 Cheng
5,027,258 A 6/1991 Schöniger et al. .......... 362/31
5,126,882 A 6/1992 Oe et al. .......... 359/619
5,144,328 A 9/1992 Blake et al.
5,283,968 A * 2/1994 Williams .......... G02B 6/0043 40/546
5,319,491 A 6/1994 Selbrede
5,390,436 A * 2/1995 Ashall .......... G02B 6/0043 362/618
5,518,561 A 5/1996 Rosa
5,678,334 A * 10/1997 Schoniger .......... G02B 6/0051 40/446
5,710,645 A 1/1998 Phillips et al. .......... 359/1
5,800,909 A 9/1998 Nitta et al.
5,808,734 A 9/1998 Kolari .......... 356/237
5,867,869 A 2/1999 Garrett et al. .......... 16/252
5,901,266 A 5/1999 Whitehead
5,947,578 A * 9/1999 Ayres .......... G02B 6/0021 362/255
5,959,777 A 9/1999 Whitehead .......... 359/618
5,971,551 A 10/1999 Winston et al. .......... 359/868
5,992,068 A 11/1999 de Saro
6,004,649 A 12/1999 Nagata .......... 428/107
6,036,328 A 3/2000 Ohtsuki et al. .......... 362/31
6,093,521 A 7/2000 Laney et al.
6,107,444 A 8/2000 Bruneau et al. .......... 528/272
6,131,322 A 10/2000 Hjaltason
6,144,424 A 11/2000 Okuda et al.
6,153,995 A 11/2000 Tanaka .......... 318/483
6,171,681 B1 1/2001 Mascarenhas et al. .......... 428/141
6,212,805 B1 * 4/2001 Hill .......... B44F 1/066 40/442
6,217,186 B1 * 4/2001 Fisher .......... G02B 6/0043 362/627
6,240,664 B1 6/2001 Hjaltason
6,397,161 B1 5/2002 Tanaka et al. .......... 702/134
6,529,318 B1 3/2003 Kaneda et al. .......... 359/341.32
6,530,164 B2 3/2003 Gai
6,547,423 B2 4/2003 Marshall et al. .......... 362/333
6,565,235 B2 5/2003 Li .......... 362/304
6,571,497 B1 6/2003 Aylward et al.
6,598,987 B1 7/2003 Parikka .......... 362/26
6,598,998 B2 7/2003 West et al. .......... 362/307
6,679,621 B2 1/2004 West et al. .......... 362/327
6,694,687 B2 2/2004 Elmer .......... 52/308
6,724,508 B2 4/2004 Pierce et al. .......... 359/15
6,767,609 B2 7/2004 Aeling et al.
6,771,335 B2 8/2004 Kimura et al. .......... 349/112
6,865,325 B2 3/2005 Ide et al. .......... 385/120
6,976,915 B2 12/2005 Baker et al.
6,994,951 B1 2/2006 Chen et al. .......... 430/320
7,001,058 B2 2/2006 Inditsky .......... 362/610
7,044,626 B2 * 5/2006 Randak .......... G09F 13/04 362/353
7,090,389 B2 8/2006 Parker et al. .......... 362/627
7,160,522 B2 1/2007 Minano Dominguez et al. .......... 422/186.3
7,181,378 B2 2/2007 Benitez et al. .......... 703/2
7,188,989 B2 3/2007 Miyashita .......... 362/621
7,237,939 B2 * 7/2007 Kim .......... G02B 6/0055 362/616
7,277,609 B2 10/2007 Cassarly
7,314,301 B2 1/2008 Wu .......... 362/621
7,364,341 B2 4/2008 Parker et al. .......... 362/620
7,401,948 B2 7/2008 Chinniah et al. .......... 362/326
7,419,272 B2 9/2008 Schenke et al.
7,422,347 B2 9/2008 Miyairi et al. .......... 362/335
7,430,355 B2 9/2008 Heikenfeld et al. .......... 385/129
7,432,893 B2 10/2008 Ma et al. .......... 345/87
7,513,674 B1 4/2009 Donahue .......... 362/627
7,524,098 B2 4/2009 Vennetier et al. .......... 362/555
7,549,781 B2 6/2009 Kim et al. .......... 362/555
7,562,957 B2 7/2009 Mills et al.
7,762,704 B2 7/2010 Brychell .......... 362/615
7,918,583 B2 4/2011 Chakmakjian et al. .......... 362/240
7,959,328 B2 6/2011 Wanninger .......... 362/309
8,075,982 B2 12/2011 Donahue
8,245,424 B2 8/2012 Hill .......... 40/427
8,322,874 B2 12/2012 Ender .......... 362/97.1
8,419,232 B2 4/2013 Minano et al. .......... 362/328
8,545,037 B2 10/2013 Ender .......... 362/97.1
8,615,912 B2 12/2013 Welch et al.
9,075,179 B2 7/2015 Petcavich .......... 362/97.1
2004/0001944 A1 1/2004 Kuwahata
2004/0043221 A1 3/2004 Bharti et al. .......... 428/409
2006/0080874 A1 4/2006 Eberwein
2006/0097237 A1 5/2006 McGregor .......... 256/24
2006/0284522 A1 12/2006 Burke et al. .......... 312/116
2007/0097015 A1 5/2007 Ronkholz et al. .......... 345/1.1
2007/0124970 A1 6/2007 Hjaltason
2007/0183040 A1 8/2007 Sinyugin et al. .......... 359/515
2007/0279554 A1 12/2007 Kowarz et al. .......... 349/96
2007/0280593 A1 12/2007 Brychell et al. .......... 385/31
2008/0197002 A1 8/2008 Jeffery et al.
2008/0212328 A1 9/2008 Minano et al. .......... 362/309
2008/0239749 A1 10/2008 Saccomanno et al. .......... 362/609
2009/0162011 A1 6/2009 Coe-Sullivan et al. .......... 385/31
2009/0316385 A1 12/2009 Weber et al. .......... 362/92
2010/0214228 A1 8/2010 Sailer et al.
2014/0226361 A1 8/2014 Vasylyev .......... 362/606

(56) References Cited

U.S. PATENT DOCUMENTS

FOREIGN PATENT DOCUMENTS

| | | |
|---|---|---|
| DE | 100 26 285 | 11/2001 |
| DE | 100 64 534 | 6/2002 |
| EP | 0 452 815 | 10/1991 |
| EP | 0 997 865 | 5/2000 |
| EP | 1 094 482 | 4/2001 |
| EP | 1 293 955 | 3/2003 |
| EP | 1 361 392 | 11/2003 |
| EP | 1058227 B1 | 7/2006 |
| GB | 2165292 | 4/1986 |
| JP | 2001356724 | 12/2001 |
| JP | 2004226437 | 8/2004 |
| JP | 2008096589 | 4/2008 |
| WO | WO 2005/064321 | 7/2005 |

OTHER PUBLICATIONS

J.K. Kim et al., "Light Extraction in GaInN Light-Emitting Diodes using Diffuse Omnidirectional Reflectors," J. Electrochem. Soc., 153 (2), pp. G105-G107, 2006.

H.E. Tureci et al., "Deviation from Snell's Law for Beams Transmitted Near the Critical Angle: Application to Microcavity Lasers," Optics Letters, vol. 27, Issue 1, pp. 1-4, 2002.

M.A.C. Potenza et al., "Total Internal Reflection Scattering," App. Phys. Lett. 85, No. 14, pp. 2730-2732, Oct. 2004.

Murata et al., "Input Couplers for Thin Light-guides and Light-emitting Diodes," Opt. Eng. 47(2), pp. 027001-1-027001-7, Feb. 2008.

"Edge Lit Signs," posted on Jan. 13, 2005, URL address: http://www.signweb.com/forum/general-message-board/edge-lit-signs, downloaded May 13, 2016.

Kodak, Kodak Professional Day/Night Digital Display Material, E-4013, Nov. 1, 2003; http://wwwuk.kodak.com/global/en/professional/support/techPubs/e4013/e4013.pdf.

Kodak; Kodak Professional Endura Day/Night Display Material, E-4034; Apr. 2004; http://wwwca.kodak.com/global/en/professional/support/techPubs/e4034/e4034.pdf.

Authentic Street Signs (Via Wayback Machine); Night Lights; Oct. 13, 2006; https://web.archive.org/web/20061013104939/http://www.authenticstreetsigns.com:80/assets/dealer-resources/authentic-nightlights.pdf.

Authentic Street Signs (Via Wayback Machine); Nightlights Excel sheet; Feb. 2, 2007; https://web.archive.org/web/20070202064829/http://www.authenticstreetsigns.com:80/assets/dealer-resources/nightlights-master.pdf.

Duke University; Disclosed Manufacturers (cited Authentic Street Signs nightlights); Mar. 17, 2008; http://www.trademarklicensing.duke.edu/Disclosed%20Manufacturers.pdf.

* cited by examiner

Luxeon III side emitting LED

Luxeon III side emitting LED

Figure 12. Typical Representative Spatial Radiation Pattern for LUXEON Emitter White, Green and Blue.

Surface Profile
(See Figs. 18A-18F for curved surface x-y coordinates)

| | | |
|---|---|---|
| n1 | 1.00 | refractive index outside of light guide surface S1 |
| n2 | 1.51 | light guide refractive index |
| n3 | 1.00 | refractive index outside of light guide surfaces S2, S3, S4 |
| 41.47 | deg | Incident angle must be greater than this within light guide to ensure TIR (relative to S2 & S3 surface-normals) |

| LED exit angle relative to horizontal axis, AX4 | Incident angle at S1 relative to vertical axis, AX1 | | Incident angle at S3 relative to vertical axis, AX7 | | Incident angle at S2 relative to horizontal axis, AX2 | Exit angle at S2 (unless TIR is noted) relative to horizontal axis, AX2 | | Exit angle at S3 (unless TIR is noted) relative to vertical axis, AX7 | | Requirements to prevent leakage out of light guide for the specified angle out of the LED, ψ |
|---|---|---|---|---|---|---|---|---|---|---|
| ψ | θ1 | | θ2 | | 90−θ2 | θ3 | | θ4 | | |
| deg | rad | deg | rad | deg | deg | rad | deg | rad | deg | |
| 0 | 1.57 | 90.00 | 0.72 | 41.47 | 48.53 | ##TIR## | ##TIR## | 1.57 | 90.00 | Needs Specular Reflector on S3 |
| 10 | 1.40 | 80.00 | 0.71 | 40.71 | 49.29 | ##TIR## | ##TIR## | 1.40 | 80.00 | Needs Specular Reflector on S3 |
| 20 | 1.22 | 70.00 | 0.67 | 38.49 | 51.51 | ##TIR## | ##TIR## | 1.22 | 70.00 | Needs Specular Reflector on S3 |
| 30 | 1.05 | 60.00 | 0.61 | 35.00 | 55.00 | ##TIR## | ##TIR## | 1.05 | 60.00 | Needs Specular Reflector on S3 |
| 40 | 0.87 | 50.00 | 0.53 | 30.49 | 59.51 | ##TIR## | ##TIR## | 0.87 | 50.00 | Needs Specular Reflector on S3 |
| 50 | 0.70 | 40.00 | 0.44 | 25.19 | 64.81 | ##TIR## | ##TIR## | 0.70 | 40.00 | Needs Specular Reflector on S3 |
| 60 | 0.52 | 30.00 | 0.34 | 19.34 | 70.66 | ##TIR## | ##TIR## | 0.52 | 30.00 | Needs Specular Reflector on S3 |
| 70 | 0.35 | 20.00 | 0.23 | 13.09 | 76.91 | ##TIR## | ##TIR## | 0.35 | 20.00 | Needs Specular Reflector on S3 |
| 80 | 0.17 | 10.00 | 0.12 | 6.60 | 83.40 | ##TIR## | ##TIR## | 0.17 | 10.00 | Needs Specular Reflector on S3 |
| 90 | 0.00 | 0.00 | 0.00 | 0.00 | 90.00 | ##TIR## | ##TIR## | 0.00 | 0.00 | Needs Specular Reflector on S3 |

Fig. 6

| | | | | |
|---|---|---|---|---|
| α (prism angle) | 7.0 | deg | 0.12 | rad |
| | | | | |
| n1 | 1.00 | refractive index outside of light guide surface S1 | | |
| n2 | 1.51 | light guide refractive index | | |
| n3 | 1.00 | refractive index outside of light guide surface S2 | | |
| n4 | 1.49 | prism refractive index | | |
| n5 | 1.00 | refractive index outside of prism surface S2 | | |
| | | | | |
| 41.47 | deg | Incident angle must be greater than this within light guide to ensure TIR (relative to S2 & S3 surface-normals) | | |

| LED exit angle relative to horizontal axis, AX4 | Angle within prism relative to the surface normal of its input face, axis AX6 | | Angle within prism relative to horizontal axis, AX3 | Incident angle at S1 relative to vertical axis, AX1 | | Incident angle at S3 relative to vertical axis, AX7 | | Incident angle at S2 relative to horizontal axis, AX2 | Exit angle at S2 (unless TIR is noted) relative to horizontal axis, AX2 | | Exit angle at S3 (unless TIR is noted) relative to vertical axis, AX7 | | Requirements to prevent leakage out of light guide for the specified angle out of the LED, ψ |
|---|---|---|---|---|---|---|---|---|---|---|---|---|---|
| ψ | ω | | 90-ω-α | θ1 | | θ2 | | 90-θ2 | θ3 | | θ4 | | |
| deg | rad | deg | deg | rad | deg | rad | deg | deg | rad | deg | rad | deg | |
| 0 | 0.73 | 41.77 | 41.23 | 0.85 | 48.77 | 0.84 | 47.91 | 42.09 | ##TIR## | ##TIR## | ##TIR## | ##TIR## | |

Fig. 8A

| | | | | | | | | | | | | | |
|---|---|---|---|---|---|---|---|---|---|---|---|---|---|
| 5 | 0.72 | 41.03 | 41.97 | 0.84 | 48.03 | 0.82 | 47.19 | 42.81 | #TIR## | #TIR## | #TIR## | #TIR## | - |
| 10 | 0.70 | 39.93 | 43.07 | 0.82 | 46.93 | 0.80 | 46.12 | 43.88 | #TIR## | #TIR## | #TIR## | #TIR## | - |
| 15 | 0.67 | 38.48 | 44.52 | 0.79 | 45.48 | 0.78 | 44.72 | 45.28 | #TIR## | #TIR## | #TIR## | #TIR## | - |
| 20 | 0.64 | 36.73 | 46.27 | 0.76 | 43.73 | 0.75 | 43.00 | 47.00 | #TIR## | #TIR## | #TIR## | #TIR## | - |
| 25 | 0.61 | 34.69 | 48.31 | 0.73 | 41.69 | 0.72 | 41.02 | 48.98 | #TIR## | #TIR## | 1.44 | 82.32 | Needs Specular Reflector on S3 |
| 30 | 0.57 | 32.41 | 50.59 | 0.69 | 39.41 | 0.68 | 38.79 | 51.21 | #TIR## | #TIR## | 1.24 | 71.08 | Needs Specular Reflector on S3 |
| 35 | 0.52 | 29.92 | 53.08 | 0.64 | 36.92 | 0.63 | 36.35 | 53.65 | #TIR## | #TIR## | 1.11 | 63.51 | Needs Specular Reflector on S3 |
| 40 | 0.48 | 27.24 | 55.76 | 0.60 | 34.24 | 0.59 | 33.72 | 56.28 | #TIR## | #TIR## | 0.99 | 56.97 | Needs Specular Reflector on S3 |
| 45 | 0.43 | 24.41 | 58.59 | 0.55 | 31.41 | 0.54 | 30.94 | 59.06 | #TIR## | #TIR## | 0.89 | 50.94 | Needs Specular Reflector on S3 |
| 50 | 0.37 | 21.44 | 61.56 | 0.50 | 28.44 | 0.49 | 28.03 | 61.97 | #TIR## | #TIR## | 0.79 | 45.20 | Needs Specular Reflector on S3 |
| 55 | 0.32 | 18.37 | 64.63 | 0.44 | 25.37 | 0.44 | 25.01 | 64.99 | #TIR## | #TIR## | 0.69 | 39.67 | Needs Specular Reflector on S3 |
| 60 | 0.27 | 15.20 | 67.80 | 0.39 | 22.20 | 0.38 | 21.89 | 68.11 | #TIR## | #TIR## | 0.60 | 34.27 | Needs Specular Reflector on S3 |
| 65 | 0.21 | 11.97 | 71.03 | 0.33 | 18.97 | 0.33 | 18.71 | 71.29 | #TIR## | #TIR## | 0.51 | 28.97 | Needs Specular Reflector on S3 |
| 70 | 0.15 | 8.68 | 74.32 | 0.27 | 15.68 | 0.27 | 15.47 | 74.53 | #TIR## | #TIR## | 0.41 | 23.75 | Needs Specular Reflector on S3 |
| 75 | 0.09 | 5.36 | 77.64 | 0.22 | 12.36 | 0.21 | 12.19 | 77.81 | #TIR## | #TIR## | 0.32 | 18.60 | Needs Specular Reflector on S3 |
| 80 | 0.04 | 2.01 | 80.99 | 0.16 | 9.01 | 0.16 | 8.89 | 81.11 | #TIR## | #TIR## | 0.24 | 13.50 | Needs Specular Reflector on S3 |
| 85 | -0.02 | -1.34 | 84.34 | 0.10 | 5.66 | 0.10 | 5.58 | 84.42 | #TIR## | #TIR## | 0.15 | 8.45 | Needs Specular Reflector on S3 |
| 90 | -0.08 | -4.69 | 87.69 | 0.04 | 2.31 | 0.04 | 2.28 | 87.72 | #TIR## | #TIR## | 0.06 | 3.44 | Needs Specular Reflector on S3 |

Fig. 8B

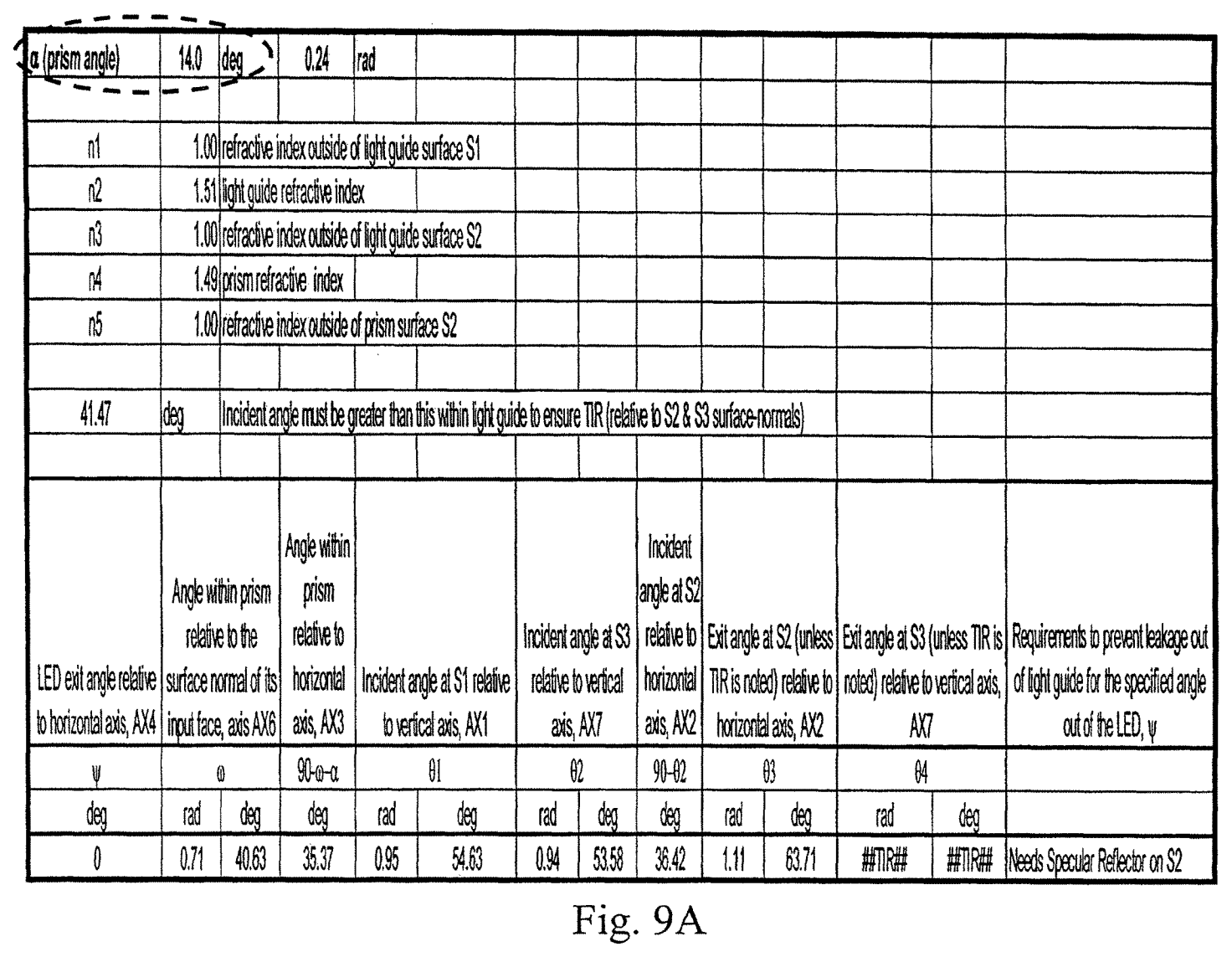

| | | | | | | | | | | | | | |
|---|---|---|---|---|---|---|---|---|---|---|---|---|---|
| α (prism angle) | 14.0 | deg | 0.24 | rad | | | | | | | | | |
| | | | | | | | | | | | | | |
| n1 | 1.00 | refractive index outside of light guide surface S1 | | | | | | | | | | | |
| n2 | 1.51 | light guide refractive index | | | | | | | | | | | |
| n3 | 1.00 | refractive index outside of light guide surface S2 | | | | | | | | | | | |
| n4 | 1.49 | prism refractive index | | | | | | | | | | | |
| n5 | 1.00 | refractive index outside of prism surface S2 | | | | | | | | | | | |
| | | | | | | | | | | | | | |
| 41.47 | deg | Incident angle must be greater than this within light guide to ensure TIR (relative to S2 & S3 surface-normals) | | | | | | | | | | | |
| | | | | | | | | | | | | | |
| LED exit angle relative to horizontal axis, AX4 | Angle within prism relative to the surface normal of its input face, axis AX6 | | Angle within prism relative to horizontal axis, AX3 | Incident angle at S1 relative to vertical axis, AX1 | | Incident angle at S3 relative to vertical axis, AX7 | | Incident angle at S2 relative to horizontal axis, AX2 | Exit angle at S2 (unless TIR is noted) relative to horizontal axis, AX2 | | Exit angle at S3 (unless TIR is noted) relative to vertical axis, AX7 | | Requirements to prevent leakage out of light guide for the specified angle out of the LED, ψ |
| ψ | ω | | 90-ω-α | θ1 | | θ2 | | 90-θ2 | θ3 | | θ4 | | |
| deg | rad | deg | deg | rad | deg | rad | deg | deg | rad | deg | rad | deg | |
| 0 | 0.71 | 40.63 | 35.37 | 0.95 | 54.63 | 0.94 | 53.58 | 36.42 | 1.11 | 63.71 | ##TIR## | ##TIR## | Needs Specular Reflector on S2 |

Fig. 9A

| | | | | | | | | | | | | | |
|---|---|---|---|---|---|---|---|---|---|---|---|---|---|
| 5 | 0.69 | 39.39 | 36.61 | 0.93 | 53.39 | 0.91 | 52.38 | 37.62 | 1.17 | 67.18 | ##TIR## | ##TIR## | Needs Specular Reflector on S2 |
| 10 | 0.66 | 37.82 | 38.18 | 0.90 | 51.82 | 0.89 | 50.86 | 39.14 | 1.26 | 72.39 | ##TIR## | ##TIR## | Needs Specular Reflector on S2 |
| 15 | 0.63 | 35.94 | 40.06 | 0.87 | 49.94 | 0.86 | 49.05 | 40.95 | 1.43 | 81.75 | ##TIR## | ##TIR## | Needs Specular Reflector on S2 |
| 20 | 0.59 | 33.81 | 42.19 | 0.83 | 47.81 | 0.82 | 46.98 | 43.02 | ##TIR## | ##TIR## | ##TIR## | ##TIR## | - |
| 25 | 0.55 | 31.44 | 44.56 | 0.79 | 45.44 | 0.78 | 44.67 | 45.33 | ##TIR## | ##TIR## | ##TIR## | ##TIR## | - |
| 30 | 0.50 | 28.87 | 47.13 | 0.75 | 42.87 | 0.74 | 42.17 | 47.83 | ##TIR## | ##TIR## | ##TIR## | ##TIR## | - |
| 35 | 0.46 | 26.12 | 49.88 | 0.70 | 40.12 | 0.69 | 39.49 | 50.51 | ##TIR## | ##TIR## | 1.29 | 73.78 | Needs Specular Reflector on S3 |
| 40 | 0.41 | 23.23 | 52.77 | 0.65 | 37.23 | 0.64 | 36.66 | 53.34 | ##TIR## | ##TIR## | 1.12 | 64.36 | Needs Specular Reflector on S3 |
| 45 | 0.35 | 20.22 | 55.78 | 0.60 | 34.22 | 0.59 | 33.71 | 56.29 | ##TIR## | ##TIR## | 0.99 | 56.93 | Needs Specular Reflector on S3 |
| 50 | 0.30 | 17.11 | 58.89 | 0.54 | 31.11 | 0.53 | 30.65 | 59.35 | ##TIR## | ##TIR## | 0.88 | 50.34 | Needs Specular Reflector on S3 |
| 55 | 0.24 | 13.92 | 62.08 | 0.49 | 27.92 | 0.48 | 27.52 | 62.48 | ##TIR## | ##TIR## | 0.77 | 44.24 | Needs Specular Reflector on S3 |
| 60 | 0.19 | 10.66 | 65.34 | 0.43 | 24.66 | 0.42 | 24.31 | 65.69 | ##TIR## | ##TIR## | 0.67 | 38.44 | Needs Specular Reflector on S3 |
| 65 | 0.13 | 7.36 | 68.64 | 0.37 | 21.36 | 0.37 | 21.06 | 68.94 | ##TIR## | ##TIR## | 0.57 | 32.86 | Needs Specular Reflector on S3 |
| 70 | 0.07 | 4.02 | 71.98 | 0.31 | 18.02 | 0.31 | 17.78 | 72.22 | ##TIR## | ##TIR## | 0.48 | 27.45 | Needs Specular Reflector on S3 |
| 75 | 0.01 | 0.67 | 75.33 | 0.26 | 14.67 | 0.25 | 14.47 | 75.53 | ##TIR## | ##TIR## | 0.39 | 22.17 | Needs Specular Reflector on S3 |
| 80 | -0.05 | -2.68 | 78.68 | 0.20 | 11.32 | 0.19 | 11.16 | 78.84 | ##TIR## | ##TIR## | 0.30 | 17.00 | Needs Specular Reflector on S3 |
| 85 | -0.11 | -6.03 | 82.03 | 0.14 | 7.97 | 0.14 | 7.87 | 82.13 | ##TIR## | ##TIR## | 0.21 | 11.93 | Needs Specular Reflector on S3 |
| 90 | -0.16 | -9.34 | 85.34 | 0.08 | 4.66 | 0.08 | 4.59 | 85.41 | ##TIR## | ##TIR## | 0.12 | 6.95 | Needs Specular Reflector on S3 |

Fig. 9B

| | | | | | | | | | | | | | |
|---|---|---|---|---|---|---|---|---|---|---|---|---|---|
| α (prism angle) | 21.0 | deg | 0.37 | rad | | | | | | | | | |
| | | | | | | | | | | | | | |
| n1 | 1.00 | refractive index outside of light guide surface S1 | | | | | | | | | | | |
| n2 | 1.51 | light guide refractive index | | | | | | | | | | | |
| n3 | 1.00 | refractive index outside of light guide surface S2 | | | | | | | | | | | |
| n4 | 1.49 | prism refractive index | | | | | | | | | | | |
| n5 | 1.00 | refractive index outside of prism surface S2 | | | | | | | | | | | |
| | | | | | | | | | | | | | |
| 41.47 | deg | Incident angle must be greater than this within light guide to ensure TIR (relative to S2 & S3 surface-normals) | | | | | | | | | | | |
| | | | | | | | | | | | | | |
| LED exit angle relative to horizontal axis, AX4 | Angle within prism relative to the surface normal of its input face, axis AX6 | | Angle within prism relative to horizontal axis, AX3 | Incident angle at S1 relative to vertical axis, AX1 | | Incident angle at S3 relative to vertical axis, AX7 | | Incident angle at S2 relative to horizontal axis, AX2 | Exit angle at S2 (unless TIR is noted) relative to horizontal axis, AX2 | | Exit angle at S3 (unless TIR is noted) relative to vertical axis, AX7 | | Requirements to prevent leakage out of light guide for the specified angle out of the LED, ψ |
| ψ | ω | | 90-ω-α | θ1 | | θ2 | | 90-θ2 | θ3 | | θ4 | | |
| deg | rad | deg | deg | rad | deg | rad | deg | deg | rad | deg | rad | deg | |
| 0 | 0.68 | 38.80 | 30.20 | 1.04 | 59.80 | 1.02 | 58.52 | 31.48 | 0.91 | 52.05 | ##TIR## | ##TIR## | Needs Specular Reflector on S2 |

Fig. 10A

| | | | | | | | | | | | | | |
|---|---|---|---|---|---|---|---|---|---|---|---|---|---|
| 5 | 0.65 | 37.10 | 31.90 | 1.01 | 58.10 | 0.99 | 56.90 | 33.10 | 0.97 | 55.55 | ##TIR## | ##TIR## | Needs Specular Reflector on S2 |
| 10 | 0.61 | 35.12 | 33.88 | 0.98 | 56.12 | 0.96 | 55.01 | 34.99 | 1.05 | 60.00 | ##TIR## | ##TIR## | Needs Specular Reflector on S2 |
| 15 | 0.57 | 32.89 | 36.11 | 0.94 | 53.89 | 0.92 | 52.86 | 37.14 | 1.15 | 65.74 | ##TIR## | ##TIR## | Needs Specular Reflector on S2 |
| 20 | 0.53 | 30.43 | 38.57 | 0.90 | 51.43 | 0.88 | 50.49 | 39.51 | 1.29 | 73.88 | ##TIR## | ##TIR## | Needs Specular Reflector on S2 |
| 25 | 0.49 | 27.79 | 41.21 | 0.85 | 48.79 | 0.84 | 47.93 | 42.07 | ##TIR## | ##TIR## | ##TIR## | ##TIR## | - |
| 30 | 0.44 | 24.98 | 44.02 | 0.80 | 45.98 | 0.79 | 45.20 | 44.80 | ##TIR## | ##TIR## | ##TIR## | ##TIR## | - |
| 35 | 0.38 | 22.04 | 46.96 | 0.75 | 43.04 | 0.74 | 42.34 | 47.66 | ##TIR## | ##TIR## | ##TIR## | ##TIR## | - |
| 40 | 0.33 | 18.99 | 50.01 | 0.70 | 39.99 | 0.69 | 39.35 | 50.65 | ##TIR## | ##TIR## | 1.28 | 73.24 | Needs Specular Reflector on S3 |
| 45 | 0.28 | 15.84 | 53.16 | 0.64 | 36.84 | 0.63 | 36.28 | 53.72 | ##TIR## | ##TIR## | 1.10 | 63.30 | Needs Specular Reflector on S3 |
| 50 | 0.22 | 12.62 | 56.38 | 0.59 | 33.62 | 0.58 | 33.12 | 56.88 | ##TIR## | ##TIR## | 0.97 | 55.59 | Needs Specular Reflector on S3 |
| 55 | 0.16 | 9.34 | 59.66 | 0.53 | 30.34 | 0.52 | 29.90 | 60.10 | ##TIR## | ##TIR## | 0.85 | 48.83 | Needs Specular Reflector on S3 |
| 60 | 0.11 | 6.03 | 62.97 | 0.47 | 27.03 | 0.46 | 26.64 | 63.36 | ##TIR## | ##TIR## | 0.74 | 42.61 | Needs Specular Reflector on S3 |
| 65 | 0.05 | 2.68 | 66.32 | 0.41 | 23.68 | 0.41 | 23.35 | 66.65 | ##TIR## | ##TIR## | 0.64 | 36.76 | Needs Specular Reflector on S3 |
| 70 | -0.01 | -0.67 | 69.67 | 0.35 | 20.33 | 0.35 | 20.05 | 69.95 | ##TIR## | ##TIR## | 0.54 | 31.17 | Needs Specular Reflector on S3 |
| 75 | -0.07 | -4.02 | 73.02 | 0.30 | 16.98 | 0.29 | 16.75 | 73.25 | ##TIR## | ##TIR## | 0.45 | 25.79 | Needs Specular Reflector on S3 |
| 80 | -0.13 | -7.36 | 76.36 | 0.24 | 13.64 | 0.23 | 13.46 | 76.54 | ##TIR## | ##TIR## | 0.36 | 20.58 | Needs Specular Reflector on S3 |
| 85 | -0.19 | -10.66 | 79.66 | 0.18 | 10.34 | 0.18 | 10.20 | 79.80 | ##TIR## | ##TIR## | 0.27 | 15.51 | Needs Specular Reflector on S3 |
| 90 | -0.24 | -13.92 | 82.92 | 0.12 | 7.08 | 0.12 | 6.99 | 83.01 | ##TIR## | ##TIR## | 0.18 | 10.59 | Needs Specular Reflector on S3 |

Fig. 10B

| | | | | | | | | | | | | | |
|---|---|---|---|---|---|---|---|---|---|---|---|---|---|
| α (prism angle) | 28.0 | deg | 0.49 | rad | | | | | | | | | |
| | | | | | | | | | | | | | |
| n1 | 1.00 | refractive index outside of light guide surface S1 | | | | | | | | | | | |
| n2 | 1.51 | light guide refractive index | | | | | | | | | | | |
| n3 | 1.00 | refractive index outside of light guide surface S2 | | | | | | | | | | | |
| n4 | 1.49 | prism refractive index | | | | | | | | | | | |
| n5 | 1.00 | refractive index outside of prism surface S2 | | | | | | | | | | | |
| | | | | | | | | | | | | | |
| 41.47 | deg | Incident angle must be greater than this within light guide to ensure TIR (relative to S2 & S3 surface-normals) | | | | | | | | | | | |
| | | | | | | | | | | | | | |
| LED exit angle relative to horizontal axis, AX4 | Angle within prism relative to the surface normal of its input face, axis AX6 | | Angle within prism relative to horizontal axis, AX3 | Incident angle at S1 relative to vertical axis, AX1 | | Incident angle at S3 relative to vertical axis, AX7 | | Incident angle at S2 relative to horizontal axis, AX2 | Exit angle at S2 (unless TIR is noted) relative to horizontal axis, AX2 | | Exit angle at S3 (unless TIR is noted) relative to vertical axis, AX7 | | Requirements to prevent leakage out of light guide for the specified angle out of the LED, ψ |
| ψ | ω | | 90-ω-α | θ1 | | θ2 | | 90-θ2 | θ3 | | θ4 | | |
| deg | rad | deg | deg | rad | deg | rad | deg | deg | rad | deg | rad | deg | |
| 0 | 0.63 | 36.34 | 25.66 | 1.12 | 64.34 | 1.10 | 62.80 | 27.20 | 0.76 | 43.64 | ##TIR## | ##TIR## | Needs Specular Reflector on S2 |

Fig. 11A

| | | | | | | | | | | | | | |
|---|---|---|---|---|---|---|---|---|---|---|---|---|---|
| 5 | 0.60 | 34.25 | 27.75 | 1.09 | 62.25 | 1.06 | 60.84 | 29.16 | 0.83 | 47.36 | ##TIR## | ##TIR## | Needs Specular Reflector on S2 |
| 10 | 0.56 | 31.93 | 30.07 | 1.05 | 59.93 | 1.02 | 58.64 | 31.36 | 0.90 | 51.79 | ##TIR## | ##TIR## | Needs Specular Reflector on S2 |
| 15 | 0.51 | 29.40 | 32.60 | 1.00 | 57.40 | 0.98 | 56.23 | 33.77 | 1.00 | 57.08 | ##TIR## | ##TIR## | Needs Specular Reflector on S2 |
| 20 | 0.47 | 26.68 | 35.32 | 0.95 | 54.68 | 0.94 | 53.63 | 36.37 | 1.11 | 63.57 | ##TIR## | ##TIR## | Needs Specular Reflector on S2 |
| 25 | 0.42 | 23.82 | 38.18 | 0.90 | 51.82 | 0.89 | 50.87 | 39.13 | 1.26 | 72.36 | ##TIR## | ##TIR## | Needs Specular Reflector on S2 |
| 30 | 0.36 | 20.83 | 41.17 | 0.85 | 48.83 | 0.84 | 47.97 | 42.03 | ##TIR## | ##TIR## | ##TIR## | ##TIR## | - |
| 35 | 0.31 | 17.74 | 44.26 | 0.80 | 45.74 | 0.78 | 44.97 | 45.03 | ##TIR## | ##TIR## | ##TIR## | ##TIR## | - |
| 40 | 0.25 | 14.56 | 47.44 | 0.74 | 42.56 | 0.73 | 41.87 | 48.13 | ##TIR## | ##TIR## | ##TIR## | ##TIR## | - |
| 45 | 0.20 | 11.32 | 50.68 | 0.69 | 39.32 | 0.68 | 38.70 | 51.30 | ##TIR## | ##TIR## | 1.23 | 70.75 | Needs Specular Reflector on S3 |
| 50 | 0.14 | 8.02 | 53.98 | 0.63 | 36.02 | 0.62 | 35.47 | 54.53 | ##TIR## | ##TIR## | 1.07 | 61.19 | Needs Specular Reflector on S3 |
| 55 | 0.08 | 4.69 | 57.31 | 0.57 | 32.69 | 0.56 | 32.21 | 57.79 | ##TIR## | ##TIR## | 0.94 | 53.59 | Needs Specular Reflector on S3 |
| 60 | 0.02 | 1.34 | 60.66 | 0.51 | 29.34 | 0.50 | 28.92 | 61.08 | ##TIR## | ##TIR## | 0.82 | 46.90 | Needs Specular Reflector on S3 |
| 65 | -0.04 | -2.01 | 64.01 | 0.45 | 25.99 | 0.45 | 25.62 | 64.38 | ##TIR## | ##TIR## | 0.71 | 40.76 | Needs Specular Reflector on S3 |
| 70 | -0.09 | -5.36 | 67.36 | 0.40 | 22.64 | 0.39 | 22.32 | 67.68 | ##TIR## | ##TIR## | 0.61 | 35.00 | Needs Specular Reflector on S3 |
| 75 | -0.15 | -8.68 | 70.68 | 0.34 | 19.32 | 0.33 | 19.05 | 70.95 | ##TIR## | ##TIR## | 0.52 | 29.53 | Needs Specular Reflector on S3 |
| 80 | -0.21 | -11.97 | 73.97 | 0.28 | 16.03 | 0.28 | 15.81 | 74.19 | ##TIR## | ##TIR## | 0.42 | 24.30 | Needs Specular Reflector on S3 |
| 85 | -0.27 | -15.20 | 77.20 | 0.22 | 12.80 | 0.22 | 12.62 | 77.38 | ##TIR## | ##TIR## | 0.34 | 19.27 | Needs Specular Reflector on S3 |
| 90 | -0.32 | -18.37 | 80.37 | 0.17 | 9.63 | 0.17 | 9.51 | 80.49 | ##TIR## | ##TIR## | 0.25 | 14.44 | Needs Specular Reflector on S3 |

Fig. 11B

Example of a Collimated Light Source (LED Shown*) and Diverter
Exemplary Rays Shown as they Propagate Down the Window
(* Could also use a laser diode)

Example of Various Extraction Features/Techniques
Coupling Material Between Prism and Window not Shown Coupling Material and TIR 1. Select the refractive index of the first material in this row. In this example, 1.49 is selected because the prism is made from acrylic.

Coupling Material Tabular Data to Determine Necessary Refractive Index for: Prism coupling into window, Window coupling into window film, Coupling between laminated windows, etc

| Incident Angle (relative to surface-normal) | | Minimum index of layer adjacent to starting material to avoid TIR at the boundary for the stated incident angle | | | | | | | | | | | | | |
|---|---|---|---|---|---|---|---|---|---|---|---|---|---|---|---|
| θ1 | | Refractive index of starting material | | | | | | | | | | | | | |
| deg | rad | 1.33 | 1.35 | 1.37 | 1.39 | 1.41 | 1.43 | 1.45 | 1.47 | 1.49 | 1.51 | 1.53 | 1.55 | 1.57 | 1.59 |
| 0 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 5 | 0.09 | 0.12 | 0.12 | 0.12 | 0.12 | 0.12 | 0.12 | 0.13 | 0.13 | 0.13 | 0.13 | 0.13 | 0.14 | 0.14 | 0.14 |
| 10 | 0.17 | 0.23 | 0.23 | 0.24 | 0.24 | 0.24 | 0.25 | 0.25 | 0.26 | 0.26 | 0.26 | 0.27 | 0.27 | 0.27 | 0.28 |
| 15 | 0.26 | 0.34 | 0.35 | 0.35 | 0.36 | 0.36 | 0.37 | 0.38 | 0.38 | 0.39 | 0.39 | 0.40 | 0.40 | 0.41 | 0.41 |
| 20 | 0.35 | 0.45 | 0.46 | 0.47 | 0.48 | 0.48 | 0.49 | 0.50 | 0.50 | 0.51 | 0.52 | 0.52 | 0.53 | 0.54 | 0.54 |
| 25 | 0.44 | 0.56 | 0.57 | 0.58 | 0.59 | 0.60 | 0.60 | 0.61 | 0.62 | 0.63 | 0.64 | 0.65 | 0.66 | 0.66 | 0.67 |
| 30 | 0.52 | 0.67 | 0.68 | 0.69 | 0.70 | 0.71 | 0.72 | 0.73 | 0.74 | 0.75 | 0.76 | 0.77 | 0.78 | 0.79 | 0.80 |
| 35 | 0.61 | 0.76 | 0.77 | 0.79 | 0.80 | 0.81 | 0.82 | 0.83 | 0.84 | 0.85 | 0.87 | 0.88 | 0.89 | 0.90 | 0.91 |
| 40 | 0.70 | 0.85 | 0.87 | 0.88 | 0.89 | 0.91 | 0.92 | 0.93 | 0.94 | 0.96 | 0.97 | 0.98 | 1.00 | 1.01 | 1.02 |
| 45 | 0.79 | 0.94 | 0.95 | 0.97 | 0.98 | 1.00 | 1.01 | 1.03 | 1.04 | 1.05 | 1.07 | 1.08 | 1.10 | 1.11 | 1.12 |

Fig. 15A-1

2. Select the incidence angle within the first material in this column. In this example, 75° is the maximum angle expected out of the prism.

4. Example of clear vinyl window film, based on the angles in Figs. 15B-1 & 15B-2

| Incident Angle (relative to surface-normal) | | Minimum index of layer adjacent to starting material to avoid TIR at the boundary for the stated incident angle | | | | | | | | | | | | | |
|---|---|---|---|---|---|---|---|---|---|---|---|---|---|---|---|
| θ1 | | Refractive index of starting material | | | | | | | | | | | | | |
| deg | rad | 1.33 | 1.35 | 1.37 | 1.39 | 1.41 | 1.43 | 1.45 | 1.47 | 1.49 | 1.51 | 1.53 | 1.55 | 1.57 | 1.59 |
| 50 | 0.87 | 1.02 | 1.03 | 1.05 | 1.06 | 1.08 | 1.10 | 1.11 | 1.13 | 1.14 | 1.16 | 1.17 | 1.19 | 1.20 | 1.22 |
| 55 | 0.96 | 1.09 | 1.11 | 1.12 | 1.14 | 1.16 | 1.17 | 1.19 | 1.20 | 1.22 | 1.24 | 1.25 | 1.27 | 1.29 | 1.30 |
| 60 | 1.05 | 1.15 | 1.17 | 1.19 | 1.20 | 1.22 | 1.24 | 1.26 | 1.27 | 1.29 | 1.31 | 1.33 | 1.34 | 1.36 | 1.38 |
| 65 | 1.13 | 1.21 | 1.22 | 1.24 | 1.26 | 1.28 | 1.30 | 1.31 | 1.33 | 1.35 | 1.37 | 1.39 | 1.40 | 1.42 | 1.44 |
| 70 | 1.22 | 1.25 | 1.27 | 1.29 | 1.31 | 1.32 | 1.34 | 1.36 | 1.38 | 1.40 | 1.42 | 1.44 | 1.46 | 1.48 | 1.49 |
| 75 | 1.31 | 1.28 | 1.30 | 1.32 | 1.34 | 1.36 | 1.38 | 1.40 | 1.42 | 1.44 | 1.46 | 1.48 | 1.50 | 1.52 | 1.54 |
| 80 | 1.40 | 1.31 | 1.33 | 1.35 | 1.37 | 1.39 | 1.41 | 1.43 | 1.45 | 1.47 | 1.49 | 1.51 | 1.53 | 1.55 | 1.57 |
| 85 | 1.48 | 1.32 | 1.34 | 1.36 | 1.38 | 1.40 | 1.42 | 1.44 | 1.46 | 1.48 | 1.50 | 1.52 | 1.54 | 1.56 | 1.58 |
| 90 | 1.57 | 1.33 | 1.35 | 1.37 | 1.39 | 1.41 | 1.43 | 1.45 | 1.47 | 1.49 | 1.51 | 1.53 | 1.55 | 1.57 | 1.59 |

3. Min. refractive index needed for the 2nd material in order to avoid TIR at the boundary between the 1st and 2nd materials. In this example, silicone (n=1.41) is not suitable, but acrylic PSA (n=1.47) or mineral oil (n=1.51) will work.

Fig. 15A-2

| | | | | | | | | | | | | | |
|---|---|---|---|---|---|---|---|---|---|---|---|---|---|
| α (prism angle) | 7.0 | deg | 0.12 | rad | | | | | | | | | |
| | | | | | | | | | | | | | |
| n1 | 1.00 | refractive index outside of light guide surface S1 | | | | | | | | | | | |
| n2 | 1.54 | light guide refractive index | | | | | | | | | | | |
| n3 | 1.00 | refractive index outside of light guide surface S2 | | | | | | | | | | | |
| n4 | 1.49 | prism refractive index | | | | | | | | | | | |
| n5 | 1.00 | refractive index outside of prism surface S2 | | | | | | | | | | | |
| | | | | | | | | | | | | | |
| 40.49 | deg | Incident angle must be greater than this within light guide to ensure TIR (relative to S2 & S3 surface-normals) | | | | | | | | | | | |
| | | | | | | | | | | | | | |

| LED exit angle relative to horizontal axis, AX4 | Angle within prism relative to the surface normal of its input face, axis AX6 | | Angle within prism relative to horizontal axis, AX3 | Incident angle at S1 relative to vertical axis, AX1 | | Incident angle at S3 relative to vertical axis, AX7 | | Incident angle at S2 relative to horizontal axis, AX2 | Exit angle at S2 (unless TIR is noted) relative to horizontal axis, AX2 | | Exit angle at S3 (unless TIR is noted) relative to vertical axis, AX7 | | Requirements to prevent leakage out of light guide for the specified angle out of the LED, ψ |
|---|---|---|---|---|---|---|---|---|---|---|---|---|---|
| ψ | ω | | 90-ω-α | θ1 | | θ2 | | 90-θ2 | θ3 | | θ4 | | |
| deg | rad | deg | deg | rad | deg | rad | deg | deg | rad | deg | rad | deg | |
| 0 | 0.73 | 41.77 | 41.23 | 0.85 | 48.77 | 0.81 | 46.69 | 43.31 | ##TIR## | ##TIR## | ##TIR## | ##TIR## | |

Fig. 15B-1

Angles in Clear Vinyl Window Film (n=1.54)

| | | | | | | | | | | | | | |
|---|---|---|---|---|---|---|---|---|---|---|---|---|---|
| 5 | 0.72 | 41.03 | 41.97 | 0.84 | 48.03 | 0.80 | 46.00 | 44.00 | ##TIR## | ##TIR## | ##TIR## | ##TIR## | - |
| 10 | 0.70 | 39.93 | 43.07 | 0.82 | 46.93 | 0.78 | 44.97 | 45.03 | ##TIR## | ##TIR## | ##TIR## | ##TIR## | - |
| 15 | 0.67 | 38.48 | 44.52 | 0.79 | 45.48 | 0.76 | 43.62 | 46.38 | ##TIR## | ##TIR## | ##TIR## | ##TIR## | - |
| 20 | 0.64 | 36.73 | 46.27 | 0.76 | 43.73 | 0.73 | 41.97 | 48.03 | ##TIR## | ##TIR## | ##TIR## | ##TIR## | - |
| 25 | 0.61 | 34.69 | 48.31 | 0.73 | 41.69 | 0.70 | 40.06 | 49.94 | ##TIR## | ##TIR## | 1.44 | 82.32 | Needs Specular Reflector on S3 |
| 30 | 0.57 | 32.41 | 50.59 | 0.69 | 39.41 | 0.66 | 37.90 | 52.10 | ##TIR## | ##TIR## | 1.24 | 71.08 | Needs Specular Reflector on S3 |
| 35 | 0.52 | 29.92 | 53.08 | 0.64 | 36.92 | 0.62 | 35.53 | 54.47 | ##TIR## | ##TIR## | 1.11 | 63.51 | Needs Specular Reflector on S3 |
| 40 | 0.48 | 27.24 | 55.76 | 0.60 | 34.24 | 0.58 | 32.98 | 57.02 | ##TIR## | ##TIR## | 0.99 | 56.97 | Needs Specular Reflector on S3 |
| 45 | 0.43 | 24.41 | 58.59 | 0.55 | 31.41 | 0.53 | 30.28 | 59.72 | ##TIR## | ##TIR## | 0.89 | 50.94 | Needs Specular Reflector on S3 |
| 50 | 0.37 | 21.44 | 61.56 | 0.50 | 28.44 | 0.48 | 27.44 | 62.56 | ##TIR## | ##TIR## | 0.79 | 45.20 | Needs Specular Reflector on S3 |
| 55 | 0.32 | 18.37 | 64.63 | 0.44 | 25.37 | 0.43 | 24.49 | 65.51 | ##TIR## | ##TIR## | 0.69 | 39.67 | Needs Specular Reflector on S3 |
| 60 | 0.27 | 15.20 | 67.80 | 0.39 | 22.20 | 0.37 | 21.45 | 68.55 | ##TIR## | ##TIR## | 0.60 | 34.27 | Needs Specular Reflector on S3 |
| 65 | 0.21 | 11.97 | 71.03 | 0.33 | 18.97 | 0.32 | 18.33 | 71.67 | ##TIR## | ##TIR## | 0.51 | 28.97 | Needs Specular Reflector on S3 |
| 70 | 0.15 | 8.68 | 74.32 | 0.27 | 15.68 | 0.26 | 15.16 | 74.84 | ##TIR## | ##TIR## | 0.41 | 23.75 | Needs Specular Reflector on S3 |
| 75 | 0.09 | 5.36 | 77.64 | 0.22 | 12.36 | 0.21 | 11.95 | 78.05 | ##TIR## | ##TIR## | 0.32 | 18.60 | Needs Specular Reflector on S3 |
| 80 | 0.04 | 2.01 | 80.99 | 0.16 | 9.01 | 0.15 | 8.72 | 81.28 | ##TIR## | ##TIR## | 0.24 | 13.50 | Needs Specular Reflector on S3 |
| 85 | -0.02 | -1.34 | 84.34 | 0.10 | 5.66 | 0.10 | 5.47 | 84.53 | ##TIR## | ##TIR## | 0.15 | 8.45 | Needs Specular Reflector on S3 |
| 90 | -0.08 | -4.69 | 87.69 | 0.04 | 2.31 | 0.04 | 2.23 | 87.77 | ##TIR## | ##TIR## | 0.06 | 3.44 | Needs Specular Reflector on S3 |

Fig. 15B-2

Angles in Clear Vinyl Window Film (n=1.54)

FRONT VIEW of a Mall Window Shown with Four LED/PRISMS Integrated in Window Clamps

CIRCULAR/TOROIDAL PRISM COUPLING

FRONT VIEW of an Array of Four Mall Windows Each with a Different Number of LEDs Energized (with direction of rays within windows shown exiting each LED/PRISM on 10° increments; no TIR shown from sides)

EDGE LIGHTING

FRONT VIEW of an Array of Four Mall Windows Each with a Different Number of LEDs Energized (direction of rays within windows shown exiting each LED on 10° increments out to ~40° - the limit for air-gapped edge lit coupling ; no reflection shown from sides)

ho 1

| ray angle | surf slope | ray angle | | surf slope | | | | | rad | |
|---|---|---|---|---|---|---|---|---|---|---|
| | | deg | rad | deg | rad | y | x | Cross check | deg | rad |
| 0 | 28.2833 | 0.00 | 0.00 | 28.2833 | 0.49 | 1 | 0 | | 20.0 | 0.35 |
| 5 | 33.86126 | 0.20 | 0.00 | 28.53586 | 0.50 | 1.001668 | 0.003067 | 28.53585564 | 20.2 | 0.35 |
| 10 | 37.90612 | 0.40 | 0.01 | 28.78596 | 0.50 | 1.003351 | 0.006131 | 28.78595624 | 20.4 | 0.36 |
| 15 | 40.7043 | 0.60 | 0.01 | 29.0336 | 0.51 | 1.005051 | 0.009193 | | 20.6 | 0.36 |
| 20 | 42.5302 | 0.80 | 0.01 | 29.2788 | 0.51 | 1.006767 | 0.012254 | | 20.8 | 0.36 |
| 20 | -83.04135 | 1.00 | 0.02 | 29.52154 | 0.52 | 1.008499 | 0.015312 | | 21.0 | 0.37 |
| 25 | -81.28361 | 1.20 | 0.02 | 29.76183 | 0.52 | 1.010246 | 0.018368 | | 21.2 | 0.37 |
| 30 | -78.5721 | 1.40 | 0.02 | 29.99967 | 0.52 | 1.01201 | 0.021423 | | 21.4 | 0.37 |
| 35 | -74.63761 | 1.60 | 0.03 | 30.23505 | 0.53 | 1.013789 | 0.024475 | | 21.6 | 0.38 |
| 40 | -69.19155 | 1.80 | 0.03 | 30.46798 | 0.53 | 1.015584 | 0.027526 | | 21.8 | 0.38 |
| 45 | -62.01889 | 2.00 | 0.03 | 30.69846 | 0.54 | 1.017394 | 0.030576 | | 22.0 | 0.38 |
| 50 | -53.17675 | 2.20 | 0.04 | 30.92648 | 0.54 | 1.01922 | 0.033624 | | 22.2 | 0.39 |
| 55 | -43.21629 | 2.40 | 0.04 | 31.15205 | 0.54 | 1.021062 | 0.03667 | 31.1520504 | 22.4 | 0.39 |
| 60 | -33.16525 | 2.60 | 0.05 | 31.37517 | 0.55 | 1.022919 | 0.039715 | | 22.6 | 0.39 |
| 60 | -86.83477 | 2.80 | 0.05 | 31.59583 | 0.55 | 1.024791 | 0.042759 | | 22.8 | 0.40 |
| 65 | -76.78535 | 3.00 | 0.05 | 31.81405 | 0.56 | 1.026678 | 0.045801 | | 23.0 | 0.40 |

Fig. 18A-1

| y | | | | | rad | | y | | | |
|---|---|---|---|---|---|---|---|---|---|---|
| deg | rad | y | x | Cross check | deg | rad | deg | rad | y | x |
| -83.04135 | -1.45 | 1.236852 | 0.309496 | | 60.0 | 1.05 | -86.83477 | -1.52 | 0.624921 | 0.570378 |
| -82.98935 | -1.45 | 1.232434 | 0.310039 | -82.98935249 | 60.2 | 1.05 | -86.43111 | -1.51 | 0.621973 | 0.570562 |
| -82.93583 | -1.45 | 1.228032 | 0.310585 | -82.93582942 | 60.4 | 1.05 | -86.02759 | -1.50 | 0.619034 | 0.570766 |
| -82.88078 | -1.45 | 1.223644 | 0.311133 | -82.88078033 | 60.6 | 1.06 | -85.62421 | -1.49 | 0.616104 | 0.57099 |
| -82.82421 | -1.45 | 1.219272 | 0.311683 | -82.82420519 | 60.8 | 1.06 | -85.22097 | -1.49 | 0.613182 | 0.571234 |
| -82.7661 | -1.44 | 1.214914 | 0.312236 | -82.76610402 | 61.0 | 1.06 | -84.81787 | -1.48 | 0.610268 | 0.571499 |
| -82.70648 | -1.44 | 1.210571 | 0.312792 | -82.70647681 | 61.2 | 1.07 | -84.41491 | -1.47 | 0.607364 | 0.571783 |
| -82.64532 | -1.44 | 1.206242 | 0.313351 | -82.64532357 | 61.4 | 1.07 | -84.01209 | -1.47 | 0.604468 | 0.572086 |
| -82.58264 | -1.44 | 1.201928 | 0.313912 | -82.58264429 | 61.6 | 1.08 | -83.60941 | -1.46 | 0.601581 | 0.57241 |
| -82.51844 | -1.44 | 1.197629 | 0.314477 | -82.51843897 | 61.8 | 1.08 | -83.20687 | -1.45 | 0.598702 | 0.572753 |
| -82.45271 | -1.44 | 1.193344 | 0.315045 | -82.45270761 | 62.0 | 1.08 | -82.80447 | -1.45 | 0.595833 | 0.573115 |
| -82.38545 | -1.44 | 1.189074 | 0.315616 | -82.38545022 | 62.2 | 1.09 | -82.40221 | -1.44 | 0.592972 | 0.573497 |
| -82.31667 | -1.44 | 1.184818 | 0.31619 | -82.31666679 | 62.4 | 1.09 | -82.0001 | -1.43 | 0.590121 | 0.573897 |
| -82.24636 | -1.44 | 1.180576 | 0.316767 | -82.24635733 | 62.6 | 1.09 | -81.59812 | -1.42 | 0.587278 | 0.574317 |
| -82.17452 | -1.43 | 1.176349 | 0.317348 | -82.17452183 | 62.8 | 1.10 | -81.19628 | -1.42 | 0.584445 | 0.574756 |
| -82.10116 | -1.43 | 1.172137 | 0.317933 | -82.10116029 | 63.0 | 1.10 | -80.79459 | -1.41 | 0.58162 | 0.575214 |

Fig. 18A-2

| | | | | | | | | | |
|---|---|---|---|---|---|---|---|---|---|
| 70 | -66.82369 | 3.20 | 0.06 | 32.02981 | 0.56 | 1.028581 | 0.048842 | 23.2 | 0.40 |
| 75 | -57.98153 | 3.40 | 0.06 | 32.24311 | 0.56 | 1.030499 | 0.051882 | 23.4 | 0.41 |
| 80 | -50.80864 | 3.60 | 0.06 | 32.45397 | 0.57 | 1.032431 | 0.054922 | 23.6 | 0.41 |
| 85 | -45.36239 | 3.80 | 0.07 | 32.66237 | 0.57 | 1.034379 | 0.05796 | 23.8 | 0.42 |
| 90 | -41.4279 | 4.00 | 0.07 | 32.86831 | 0.57 | 1.036342 | 0.060997 | 24.0 | 0.42 |
| | | 4.20 | 0.07 | 33.07181 | 0.58 | 1.038319 | 0.064034 | 24.2 | 0.42 |
| | | 4.40 | 0.08 | 33.27285 | 0.58 | 1.040311 | 0.06707 | 24.4 | 0.43 |
| | | 4.60 | 0.08 | 33.47144 | 0.58 | 1.042318 | 0.070105 | 24.6 | 0.43 |
| | | 4.80 | 0.08 | 33.66758 | 0.59 | 1.04434 | 0.07314 | 24.8 | 0.43 |
| | | 5.00 | 0.09 | 33.86126 | 0.59 | 1.046376 | 0.076175 | 25.0 | 0.44 |
| | | 5.20 | 0.09 | 34.05227 | 0.59 | 1.048427 | 0.079209 | 25.2 | 0.44 |
| | | 5.40 | 0.09 | 34.24042 | 0.60 | 1.050492 | 0.082243 | 25.4 | 0.44 |
| | | 5.60 | 0.10 | 34.42577 | 0.60 | 1.052571 | 0.085277 | 25.6 | 0.45 |
| | | 5.80 | 0.10 | 34.60838 | 0.60 | 1.054665 | 0.088311 | 25.8 | 0.45 |
| | | 6.00 | 0.10 | 34.7883 | 0.61 | 1.056773 | 0.091345 | 26.0 | 0.45 |
| | | 6.20 | 0.11 | 34.96558 | 0.61 | 1.058894 | 0.094379 | 26.2 | 0.46 |
| | | 6.40 | 0.11 | 35.14027 | 0.61 | 1.06103 | 0.097414 | 26.4 | 0.46 |
| | | 6.60 | 0.12 | 35.31244 | 0.62 | 1.06318 | 0.100449 | 26.6 | 0.46 |
| | | 6.80 | 0.12 | 35.48214 | 0.62 | 1.065344 | 0.103484 | 26.8 | 0.47 |

Fig. 18A-3

| | | | | | | | | | | |
|---|---|---|---|---|---|---|---|---|---|---|
| -82.02627 | -1.43 | 1.167938 | 0.318521 | -82.02627272 | 63.2 | 1.10 | -80.39303 | -1.40 | 0.578805 | 0.57569 |
| -81.94986 | -1.43 | 1.163754 | 0.319113 | -81.9498591 | 63.4 | 1.11 | -79.99162 | -1.40 | 0.575999 | 0.576185 |
| -81.87192 | -1.43 | 1.159584 | 0.319708 | -81.87191946 | 63.6 | 1.11 | -79.59034 | -1.39 | 0.573202 | 0.576699 |
| -81.79245 | -1.43 | 1.155429 | 0.320307 | | 63.8 | 1.11 | -79.18921 | -1.38 | 0.570414 | 0.577232 |
| -81.71146 | -1.43 | 1.151287 | 0.320911 | | 64.0 | 1.12 | -78.78821 | -1.38 | 0.567635 | 0.577782 |
| -81.62894 | -1.42 | 1.147159 | 0.321518 | | 64.2 | 1.12 | -78.38736 | -1.37 | 0.564866 | 0.578352 |
| -81.5449 | -1.42 | 1.143046 | 0.32213 | | 64.4 | 1.12 | -77.98665 | -1.36 | 0.562105 | 0.578939 |
| -81.45933 | -1.42 | 1.138947 | 0.322745 | | 64.6 | 1.13 | -77.58607 | -1.35 | 0.559355 | 0.579544 |
| -81.37223 | -1.42 | 1.134861 | 0.323365 | | 64.8 | 1.13 | -77.18564 | -1.35 | 0.556613 | 0.580168 |
| -81.28361 | -1.42 | 1.13079 | 0.323989 | | 65.0 | 1.13 | -76.78535 | -1.34 | 0.553881 | 0.58081 |
| -81.19367 | -1.42 | 1.126732 | 0.324618 | | 65.2 | 1.14 | -76.38441 | -1.33 | 0.551158 | 0.581469 |
| -81.10258 | -1.42 | 1.122688 | 0.325251 | | 65.4 | 1.14 | -75.98215 | -1.33 | 0.548445 | 0.582147 |
| -81.0103 | -1.41 | 1.118658 | 0.325889 | | 65.6 | 1.14 | -75.57878 | -1.32 | 0.545741 | 0.582842 |
| -80.91676 | -1.41 | 1.114642 | 0.326531 | | 65.8 | 1.15 | -75.17449 | -1.31 | 0.543047 | 0.583555 |
| -80.82192 | -1.41 | 1.11064 | 0.327177 | | 66.0 | 1.15 | -74.76949 | -1.30 | 0.540362 | 0.584286 |
| -80.72573 | -1.41 | 1.106651 | 0.327829 | | 66.2 | 1.16 | -74.36397 | -1.30 | 0.537687 | 0.585035 |
| -80.62813 | -1.41 | 1.102676 | 0.328485 | | 66.4 | 1.16 | -73.95812 | -1.29 | 0.535021 | 0.585801 |
| -80.52907 | -1.41 | 1.098714 | 0.329146 | | 66.6 | 1.16 | -73.55215 | -1.28 | 0.532365 | 0.586585 |
| -80.42851 | -1.40 | 1.094766 | 0.329811 | | 66.8 | 1.17 | -73.14625 | -1.28 | 0.529719 | 0.587387 |

Fig. 18A-4

| ray angle surf slope | ray angle | | surf slope | | | | | rad | |
|---|---|---|---|---|---|---|---|---|---|
| | deg | rad | deg | rad | y | x | Cross check | deg | rad |
| | 7.00 | 0.12 | 35.64943 | 0.62 | 1.067522 | 0.10652 | | 27.0 | 0.47 |
| | 7.20 | 0.13 | 35.81435 | 0.63 | 1.069713 | 0.109557 | | 27.2 | 0.47 |
| | 7.40 | 0.13 | 35.97697 | 0.63 | 1.071918 | 0.112595 | | 27.4 | 0.48 |
| | 7.60 | 0.13 | 36.13733 | 0.63 | 1.074137 | 0.115633 | | 27.6 | 0.48 |
| | 7.80 | 0.14 | 36.2955 | 0.63 | 1.076369 | 0.118673 | | 27.8 | 0.49 |
| | 8.00 | 0.14 | 36.45153 | 0.64 | 1.078615 | 0.121713 | | 28.0 | 0.49 |
| | 8.20 | 0.14 | 36.60547 | 0.64 | 1.080874 | 0.124755 | | 28.2 | 0.49 |
| | 8.40 | 0.15 | 36.75738 | 0.64 | 1.083147 | 0.127798 | | 28.4 | 0.50 |
| | 8.60 | 0.15 | 36.90731 | 0.64 | 1.085433 | 0.130842 | | 28.6 | 0.50 |
| | 8.80 | 0.15 | 37.05532 | 0.65 | 1.087733 | 0.133887 | | 28.8 | 0.50 |
| | 9.00 | 0.16 | 37.20147 | 0.65 | 1.090046 | 0.136935 | | 29.0 | 0.51 |
| | 9.20 | 0.16 | 37.3458 | 0.65 | 1.092372 | 0.139983 | | 29.2 | 0.51 |
| | 9.40 | 0.16 | 37.48838 | 0.65 | 1.094712 | 0.143034 | | 29.4 | 0.51 |
| | 9.60 | 0.17 | 37.62926 | 0.66 | 1.097065 | 0.146086 | | 29.6 | 0.52 |
| | 9.80 | 0.17 | 37.76849 | 0.66 | 1.099431 | 0.14914 | | 29.8 | 0.52 |
| | 10.00 | 0.17 | 37.90612 | 0.66 | 1.10181 | 0.152195 | | 30.0 | 0.52 |
| | 10.20 | 0.18 | 38.04178 | 0.66 | 1.104203 | 0.155253 | | 30.2 | 0.53 |

Fig. 18B-1

| y | | | | | rad | | y | | | |
|---|---|---|---|---|---|---|---|---|---|---|
| deg | rad | y | x | Cross check | deg | rad | deg | rad | y | x |
| -80.32638 | -1.40 | 1.090832 | 0.330482 | | 67.0 | 1.17 | -72.74063 | -1.27 | 0.527082 | 0.588206 |
| -80.22265 | -1.40 | 1.086911 | 0.331158 | | 67.2 | 1.17 | -72.33548 | -1.26 | 0.524455 | 0.589043 |
| -80.11725 | -1.40 | 1.083004 | 0.331838 | | 67.4 | 1.18 | -71.931 | -1.26 | 0.521838 | 0.589897 |
| -80.01013 | -1.40 | 1.07911 | 0.332524 | | 67.6 | 1.18 | -71.52738 | -1.25 | 0.51923 | 0.590768 |
| -79.90125 | -1.39 | 1.075229 | 0.333215 | | 67.8 | 1.18 | -71.12483 | -1.24 | 0.516632 | 0.591656 |
| -79.79054 | -1.39 | 1.071362 | 0.333912 | | 68.0 | 1.19 | -70.72354 | -1.23 | 0.514044 | 0.592561 |
| -79.67797 | -1.39 | 1.067508 | 0.334614 | | 68.2 | 1.19 | -70.32371 | -1.23 | 0.511466 | 0.593483 |
| -79.56347 | -1.39 | 1.063668 | 0.335321 | | 68.4 | 1.19 | -69.92554 | -1.22 | 0.508897 | 0.594422 |
| -79.447 | -1.39 | 1.059841 | 0.336034 | | 68.6 | 1.20 | -69.52923 | -1.21 | 0.506338 | 0.595377 |
| -79.32851 | -1.38 | 1.056027 | 0.336753 | | 68.8 | 1.20 | -69.13497 | -1.21 | 0.503789 | 0.596349 |
| -79.20794 | -1.38 | 1.052226 | 0.337477 | | 69.0 | 1.20 | -68.74297 | -1.20 | 0.501249 | 0.597337 |
| -79.08523 | -1.38 | 1.048439 | 0.338208 | | 69.2 | 1.21 | -68.35342 | -1.19 | 0.498719 | 0.598341 |
| -78.96035 | -1.38 | 1.044664 | 0.338944 | | 69.4 | 1.21 | -67.96652 | -1.19 | 0.496199 | 0.599361 |
| -78.83324 | -1.38 | 1.040903 | 0.339687 | | 69.6 | 1.21 | -67.58246 | -1.18 | 0.493688 | 0.600397 |
| -78.70384 | -1.37 | 1.037155 | 0.340435 | | 69.8 | 1.22 | -67.20146 | -1.17 | 0.491187 | 0.601448 |
| -78.5721 | -1.37 | 1.033421 | 0.34119 | | 70.0 | 1.22 | -66.82369 | -1.17 | 0.488695 | 0.602515 |
| -78.43843 | -1.37 | 1.029699 | 0.341951 | | 70.2 | 1.23 | -66.44809 | -1.16 | 0.486212 | 0.603597 |

Fig. 18B-2

| | | | | | | | |
|---|---|---|---|---|---|---|---|
| 10.40 | 0.18 | 38.17505 | 0.67 | 1.106609 | 0.158313 | 30.4 | 0.53 |
| 10.60 | 0.19 | 38.30599 | 0.67 | 1.109027 | 0.161375 | 30.6 | 0.53 |
| 10.80 | 0.19 | 38.43466 | 0.67 | 1.111459 | 0.164439 | 30.8 | 0.54 |
| 11.00 | 0.19 | 38.56111 | 0.67 | 1.113904 | 0.167506 | 31.0 | 0.54 |
| 11.20 | 0.20 | 38.68538 | 0.68 | 1.116362 | 0.170575 | 31.2 | 0.54 |
| 11.40 | 0.20 | 38.80754 | 0.68 | 1.118832 | 0.173647 | 31.4 | 0.55 |
| 11.60 | 0.20 | 38.92763 | 0.68 | 1.121315 | 0.176722 | 31.6 | 0.55 |
| 11.80 | 0.21 | 39.04571 | 0.68 | 1.123812 | 0.179799 | 31.8 | 0.56 |
| 12.00 | 0.21 | 39.16183 | 0.68 | 1.12632 | 0.18288 | 32.0 | 0.56 |
| 12.20 | 0.21 | 39.27604 | 0.69 | 1.128842 | 0.185963 | 32.2 | 0.56 |
| 12.40 | 0.22 | 39.3884 | 0.69 | 1.131376 | 0.189049 | 32.4 | 0.57 |
| 12.60 | 0.22 | 39.49896 | 0.69 | 1.133923 | 0.192139 | 32.6 | 0.57 |
| 12.80 | 0.22 | 39.60776 | 0.69 | 1.136482 | 0.195232 | 32.8 | 0.57 |
| 13.00 | 0.23 | 39.71488 | 0.69 | 1.139054 | 0.198328 | 33.0 | 0.58 |
| 13.20 | 0.23 | 39.82035 | 0.69 | 1.141639 | 0.201428 | 33.2 | 0.58 |
| 13.40 | 0.23 | 39.92422 | 0.70 | 1.144236 | 0.204531 | 33.4 | 0.58 |
| 13.60 | 0.24 | 40.02656 | 0.70 | 1.146845 | 0.207638 | 33.6 | 0.59 |
| 13.80 | 0.24 | 40.12742 | 0.70 | 1.149467 | 0.210749 | 33.8 | 0.59 |
| 14.00 | 0.24 | 40.22684 | 0.70 | 1.152102 | 0.213863 | 34.0 | 0.59 |
| 14.20 | 0.25 | 40.32488 | 0.70 | 1.154749 | 0.216982 | 34.2 | 0.60 |
| 14.40 | 0.25 | 40.4216 | 0.71 | 1.157408 | 0.220104 | 34.4 | 0.60 |

Fig. 18B-3

| | | | | | | | | | |
|---|---|---|---|---|---|---|---|---|---|
| -78.3032 | -1.37 | 1.02599 | 0.342719 | 70.4 | 1.23 | -66.0735 | -1.15 | 0.483739 | 0.604694 |
| -78.16637 | -1.36 | 1.022294 | 0.343494 | 70.6 | 1.23 | -65.70004 | -1.15 | 0.481276 | 0.605806 |
| -78.02787 | -1.36 | 1.018612 | 0.344275 | 70.8 | 1.24 | -65.32781 | -1.14 | 0.478822 | 0.606934 |
| -77.88766 | -1.36 | 1.014942 | 0.345062 | 71.0 | 1.24 | -64.9569 | -1.13 | 0.476377 | 0.608076 |
| -77.74568 | -1.36 | 1.011285 | 0.345856 | 71.2 | 1.24 | -64.58744 | -1.13 | 0.473941 | 0.609233 |
| -77.60187 | -1.35 | 1.007642 | 0.346657 | 71.4 | 1.25 | -64.21953 | -1.12 | 0.471515 | 0.610405 |
| -77.45617 | -1.35 | 1.004011 | 0.347465 | 71.6 | 1.25 | -63.85326 | -1.11 | 0.469098 | 0.611591 |
| -77.30854 | -1.35 | 1.000393 | 0.34828 | 71.8 | 1.25 | -63.48875 | -1.11 | 0.466691 | 0.612792 |
| -77.15892 | -1.35 | 0.996788 | 0.349102 | 72.0 | 1.26 | -63.1261 | -1.10 | 0.464292 | 0.614008 |
| -77.00724 | -1.34 | 0.993195 | 0.349931 | 72.2 | 1.26 | -62.76542 | -1.10 | 0.461903 | 0.615238 |
| -76.85346 | -1.34 | 0.989616 | 0.350767 | 72.4 | 1.26 | -62.40681 | -1.09 | 0.459523 | 0.616481 |
| -76.69753 | -1.34 | 0.986049 | 0.35161 | 72.6 | 1.27 | -62.05038 | -1.08 | 0.457152 | 0.617739 |
| -76.53937 | -1.34 | 0.982495 | 0.352461 | 72.8 | 1.27 | -61.69623 | -1.08 | 0.45479 | 0.619011 |
| -76.37895 | -1.33 | 0.978954 | 0.353319 | 73.0 | 1.27 | -61.34447 | -1.07 | 0.452437 | 0.620297 |
| -76.2162 | -1.33 | 0.975426 | 0.354184 | 73.2 | 1.28 | -60.99521 | -1.06 | 0.450094 | 0.621597 |
| -76.05106 | -1.33 | 0.97191 | 0.355057 | 73.4 | 1.28 | -60.64855 | -1.06 | 0.447759 | 0.62291 |
| -75.88349 | -1.32 | 0.968408 | 0.355938 | 73.6 | 1.28 | -60.30459 | -1.05 | 0.445432 | 0.624236 |
| -75.71343 | -1.32 | 0.964917 | 0.356827 | 73.8 | 1.29 | -59.96345 | -1.05 | 0.443115 | 0.625576 |
| -75.54082 | -1.32 | 0.96144 | 0.357724 | 74.0 | 1.29 | -59.62522 | -1.04 | 0.440806 | 0.626929 |
| -75.36561 | -1.32 | 0.957975 | 0.358628 | 74.2 | 1.30 | -59.29002 | -1.03 | 0.438506 | 0.628295 |
| -75.18774 | -1.31 | 0.954523 | 0.359541 | 74.4 | 1.30 | -58.95794 | -1.03 | 0.436215 | 0.629675 |

Fig. 18B-4 ray angle surf slope

| ray angle | | surf slope | | | | Cross check | rad | |
|---|---|---|---|---|---|---|---|---|
| deg | rad | deg | rad | y | x | | deg | rad |
| 14.60 | 0.25 | 40.51704 | 0.71 | 1.16008 | 0.223231 | | 34.6 | 0.60 |
| 14.80 | 0.26 | 40.61125 | 0.71 | 1.162764 | 0.226361 | | 34.8 | 0.61 |
| 15.00 | 0.26 | 40.7043 | 0.71 | 1.165461 | 0.229496 | | 35.0 | 0.61 |
| 15.20 | 0.27 | 40.79601 | 0.71 | 1.16817 | 0.232635 | | 35.2 | 0.61 |
| 15.40 | 0.27 | 40.88615 | 0.71 | 1.170891 | 0.235778 | | 35.4 | 0.62 |
| 15.60 | 0.27 | 40.97475 | 0.72 | 1.173625 | 0.238926 | | 35.6 | 0.62 |
| 15.80 | 0.28 | 41.06178 | 0.72 | 1.176371 | 0.242078 | | 35.8 | 0.62 |
| 16.00 | 0.28 | 41.14727 | 0.72 | 1.17913 | 0.245235 | | 36.0 | 0.63 |
| 16.20 | 0.28 | 41.23119 | 0.72 | 1.181901 | 0.248397 | | 36.2 | 0.63 |
| 16.40 | 0.29 | 41.31356 | 0.72 | 1.184684 | 0.251563 | | 36.4 | 0.64 |
| 16.60 | 0.29 | 41.39437 | 0.72 | 1.187479 | 0.254735 | | 36.6 | 0.64 |
| 16.80 | 0.29 | 41.47363 | 0.72 | 1.190287 | 0.257911 | | 36.8 | 0.64 |
| 17.00 | 0.30 | 41.55134 | 0.73 | 1.193107 | 0.261092 | | 37.0 | 0.65 |
| 17.20 | 0.30 | 41.62748 | 0.73 | 1.195939 | 0.264279 | | 37.2 | 0.65 |
| 17.40 | 0.30 | 41.70208 | 0.73 | 1.198783 | 0.267471 | | 37.4 | 0.65 |
| 17.60 | 0.31 | 41.77511 | 0.73 | 1.201639 | 0.270669 | | 37.6 | 0.66 |
| 17.80 | 0.31 | 41.84659 | 0.73 | 1.204508 | 0.273872 | | 37.8 | 0.66 |
| 18.00 | 0.31 | 41.91652 | 0.73 | 1.207388 | 0.27708 | | 38.0 | 0.66 |
| 18.20 | 0.32 | 41.98489 | 0.73 | 1.210281 | 0.280294 | | 38.2 | 0.67 |

Fig. 18C-1

| y | | | | | rad | | y | | | |
|---|---|---|---|---|---|---|---|---|---|---|
| deg | rad | y | x | Cross check | deg | rad | deg | rad | y | x |
| -75.00715 | -1.31 | 0.951084 | 0.360462 | | 74.6 | 1.30 | -58.6291 | -1.02 | 0.433932 | 0.631067 |
| -74.8238 | -1.31 | 0.947658 | 0.361392 | | 74.8 | 1.31 | -58.30359 | -1.02 | 0.431657 | 0.632471 |
| -74.63761 | -1.30 | 0.944244 | 0.36233 | | 75.0 | 1.31 | -57.98153 | -1.01 | 0.429391 | 0.633888 |
| -74.44896 | -1.30 | 0.940843 | 0.363276 | | 75.2 | 1.31 | -57.66252 | -1.01 | 0.427133 | 0.635318 |
| -74.25819 | -1.30 | 0.937454 | 0.364231 | | 75.4 | 1.32 | -57.3461 | -1.00 | 0.424883 | 0.63676 |
| -74.06526 | -1.29 | 0.934079 | 0.365195 | | 75.6 | 1.32 | -57.03229 | -1.00 | 0.422641 | 0.638214 |
| -73.87013 | -1.29 | 0.930715 | 0.366168 | | 75.8 | 1.32 | -56.72108 | -0.99 | 0.420407 | 0.63968 |
| -73.67277 | -1.29 | 0.927365 | 0.367149 | | 76.0 | 1.33 | -56.4125 | -0.98 | 0.418181 | 0.641158 |
| -73.47312 | -1.28 | 0.924027 | 0.36814 | | 76.2 | 1.33 | -56.10655 | -0.98 | 0.415963 | 0.642648 |
| -73.27115 | -1.28 | 0.920702 | 0.369139 | | 76.4 | 1.33 | -55.80324 | -0.97 | 0.413753 | 0.64415 |
| -73.06682 | -1.28 | 0.91739 | 0.370147 | | 76.6 | 1.34 | -55.5026 | -0.97 | 0.411551 | 0.645664 |
| -72.86008 | -1.27 | 0.91409 | 0.371165 | | 76.8 | 1.34 | -55.20461 | -0.96 | 0.409356 | 0.647189 |
| -72.6509 | -1.27 | 0.910803 | 0.372192 | | 77.0 | 1.34 | -54.90931 | -0.96 | 0.407169 | 0.648726 |
| -72.43923 | -1.26 | 0.907528 | 0.373228 | | 77.2 | 1.35 | -54.6167 | -0.95 | 0.404989 | 0.650274 |
| -72.22503 | -1.26 | 0.904267 | 0.374274 | | 77.4 | 1.35 | -54.32679 | -0.95 | 0.402817 | 0.651833 |
| -72.00826 | -1.26 | 0.901018 | 0.375329 | | 77.6 | 1.35 | -54.03958 | -0.94 | 0.400652 | 0.653404 |
| -71.78888 | -1.25 | 0.897781 | 0.376394 | | 77.8 | 1.36 | -53.7551 | -0.94 | 0.398494 | 0.654986 |
| -71.56685 | -1.25 | 0.894557 | 0.377468 | | 78.0 | 1.36 | -53.47336 | -0.93 | 0.396343 | 0.656578 |
| -71.34212 | -1.25 | 0.891346 | 0.378553 | | 78.2 | 1.36 | -53.19435 | -0.93 | 0.3942 | 0.658182 |

Fig. 18C-2

| | | | | | | | |
|---|---|---|---|---|---|---|---|
| 18.40 | 0.32 | 42.0517 | 0.73 | 1.213185 | 0.283514 | 38.4 | 0.67 |
| 18.60 | 0.32 | 42.11696 | 0.74 | 1.216102 | 0.28674 | 38.6 | 0.67 |
| 18.80 | 0.33 | 42.18066 | 0.74 | 1.219031 | 0.289972 | 38.8 | 0.68 |
| 19.00 | 0.33 | 42.2428 | 0.74 | 1.221971 | 0.29321 | 39.0 | 0.68 |
| 19.20 | 0.34 | 42.3034 | 0.74 | 1.224924 | 0.296454 | 39.2 | 0.68 |
| 19.40 | 0.34 | 42.36243 | 0.74 | 1.227888 | 0.299705 | 39.4 | 0.69 |
| 19.60 | 0.34 | 42.41991 | 0.74 | 1.230864 | 0.302962 | 39.6 | 0.69 |
| 19.80 | 0.35 | 42.47583 | 0.74 | 1.233852 | 0.306226 | 39.8 | 0.69 |
| 20.00 | 0.35 | 42.5302 | 0.74 | 1.236852 | 0.309496 | 40.0 | 0.70 |
| | | | | | | 40.2 | 0.70 |
| | | | | | | 40.4 | 0.71 |
| | | | | | | 40.6 | 0.71 |
| | | | | | | 40.8 | 0.71 |
| | | | | | | 41.0 | 0.72 |
| | | | | | | 41.2 | 0.72 |
| | | | | | | 41.4 | 0.72 |
| | | | | | | 41.6 | 0.73 |
| | | | | | | 41.8 | 0.73 |
| | | | | | | 42.0 | 0.73 |
| | | | | | | 42.2 | 0.74 |
| | | | | | | 42.4 | 0.74 |

Fig. 18C-3

| | | | | | | | | | |
|---|---|---|---|---|---|---|---|---|---|
| -71.11466 | -1.24 | 0.888148 | 0.379647 | 78.4 | 1.37 | -52.91811 | -0.92 | 0.392063 | 0.659797 |
| -70.88442 | -1.24 | 0.884962 | 0.380751 | 78.6 | 1.37 | -52.64463 | -0.92 | 0.389934 | 0.661423 |
| -70.65137 | -1.23 | 0.881789 | 0.381865 | 78.8 | 1.38 | -52.37392 | -0.91 | 0.387811 | 0.663059 |
| -70.41545 | -1.23 | 0.878629 | 0.382989 | 79.0 | 1.38 | -52.10601 | -0.91 | 0.385695 | 0.664706 |
| -70.17664 | -1.22 | 0.875482 | 0.384124 | 79.2 | 1.38 | -51.84089 | -0.90 | 0.383586 | 0.666363 |
| -69.93488 | -1.22 | 0.872347 | 0.385269 | 79.4 | 1.39 | -51.57859 | -0.90 | 0.381483 | 0.668031 |
| -69.69014 | -1.22 | 0.869225 | 0.386424 | 79.6 | 1.39 | -51.3191 | -0.90 | 0.379387 | 0.669709 |
| -69.44238 | -1.21 | 0.866116 | 0.38759 | 79.8 | 1.39 | -51.06245 | -0.89 | 0.377297 | 0.671398 |
| -69.19155 | -1.21 | 0.86302 | 0.388767 | 80.0 | 1.40 | -50.80864 | -0.89 | 0.375214 | 0.673097 |
| -68.93775 | -1.20 | 0.859937 | 0.389954 | 80.2 | 1.40 | -50.55781 | -0.88 | 0.373136 | 0.674806 |
| -68.68111 | -1.20 | 0.856866 | 0.391153 | 80.4 | 1.40 | -50.31004 | -0.88 | 0.371065 | 0.676525 |
| -68.42164 | -1.19 | 0.853809 | 0.392362 | 80.6 | 1.41 | -50.06529 | -0.87 | 0.369 | 0.678253 |
| -68.15934 | -1.19 | 0.850764 | 0.393582 | 80.8 | 1.41 | -49.82352 | -0.87 | 0.36694 | 0.679992 |
| -67.89423 | -1.18 | 0.847732 | 0.394814 | 81.0 | 1.41 | -49.5847 | -0.87 | 0.364887 | 0.681741 |
| -67.62633 | -1.18 | 0.844714 | 0.396056 | 81.2 | 1.42 | -49.34878 | -0.86 | 0.362839 | 0.683499 |
| -67.35564 | -1.18 | 0.841708 | 0.39731 | 81.4 | 1.42 | -49.11571 | -0.86 | 0.360797 | 0.685267 |
| -67.08217 | -1.17 | 0.838716 | 0.398575 | 81.6 | 1.42 | -48.88547 | -0.85 | 0.35876 | 0.687045 |
| -66.80593 | -1.17 | 0.835736 | 0.399852 | 81.8 | 1.43 | -48.658 | -0.85 | 0.356729 | 0.688832 |
| -66.52694 | -1.16 | 0.83277 | 0.40114 | 82.0 | 1.43 | -48.43326 | -0.85 | 0.354703 | 0.690629 |
| -66.2452 | -1.16 | 0.829817 | 0.40244 | 82.2 | 1.43 | -48.21122 | -0.84 | 0.352682 | 0.692435 |
| -65.96073 | -1.15 | 0.826877 | 0.403751 | 82.4 | 1.44 | -47.99183 | -0.84 | 0.350667 | 0.69425 |

Fig. 18C-4

| ray angle | surf slope | ray angle | | surf slope | | | | | rad | |
|---|---|---|---|---|---|---|---|---|---|---|
| | | deg | rad | deg | rad | y | x | Cross check | deg | rad |
| | | | | | | | | | 42.6 | 0.74 |
| | | | | | | | | | 42.8 | 0.75 |
| | | | | | | | | | 43.0 | 0.75 |
| | | | | | | | | | 43.2 | 0.75 |
| | | | | | | | | | 43.4 | 0.76 |
| | | | | | | | | | 43.6 | 0.76 |
| | | | | | | | | | 43.8 | 0.76 |
| | | | | | | | | | 44.0 | 0.77 |
| | | | | | | | | | 44.2 | 0.77 |
| | | | | | | | | | 44.4 | 0.77 |
| | | | | | | | | | 44.6 | 0.78 |
| | | | | | | | | | 44.8 | 0.78 |
| | | | | | | | | | 45.0 | 0.79 |
| | | | | | | | | | 45.2 | 0.79 |
| | | | | | | | | | 45.4 | 0.79 |
| | | | | | | | | | 45.6 | 0.80 |
| | | | | | | | | | 45.8 | 0.80 |
| | | | | | | | | | 46.0 | 0.80 |
| | | | | | | | | | 46.2 | 0.81 |

Fig. 18D-1

| y | | | | Cross check | rad | | y | | | |
|---|---|---|---|---|---|---|---|---|---|---|
| deg | rad | y | x | | deg | rad | deg | rad | y | x |
| -65.67354 | -1.15 | 0.82395 | 0.405074 | | 82.6 | 1.44 | -47.77505 | -0.83 | 0.348656 | 0.696075 |
| -65.38364 | -1.14 | 0.821036 | 0.406409 | | 82.8 | 1.45 | -47.56085 | -0.83 | 0.346651 | 0.697908 |
| -65.09104 | -1.14 | 0.818136 | 0.407756 | | 83.0 | 1.45 | -47.34917 | -0.83 | 0.34465 | 0.699751 |
| -64.79574 | -1.13 | 0.815249 | 0.409115 | | 83.2 | 1.45 | -47.13998 | -0.82 | 0.342654 | 0.701603 |
| -64.49777 | -1.13 | 0.812375 | 0.410486 | | 83.4 | 1.46 | -46.93323 | -0.82 | 0.340663 | 0.703465 |
| -64.19713 | -1.12 | 0.809515 | 0.411869 | | 83.6 | 1.46 | -46.72889 | -0.82 | 0.338677 | 0.705335 |
| -63.89384 | -1.12 | 0.806668 | 0.413264 | | 83.8 | 1.46 | -46.52692 | -0.81 | 0.336695 | 0.707214 |
| -63.5879 | -1.11 | 0.803834 | 0.414671 | | 84.0 | 1.47 | -46.32727 | -0.81 | 0.334717 | 0.709102 |
| -63.27932 | -1.10 | 0.801014 | 0.416091 | | 84.2 | 1.47 | -46.12989 | -0.81 | 0.332744 | 0.710999 |
| -62.96812 | -1.10 | 0.798207 | 0.417523 | | 84.4 | 1.47 | -45.93476 | -0.80 | 0.330775 | 0.712904 |
| -62.65431 | -1.09 | 0.795414 | 0.418967 | | 84.6 | 1.48 | -45.74183 | -0.80 | 0.32881 | 0.714819 |
| -62.3379 | -1.09 | 0.792635 | 0.420424 | | 84.8 | 1.48 | -45.55105 | -0.80 | 0.326849 | 0.716742 |
| -62.01889 | -1.08 | 0.789869 | 0.421894 | | 85.0 | 1.48 | -45.36239 | -0.79 | 0.324893 | 0.718674 |
| -61.69684 | -1.08 | 0.787117 | 0.423376 | | 85.2 | 1.49 | -45.17599 | -0.79 | 0.32294 | 0.720615 |
| -61.37133 | -1.07 | 0.784378 | 0.42487 | | 85.4 | 1.49 | -44.992 | -0.79 | 0.320991 | 0.722564 |
| -61.04249 | -1.07 | 0.781654 | 0.426378 | | 85.6 | 1.49 | -44.81043 | -0.78 | 0.319046 | 0.724522 |
| -60.71041 | -1.06 | 0.778943 | 0.427899 | | 85.8 | 1.50 | -44.63129 | -0.78 | 0.317105 | 0.726489 |
| -60.3752 | -1.05 | 0.776246 | 0.429432 | | 86.0 | 1.50 | -44.45455 | -0.78 | 0.315167 | 0.728464 |
| -60.03697 | -1.05 | 0.773564 | 0.430979 | | 86.2 | 1.50 | -44.28024 | -0.77 | 0.313232 | 0.730448 |

Fig. 18D-2

| | |
|---|---|
| 46.4 | 0.81 |
| 46.6 | 0.81 |
| 46.8 | 0.82 |
| 47.0 | 0.82 |
| 47.2 | 0.82 |
| 47.4 | 0.83 |
| 47.6 | 0.83 |
| 47.8 | 0.83 |
| 48.0 | 0.84 |
| 48.2 | 0.84 |
| 48.4 | 0.84 |
| 48.6 | 0.85 |
| 48.8 | 0.85 |
| 49.0 | 0.86 |
| 49.2 | 0.86 |
| 49.4 | 0.86 |
| 49.6 | 0.87 |
| 49.8 | 0.87 |
| 50.0 | 0.87 |
| 50.2 | 0.88 |
| 50.4 | 0.88 |

Fig. 18D-3

| | | | | | | | | |
|---|---|---|---|---|---|---|---|---|
| -59.69582 | -1.04 | 0.770895 | 0.432538 | 86.4 | 1.51 | -44.10835 | -0.77 | 0.311301 | 0.73244 |
| -59.35186 | -1.04 | 0.76824 | 0.434111 | 86.6 | 1.51 | -43.93888 | -0.77 | 0.309374 | 0.73444 |
| -59.00519 | -1.03 | 0.7656 | 0.435697 | 86.8 | 1.51 | -43.77182 | -0.76 | 0.307449 | 0.736449 |
| -58.65591 | -1.02 | 0.762974 | 0.437297 | 87.0 | 1.52 | -43.60719 | -0.76 | 0.305528 | 0.738466 |
| -58.30415 | -1.02 | 0.760362 | 0.43891 | 87.2 | 1.52 | -43.44497 | -0.76 | 0.30361 | 0.740491 |
| -57.95 | -1.01 | 0.757765 | 0.440536 | 87.4 | 1.53 | -43.28517 | -0.76 | 0.301694 | 0.742525 |
| -57.59356 | -1.01 | 0.755181 | 0.442176 | 87.6 | 1.53 | -43.12779 | -0.75 | 0.299782 | 0.744567 |
| -57.23494 | -1.00 | 0.752613 | 0.443829 | 87.8 | 1.53 | -42.97283 | -0.75 | 0.297872 | 0.746617 |
| -56.87426 | -0.99 | 0.750059 | 0.445496 | 88.0 | 1.54 | -42.82029 | -0.75 | 0.295965 | 0.748675 |
| -56.51161 | -0.99 | 0.747519 | 0.447176 | 88.2 | 1.54 | -42.67016 | -0.74 | 0.29406 | 0.750741 |
| -56.14709 | -0.98 | 0.744994 | 0.44887 | 88.4 | 1.54 | -42.52246 | -0.74 | 0.292158 | 0.752815 |
| -55.78083 | -0.97 | 0.742483 | 0.450577 | 88.6 | 1.55 | -42.37718 | -0.74 | 0.290258 | 0.754898 |
| -55.41291 | -0.97 | 0.739987 | 0.452298 | 88.8 | 1.55 | -42.23431 | -0.74 | 0.28836 | 0.756988 |
| -55.04346 | -0.96 | 0.737506 | 0.454032 | 89.0 | 1.55 | -42.09386 | -0.73 | 0.286465 | 0.759086 |
| -54.67257 | -0.95 | 0.73504 | 0.455781 | 89.2 | 1.56 | -41.95583 | -0.73 | 0.284571 | 0.761192 |
| -54.30034 | -0.95 | 0.732588 | 0.457542 | 89.4 | 1.56 | -41.82022 | -0.73 | 0.28268 | 0.763306 |
| -53.92689 | -0.94 | 0.730151 | 0.459318 | 89.6 | 1.56 | -41.68703 | -0.73 | 0.28079 | 0.765428 |
| -53.55233 | -0.93 | 0.727729 | 0.461106 | 89.8 | 1.57 | -41.55626 | -0.73 | 0.278902 | 0.767558 |
| -53.17675 | -0.93 | 0.725322 | 0.462909 | 90.0 | 1.57 | -41.4279 | -0.72 | 0.277016 | 0.769695 |
| -52.79901 | -0.92 | 0.722929 | 0.464725 | | | | | | |
| -52.41804 | -0.91 | 0.720552 | 0.466554 | | | | | | |

Fig. 18D-4 ray angle surf slope

| ray angle | | surf slope | | | | | rad | |
|---|---|---|---|---|---|---|---|---|
| deg | rad | deg | rad | y | x | Cross check | deg | rad |
| | | | | | | | 50.6 | 0.88 |
| | | | | | | | 50.8 | 0.89 |
| | | | | | | | 51.0 | 0.89 |
| | | | | | | | 51.2 | 0.89 |
| | | | | | | | 51.4 | 0.90 |
| | | | | | | | 51.6 | 0.90 |
| | | | | | | | 51.8 | 0.90 |
| | | | | | | | 52.0 | 0.91 |
| | | | | | | | 52.2 | 0.91 |
| | | | | | | | 52.4 | 0.91 |
| | | | | | | | 52.6 | 0.92 |
| | | | | | | | 52.8 | 0.92 |
| | | | | | | | 53.0 | 0.93 |
| | | | | | | | 53.2 | 0.93 |
| | | | | | | | 53.4 | 0.93 |
| | | | | | | | 53.6 | 0.94 |
| | | | | | | | 53.8 | 0.94 |

Fig. 18E-1

| y | | | | | rad | | y | | | |
|---|---|---|---|---|---|---|---|---|---|---|
| deg | rad | y | x | Cross check | deg | rad | deg | rad | y | x |
| -52.03403 | -0.91 | 0.71819 | 0.468398 | | | | | | | |
| -51.64717 | -0.90 | 0.715843 | 0.470255 | | | | | | | |
| -51.25768 | -0.89 | 0.713511 | 0.472126 | | | | | | | |
| -50.86573 | -0.89 | 0.711194 | 0.474011 | | | | | | | |
| -50.47154 | -0.88 | 0.708893 | 0.47591 | | | | | | | |
| -50.07529 | -0.87 | 0.706607 | 0.477823 | | | | | | | |
| -49.67719 | -0.87 | 0.704337 | 0.479749 | | | | | | | |
| -49.27743 | -0.86 | 0.702083 | 0.48169 | | | | | | | |
| -48.87621 | -0.85 | 0.699844 | 0.483645 | | | | | | | |
| -48.47373 | -0.85 | 0.697621 | 0.485613 | | | | | | | |
| -48.07018 | -0.84 | 0.695413 | 0.487596 | | | | | | | |
| -47.66576 | -0.83 | 0.693222 | 0.489593 | | | | | | | |
| -47.26068 | -0.82 | 0.691046 | 0.491603 | | | | | | | |
| -46.85511 | -0.82 | 0.688886 | 0.493627 | | | | | | | |
| -46.44927 | -0.81 | 0.686742 | 0.495666 | | | | | | | |
| -46.04336 | -0.80 | 0.684614 | 0.497718 | | | | | | | |
| -45.63756 | -0.80 | 0.682502 | 0.499784 | | | | | | | |

Fig. 18E-2

| | |
|---|---|
| 54.0 | 0.94 |
| 54.2 | 0.95 |
| 54.4 | 0.95 |
| 54.6 | 0.95 |
| 54.8 | 0.96 |
| 55.0 | 0.96 |
| 55.2 | 0.96 |
| 55.4 | 0.97 |
| 55.6 | 0.97 |
| 55.8 | 0.97 |
| 56.0 | 0.98 |
| 56.2 | 0.98 |
| 56.4 | 0.98 |
| 56.6 | 0.99 |
| 56.8 | 0.99 |
| 57.0 | 0.99 |
| 57.2 | 1.00 |
| 57.4 | 1.00 |
| 57.6 | 1.01 |
| 57.8 | 1.01 |

Fig. 18E-3

| | | | |
|---|---|---|---|
| -45.23207 | -0.79 | 0.680405 | 0.501863 |
| -44.8271 | -0.78 | 0.678325 | 0.503956 |
| -44.42284 | -0.78 | 0.67626 | 0.506063 |
| -44.01949 | -0.77 | 0.674211 | 0.508183 |
| -43.61724 | -0.76 | 0.672178 | 0.510317 |
| -43.21629 | -0.75 | 0.670161 | 0.512464 |
| -42.81599 | -0.75 | 0.668159 | 0.514624 |
| -42.41554 | -0.74 | 0.666174 | 0.516797 |
| -42.01495 | -0.73 | 0.664204 | 0.518984 |
| -41.61421 | -0.73 | 0.66225 | 0.521184 |
| -41.21333 | -0.72 | 0.660312 | 0.523397 |
| -40.8123 | -0.71 | 0.658389 | 0.525623 |
| -40.41113 | -0.71 | 0.656483 | 0.527862 |
| -40.00982 | -0.70 | 0.654592 | 0.530114 |
| -39.60835 | -0.69 | 0.652718 | 0.532379 |
| -39.20675 | -0.68 | 0.650859 | 0.534657 |
| -38.805 | -0.68 | 0.649017 | 0.536949 |
| -38.4031 | -0.67 | 0.64719 | 0.539253 |
| -38.00106 | -0.66 | 0.64538 | 0.54157 |
| -37.59887 | -0.66 | 0.643586 | 0.5439 |

Fig. 18E-4

| ray angle | surf slope | ray angle | | surf slope | | | | Cross check | rad | |
|---|---|---|---|---|---|---|---|---|---|---|
| | | deg | rad | deg | rad | y | x | | deg | rad |
| | | | | | | | | | 58.0 | 1.01 |
| | | | | | | | | | 58.2 | 1.02 |
| | | | | | | | | | 58.4 | 1.02 |
| | | | | | | | | | 58.6 | 1.02 |
| | | | | | | | | | 58.8 | 1.03 |
| | | | | | | | | | 59.0 | 1.03 |
| | | | | | | | | | 59.2 | 1.03 |
| | | | | | | | | | 59.4 | 1.04 |
| | | | | | | | | | 59.6 | 1.04 |
| | | | | | | | | | 59.8 | 1.04 |
| | | | | | | | | | 60.0 | 1.05 |

Fig. 18F-1

| y | | | | | rad | | y | | | |
|---|---|---|---|---|---|---|---|---|---|---|
| deg | rad | y | x | Cross check | deg | rad | deg | rad | y | x |
| -37.19654 | -0.65 | 0.641807 | 0.546243 | | | | | | | |
| -36.79406 | -0.64 | 0.640045 | 0.548599 | | | | | | | |
| -36.39144 | -0.64 | 0.6383 | 0.550968 | | | | | | | |
| -35.98867 | -0.63 | 0.63657 | 0.553349 | | | | | | | |
| -35.58576 | -0.62 | 0.634857 | 0.555744 | | | | | | | |
| -35.18271 | -0.61 | 0.63316 | 0.558151 | | | | | | | |
| -34.77951 | -0.61 | 0.631479 | 0.560571 | | | | | | | |
| -34.37616 | -0.60 | 0.629815 | 0.563003 | | | | | | | |
| -33.97267 | -0.59 | 0.628167 | 0.565449 | | | | | | | |
| -33.56903 | -0.59 | 0.626536 | 0.567907 | -33.5690318 | | | | | | |
| -33.16525 | -0.58 | 0.624921 | 0.570378 | | | | | | | |

Fig. 18F-2

EXEMPLARY INDOOR/OUTDOOR APPLICATION

ARCHITECTURAL WINDOWS (STOREFRONT, OFFICE BUILDING, etc)

● = PRISM/LED

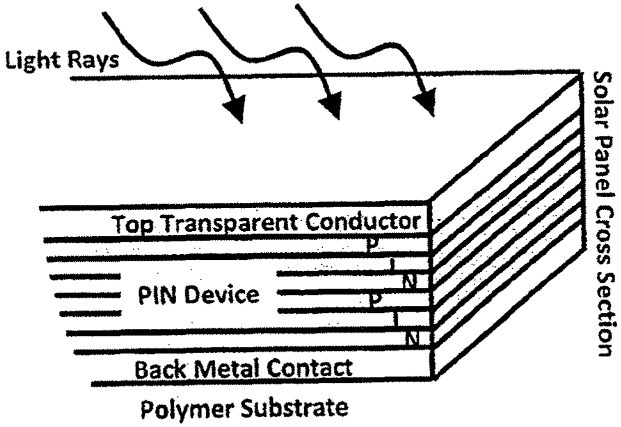
PF PowerFilm.
Starts on a roll
13 Inches Wide
Up to 2,400 Feet Long
Revolutionary Technology
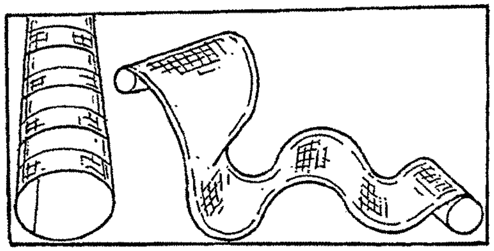
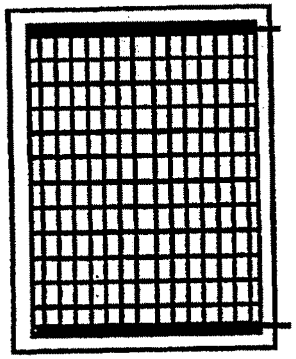
PT15-150
| | |
|---|---|
| **Operating voltage** | 15.4 V |
| **Operating Current** | 100 mA |
| **Typical Voc** | 19 V |
| **Typical Isc** | 120 mA |
| **Total Size** | 270mm x 175 mm (10.6 x 6.9 inches) |
| **Solar Module Aperture Size** | 240mm x 150 mm (9.5 x 5.9 inches) |
| **Total Thickness** | 1.1mm (44mil) |
| **Weight** | 56.4g (2.0oz) |
Exemplary Flexible Solar Cell
Fig. 20A-1

The SunLight prevents reverse current leakage at night, so a blocking diode is not required in the system.

Exemplary Solar Cell Lighting Controller

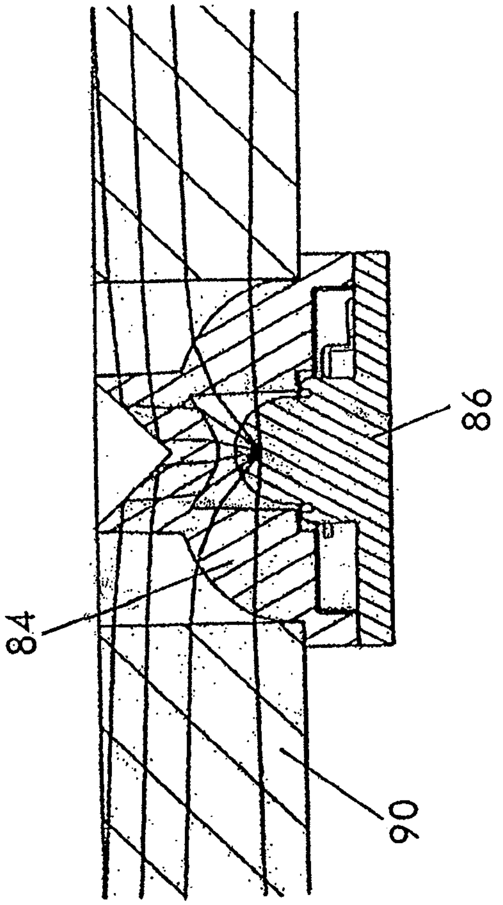
Fig. 21A
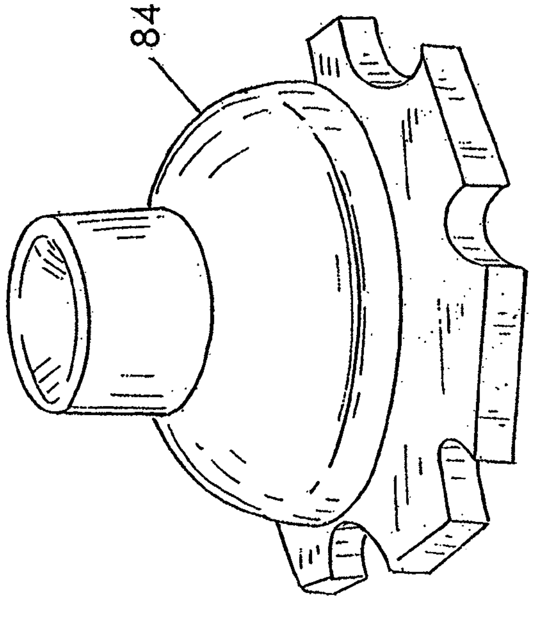

Lambertian LED & Edge Lighting

| | | | |
|---|---|---|---|
| n1 | 1.51 | Diffuser refractive index |
| n2 | 1.00 | Refractive Index of air |

| Rel. LED Intens. | θ1 in Fig. 5 deg | δ (deg) (90-θ2) in Fig. 5 | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg |
|---|---|---|---|---|---|---|---|---|---|---|---|---|---|---|---|---|---|---|---|---|---|---|
| 100.0% | 0 | 0 | 10 | ##TIR## | 20 | ##TIR## | 30 | ##TIR## | 40 | ##TIR## | 50 | 126.1 | 60 | 109.0 | 70 | 101.1 | 80 | 95.2 | 84.47 | 92.8 | 90 | 90.0 |
| 99.0% | 10 | 6.60 | 10 | ##TIR## | 20 | ##TIR## | 30 | ##TIR## | 40 | ##TIR## | 50 | 106.2 | 60 | 96.8 | 70 | 90.5 | 80 | 85.1 | 84.47 | 82.9 | 90 | 80.0 |
| 97.9% | 20 | 13.09 | 10 | ##TIR## | 20 | ##TIR## | 30 | ##TIR## | 40 | 105.1 | 50 | 93.1 | 60 | 86.1 | 70 | 80.5 | 80 | 75.3 | 84.47 | 73.0 | 90 | 70.0 |
| 92.8% | 30 | 19.34 | 10 | ##TIR## | 20 | ##TIR## | 30 | 109.7 | 40 | 90.4 | 50 | 82.2 | 60 | 76.2 | 70 | 71.0 | 80 | 65.8 | 84.47 | 63.3 | 90 | 60.0 |
| 84.5% | 40 | 25.19 | 10 | ##TIR## | 20 | ##TIR## | 30 | 89.5 | 40 | 79.3 | 50 | 72.7 | 60 | 67.3 | 70 | 62.1 | 80 | 56.7 | 84.47 | 53.9 | 90 | 50.0 |
| 72.7% | 50 | 30.49 | 10 | ##TIR## | 20 | 93.9 | 30 | 78.1 | 40 | 70.3 | 50 | 64.4 | 60 | 59.3 | 70 | 54.0 | 80 | 48.1 | 84.47 | 44.9 | 90 | 40.0 |
| 54.1% | 60 | 35.00 | 10 | ##TIR## | 20 | 80.0 | 30 | 69.7 | 40 | 63.0 | 50 | 57.6 | 60 | 52.4 | 70 | 47.0 | 80 | 40.3 | 84.47 | 36.5 | 90 | 30.0 |
| 35.6% | 70 | 38.49 | 10 | ##TIR## | 20 | 72.1 | 30 | 63.6 | 40 | 57.5 | 50 | 52.3 | 60 | 47.1 | 70 | 41.4 | 80 | 33.9 | 84.47 | 29.2 | 90 | 20.0 |
| 17.5% | 80 | 40.71 | 10 | 83.0 | 20 | 67.6 | 30 | 59.9 | 40 | 54.1 | 50 | 48.9 | 60 | 43.7 | 70 | 37.7 | 80 | 29.5 | 84.47 | 24.0 | 90 | 10.0 |
| 5.2% | 90 | 41.47 | 10 | 80.1 | 20 | 66.2 | 30 | 58.7 | 40 | 52.9 | 50 | 47.8 | 60 | 42.5 | 70 | 36.4 | 80 | 28.0 | 84.47 | 22.1 | 90 | 0.0 |

Fig. 25A-1

Side Emitting LED & Prism Lighting

| | | |
|---|---|---|
| n1 | 1.51 | Diffuser refractive index |
| n2 | 1.00 | Refractive Index of air |

| Rel. LED Intens. | ψ in Fig. 7 deg | δ (deg) (90-θ2) in Fig. 7 | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg |
|---|---|---|---|---|---|---|---|---|---|---|---|---|---|---|---|---|---|---|---|---|---|---|
| 82.5% | 0 | 42.09 | 10 | 78.1 | 20 | 65.0 | 30 | 57.7 | 40 | 52.0 | 50 | 46.8 | 60 | 41.6 | 70 | 35.4 | 80 | 26.7 | 84.47 | 20.4 | 90 | ##TIR## |
| 100.0% | 10 | 43.88 | 10 | 72.9 | 20 | 61.7 | 30 | 54.8 | 40 | 49.3 | 50 | 44.1 | 60 | 38.8 | 70 | 32.3 | 80 | 22.7 | 84.47 | 14.9 | 90 | ##TIR## |
| 56.7% | 20 | 47.00 | 10 | 65.3 | 20 | 56.2 | 30 | 49.9 | 40 | 44.5 | 50 | 39.4 | 60 | 33.8 | 70 | 26.7 | 80 | 14.7 | 84.47 | -5.0 | 90 | ##TIR## |
| 30.9% | 30 | 51.21 | 10 | 56.7 | 20 | 49.1 | 30 | 43.3 | 40 | 38.2 | 50 | 32.9 | 60 | 26.9 | 70 | 18.5 | 80 | -4.2 | 84.47 | ##TIR## | 90 | ##TIR## |
| 13.4% | 40 | 56.28 | 10 | 47.4 | 20 | 41.0 | 30 | 35.6 | 40 | 30.5 | 50 | 25.0 | 60 | 18.1 | 70 | 6.7 | 80 | ##TIR## | 84.47 | ##TIR## | 90 | ##TIR## |
| 11.3% | 50 | 61.97 | 10 | 37.9 | 20 | 32.2 | 30 | 27.0 | 40 | 21.7 | 50 | 15.6 | 60 | 6.9 | 70 | ##TIR## | 80 | ##TIR## | 84.47 | ##TIR## | 90 | ##TIR## |
| 12.4% | 60 | 68.11 | 10 | 28.1 | 20 | 22.9 | 30 | 17.7 | 40 | 12.0 | 50 | 4.7 | 60 | -8.7 | 70 | ##TIR## | 80 | ##TIR## | 84.47 | ##TIR## | 90 | ##TIR## |
| 15.5% | 70 | 74.53 | 10 | 18.3 | 20 | 13.2 | 30 | 7.7 | 40 | 1.2 | 50 | -8.9 | 60 | ##TIR## | 70 | ##TIR## | 80 | ##TIR## | 84.47 | ##TIR## | 90 | ##TIR## |
| 17.5% | 80 | 81.11 | 10 | 8.3 | 20 | 3.1 | 30 | -2.9 | 40 | -11.3 | 50 | -33.1 | 60 | ##TIR## | 70 | ##TIR## | 80 | ##TIR## | 84.47 | ##TIR## | 90 | ##TIR## |
| 19.6% | 90 | 87.72 | 10 | -1.7 | 20 | -7.4 | 30 | -14.6 | 40 | -27.5 | 50 | ##TIR## | 60 | ##TIR## | 70 | ##TIR## | 80 | ##TIR## | 84.47 | ##TIR## | 90 | ##TIR## |

Fig. 25A-2

Lambertian LED & Edge Lighting

| | | |
|---|---|---|
| n1 | 1.51 | Diffuser refractive index |
| n2 | 1.00 | Refractive Index of air |

| Rel. LED Intens. | θ1 in Fig. 5 deg | δ (deg) (90-θ2) in Fig. 5 | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg |
|---|---|---|---|---|---|---|---|---|---|---|---|---|---|---|---|---|---|---|---|---|---|---|
| 100.0% | 0 | 0 | - | - | 0.0 | ##TIR## | 7.0 | ##TIR## | 7.1 | ##TIR## | 7.9 | ##TIR## | 10.0 | ##TIR## | 10.1 | ##TIR## | 13.6 | ##TIR## | 18.1 | ##TIR## | 20.0 | ##TIR## |
| 99.0% | 10 | 6.60 | -5.0 | ##TIR## | 0.0 | ##TIR## | 7.0 | ##TIR## | 7.1 | ##TIR## | 7.9 | ##TIR## | 10.0 | ##TIR## | 10.1 | ##TIR## | 13.6 | ##TIR## | 18.1 | ##TIR## | 20.0 | ##TIR## |
| 97.9% | 20 | 13.09 | -5.0 | ##TIR## | 0.0 | ##TIR## | 7.0 | ##TIR## | 7.1 | ##TIR## | 7.9 | ##TIR## | 10.0 | ##TIR## | 10.1 | ##TIR## | 13.6 | ##TIR## | 18.1 | ##TIR## | 20.0 | ##TIR## |
| 92.8% | 30 | 19.34 | -5.0 | ##TIR## | 0.0 | ##TIR## | 7.0 | ##TIR## | 7.1 | ##TIR## | 7.9 | ##TIR## | 10.0 | ##TIR## | 10.1 | ##TIR## | 13.6 | ##TIR## | 18.1 | ##TIR## | 20.0 | ##TIR## |
| 84.5% | 40 | 25.19 | -5.0 | ##TIR## | 0.0 | ##TIR## | 7.0 | ##TIR## | 7.1 | ##TIR## | 7.9 | ##TIR## | 10.0 | ##TIR## | 10.1 | ##TIR## | 13.6 | ##TIR## | 18.1 | ##TIR## | 20.0 | ##TIR## |
| 72.7% | 50 | 30.49 | -5.0 | ##TIR## | 0.0 | ##TIR## | 7.0 | ##TIR## | 7.1 | ##TIR## | 7.9 | ##TIR## | 10.0 | ##TIR## | 10.1 | ##TIR## | 13.6 | ##TIR## | 18.1 | 105.3 | 20.0 | 93.9 |
| 54.1% | 60 | 35.00 | -5.0 | ##TIR## | 0.0 | ##TIR## | 7.0 | ##TIR## | 7.1 | ##TIR## | 7.9 | ##TIR## | 10.0 | ##TIR## | 10.1 | ##TIR## | 13.6 | 100.5 | 18.1 | 83.1 | 20.0 | 80.0 |
| 35.6% | 70 | 38.49 | -5.0 | ##TIR## | 0.0 | ##TIR## | 7.0 | ##TIR## | 7.1 | ##TIR## | 7.9 | ##TIR## | 10.0 | ##TIR## | 10.1 | 97.3 | 13.6 | 81.7 | 18.1 | 74.3 | 20.0 | 72.1 |
| 17.5% | 80 | 40.71 | -5.0 | ##TIR## | 0.0 | ##TIR## | 7.0 | ##TIR## | 7.1 | ##TIR## | 7.9 | 94.6 | 10.0 | 83.0 | 10.1 | 82.7 | 13.6 | 75.4 | 18.1 | 69.5 | 20.0 | 67.6 |
| 5.2% | 90 | 41.47 | -5.0 | ##TIR## | 0.0 | ##TIR## | 7.0 | ##TIR## | 7.1 | 94.7 | 7.9 | 87.4 | 10.0 | 80.1 | 10.1 | 79.9 | 13.6 | 73.4 | 18.1 | 68.0 | 20.0 | 66.2 |

Fig. 25B-1

Side Emitting LED & Prism Lighting

| | | |
|---|---|---|
| n1 | 1.51 | Diffuser refractive index |
| n2 | 1.00 | Refractive Index of air |

| Rel. LED Intens. | ψ in Fig. 7 deg | δ (deg) (90-θ2) in Fig. 7 | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg | γ deg | φ deg |
|---|---|---|---|---|---|---|---|---|---|---|---|---|---|---|---|---|---|---|---|---|---|---|
| 82.5% | 0 | 42.09 | -40.0 | ##TIR## | -39.1 | ##TIR## | -32.5 | ##TIR## | -26.0 | ##TIR## | -19.5 | ##TIR## | -13.4 | ##TIR## | -7.7 | ##TIR## | -2.6 | ##TIR## | -1.3 | ##TIR## | 0.0 | ##TIR## |
| 100.0% | 10 | 43.88 | -40.0 | ##TIR## | -39.1 | ##TIR## | -32.5 | ##TIR## | -26.0 | ##TIR## | -19.5 | ##TIR## | -13.4 | ##TIR## | -7.7 | ##TIR## | -2.6 | ##TIR## | -1.3 | ##TIR## | 0.0 | ##TIR## |
| 56.7% | 20 | 47.00 | -40.0 | ##TIR## | -39.1 | ##TIR## | -32.5 | ##TIR## | -26.0 | ##TIR## | -19.5 | ##TIR## | -13.4 | ##TIR## | -7.7 | ##TIR## | -2.6 | ##TIR## | -1.3 | ##TIR## | 0.0 | ##TIR## |
| 30.9% | 30 | 51.21 | -40.0 | ##TIR## | -39.1 | ##TIR## | -32.5 | ##TIR## | -26.0 | ##TIR## | -19.5 | ##TIR## | -13.4 | ##TIR## | -7.7 | ##TIR## | -2.6 | 84.2 | -1.3 | 75.2 | 0.0 | 71.1 |
| 13.4% | 40 | 56.28 | -40.0 | ##TIR## | -39.1 | ##TIR## | -32.5 | ##TIR## | -26.0 | ##TIR## | -19.5 | ##TIR## | -13.4 | ##TIR## | -7.7 | 79.8 | -2.6 | 60.8 | -1.3 | 58.8 | 0.0 | 57.0 |
| 11.3% | 50 | 61.97 | -40.0 | ##TIR## | -39.1 | ##TIR## | -32.5 | ##TIR## | -26.0 | ##TIR## | -19.5 | ##TIR## | -13.4 | 74.3 | -7.7 | 54.2 | -2.6 | 47.7 | -1.3 | 46.4 | 0.0 | 45.2 |
| 12.4% | 60 | 68.11 | -40.0 | ##TIR## | -39.1 | ##TIR## | -32.5 | ##TIR## | -26.0 | ##TIR## | -19.5 | 67.3 | -13.4 | 47.3 | -7.7 | 40.5 | -2.6 | 36.2 | -1.3 | 35.2 | 0.0 | 34.3 |
| 15.5% | 70 | 74.53 | -40.0 | ##TIR## | -39.1 | ##TIR## | -32.5 | ##TIR## | -26.0 | 63.6 | -19.5 | 40.4 | -13.4 | 33.4 | -7.7 | 28.8 | -2.6 | 25.3 | -1.3 | 24.5 | 0.0 | 23.8 |
| 17.5% | 80 | 81.11 | -40.0 | ##TIR## | -39.1 | ##TIR## | -32.5 | 54.3 | -26.0 | 33.7 | -19.5 | 26.4 | -13.4 | 21.5 | -7.7 | 17.8 | -2.6 | 14.9 | -1.3 | 14.2 | 0.0 | 13.5 |
| 19.6% | 90 | 87.72 | -40.0 | ##TIR## | -39.1 | 47.4 | -32.5 | 27.0 | -26.0 | 19.7 | -19.5 | 14.6 | -13.4 | 10.7 | -7.7 | 7.5 | -2.6 | 4.8 | -1.3 | 4.1 | 0.0 | 3.4 |

Fig. 25B-2

SUBSTRATE WITH INDICIA CONFIGURED FOR OPTICAL COUPLING

CROSS REFERENCE TO RELATED APPLICATION

This application is a continuation of U.S. patent application Ser. No. 14/105,533, filed Dec. 13, 2013, incorporated herein by reference, which is a divisional of U.S. patent application Ser. No. 13/659,357, filed Oct. 24, 2012, now U.S. Pat. No. 8,727,581, issued May 20, 2014, incorporated herein by reference, which is a divisional of U.S. patent application Ser. No. 12/636,442, filed Dec. 11, 2009, now U.S. Pat. No. 8,317,352, issued Nov. 27, 2012, incorporated herein by reference, which claims the benefit of U.S. Provisional Application No. 61/201,524, filed on Dec. 11, 2008, incorporated herein by reference.

BACKGROUND OF THE INVENTION

Field of the Invention

This invention concerns illuminating a transparent substance, such as existing storefront window pane and particularly storefront panes. It is desirable to illuminate in a cost-effective manner so as to attract attention and try to promote incremental sales.

Light (UV, visible and/or IR) from a source (e.g., LED, laser diode, optical fiber, fluorescent or photoluminescent materials) is optically coupled into a transparent substrate (e.g., storefront window) via toroidal or circular (FIGS. 1, 1A, 1B, 2, 4, 12) prism couplers. These couplers can be refractive (FIGS. 1, 1A, 1B), reflective (FIG. 4), or some combination thereof, and comprise a refractive medium (e.g. oil, gel, water, adhesive, etc) between the optic (e.g. circular prism) and the substrate (e.g. window) in order to non-invasively introduce light into the substrate at angles that cannot be introduced via air coupling. Use of such prism couplers to the face of a transparent substrate is one element of the invention disclosed herein. The light is then trapped within the substrate or window, which is akin to light trapped within an optical fiber i.e., via total internal reflection, TIR. Definitions of TIR, the 'critical angle' and the 'evanescent wave' appear in U.S. Pat. No. 5,959,777, column 2, line 56-Col. 3, line 8, and 'optical contact' in Col. 1, lines 55-59 in the same patent, all incorporated by reference.

Light can then be extracted from the surface of the substrate or window by defeating TIR via techniques known in the art. Examples of such techniques would be the application of scattering/fluorescing inks or the lamination of surface or bulk diffusing films to portions of the window surface Prior Art Traditional edge lighting of a transparent substrate introduces light into the substrate along at least one edge thereof, and light is trapped in the substrate and propagates along the substrate as the light is reflected off the surfaces on the inside of the substrate (see, e.g., U.S. Pat. No. 6,036,328).

FIG. 5 hereof illustrates a prior art transparent substrate or light guide which is illuminated by edge lighting, particularly an uncollimated source (LED in this example) is coupled into the edge face of a light guide, S1, separated by an air gap (n1=1.0).

FIG. 5 shows equations used in analysis of a traditional edge-lighting approach for a light guide surrounded by air (n3~1), receiving light into its entrance surface S1 from an air-coupled (n1~1) LED having a lambertian angular distribution. Note that FIG. 5 shows one plane through the window. The light from the LED actually is emitted in a hemisphere comprising rays R1 that would be in and out of the plane of the illustrated flat panel light guide or pane, i.e., out of the page hereof. In the analyses described herein, all calculations are for rays within the plane of the paper. One of skill in the art can determine the effects at other angles out of the plane of the paper.

FIG. 6 illustrates analysis results for a light guide of FIG. 5 having a refractive index, n2, of 1.51. Note that the light rays (for all angles) reflect off the sidewall surfaces S2 and S4 via total internal reflection (TIR). However, all angles also exit surface S3, opposite entrance surface S1. Note also that the incident angles (relative to axis AX2) at surface S2, identified as (90−θ2) are restricted to angles between 48.53 and 90 degrees. Further, the critical angle at surface S2, (90−θ2)=a sin(n3/n2)=41.47 degrees, and its complement is (90−41.47)=48.53 degrees. Therefore, for the geometry shown in FIG. 5, it is physically impossible for rays to strike surface S2, relative to axis AX2, between the critical angle and its complement.

Since the rays from the LED, R1, span the entire gamut of ray angles, −90°≤θ1≤90° into S1 (see column 2 in FIG. 6; only positive angles are shown), one can see that for a rectangular slab light guide (i.e., a mall window), light introduced at one end face, S1, will leak out the other end face, S3, unless a reflective material is affixed on or adjacent to S3.

An alternate edge lighting approach would be to optically couple the LED to the edge face, S1, instead of using an air gap. That would introduce all angles within the light guide, and so rays R2 would extend −90°≤θ2≤90°, and so light within a range of angles would leak out of edge faces S2 and S4. For example, for n2=1.51, rays R2 would leak out of face S2 for θ2>48.53°; i.e. the incident angle at S2 relative to axis AX2, (90−θ2)≤the critical angle, or 41.47°). So, to prevent leakage, reflective tape would then be placed on portions of S2 and S4 starting at point intersecting with face S1, wherein the length of the tape progressively gets longer as the LED moves along edge S1 further away from the intersection with S2 and S4, respectively.

One then might consider partially collimating the LED before optically coupling to the edge face, S1. First, a typical lens would lose its ability to collimate if its curved output face were optically coupled to the edge face S1 (unless the refractive index of the lens was very high in order to maintain the appropriate Δn). A non-imaging approach might work, with the exit face optically coupled to the edge face, S1, and the collimation set θ2<48.53°, which would preclude leakage out of face S2, although not out of S3 unless the incident angle at S3 relative to axis AX7, θ2, is greater than the critical angle or 41.47°. Note that since S2 and S3 are planar surfaces at the angle of incidence, the angles discussed above work the same when reflected about the axis being considered (these can be considered as negative angles). Further, for the ordinary case of a rectangular slab (window), there is a relationship between the critical angle at S2 and that at S3. For example, at S2, there will be TIR for angles (90−θ2)>41.47°, which can be rewritten (90−41.47°)>θ2, and thus θ2<48.53°. At S3, TIR will occur if θ2>41.47°. Therefore, combining both constraints, TIR can occur at both S2 and S3 if 41.47°<θ2<48.53°; i.e. for θ2 between the critical angle at S2 and its complement. However, as stated previously, this range of angles is not possible for that shown in FIG. 5. Finally, note that non-imaging optics (when used with a multi-lumen LED) would have a length that may interfere with existing structures in retrofit applications, and might require additional spacing between adjacent mall glass windows in new installations (or require wider window frames for a given size exterior window). The length of the optic would scale with smaller LEDs (see general discussion of non-imaging optics in U.S. Pat. No. 5,971,551 noting that a collimator is but a concentrator in reverse), but then many more LEDs would be required to achieve the same number of lumens, all else being equal.

Second, the natural compression of angles once inside the light guide, in the edge lighted air-gap approach, $-41.47° \leq \theta 2 \leq 41.47°$ (for n2=1.51, typical for glass) limits the spread of light through from the point of entry at face S1 (see e.g., FIG. 17F). Compare this with the omnidirectional spread of the instant invention shown in FIG. 17B. Therefore, for the edge lighted air gap approach, in order to fill the window with light, one would need a substantial number of LEDs along edge face S1. Further, since the span across the window can be rather large (say 4-6 feet for mall glass), then due to losses (absorption, scatter, etc) over that span, one would need to fill the opposing edge face, S3 with LEDs as well in order to provided reasonably uniform light across the window (see e.g., FIG. 17I).

By use of the prism coupling approach hereof, light can be injected at precisely the location(s) on the window where it is needed since it is not restricted to a location at the edges of the window.

Light in the window or light guide may be caused to escape the light guide, rather than being internally reflected. The escape may be caused by some treatment at selected locations on a surface of the light guide. Typical ways used to cause escape may include a film applied to a surface at selected locations, e.g., described in U.S. 2007/0279554 and U.S. Pat. No. 6,171,681, e.g., cling film and electret film, described in U.S. 2004/0043221 (the '221, referenced below). See U.S. Pat. No. 5,319,491, col. 2, line 40-col. 3, line 26, incorporated by reference, which describes additional approaches for coupling light out of a substrate.

For example, indicia on a cling film may be caused to glow, e.g., by a fluorescent substance applied to them when the film is directly mounted to the light guide and the indicia are illuminated by a light source optically coupled to an appropriate optic. Optical coupling occurs between the light guide and the cling film, even without need for an interposed coupling medium between them.

DESCRIPTION OF THE EMBODIMENTS

The following is a description of some embodiments. It is not intended to limit the scope hereof, as other embodiments and arrangements may also achieve the same objective and operate and perform in a similar manner.

As shown in FIGS. 1 and 7, a side-emitting light emitting diode (see e.g., U.S. Pat. No. 6,598,998, filed May 2001, and commercially available e.g., Lumileds P/N LXHL-DW03) is fitted with a special optic which is in the general shape of a thick countersunk flat washer made from clear acrylic or polycarbonate. That assembly is affixed to the face (not to an edge) of a window pane, e.g., via double stick tape such as 3M Scotch brand clear mounting tape, P/N 4010T. This arrangement, which is known as 'prism-coupling', (see, e.g., U.S. Pat. No. 4,545,642) forces light to travel within the window pane as if it were a light guide. Light is thereby trapped within the window pane via total internal reflection. This allows light to be coupled into the face of storefront window (or other transparent substrate), causing the window to act like a light guide and enabling it to perform many of the applications known to use such guides. In the inventor's opinion, the arrangement allows easy coupling to existing, installed windows, whereas traditional edge lighting techniques would require access to the edges of the window, which in many instances would be a costly endeavor. One of skill in the art of light guides would normally have employed edge coupling, not prism coupling; see, e.g., U.S. Pat. No. 6,036,328 (traditional edge lit) and U.S. Pat. No. 6,679,621 (LED with side-emitting lens into clearance holes within a substrate).

LEDs are available from a number of suppliers, including Lumileds, Cree, Seoul Semiconductor, Osram, Nichia, etc. Some of these manufacture LEDs in the UV and violet wavelengths; e.g., Cree UV LEDs, P/N XR7090UVV-L100-0001. The advantage of using UV is that it can excite a larger number of fluorescent colors than could a blue LED (because UV wavelengths are shorter). There are safety concerns when using UV LEDs re: damage to the human eye/skin. The data shows that wavelengths greater than 320 nm are desirable from a safety perspective. By carefully considering the excitation spectra of the fluorescent material before selecting the LED wavelength, one can minimize the safety risk by choosing LEDs with longer wavelengths. Of course other factors need to be considered, such as efficacy, cost, supplier availability, etc, in order to achieve the appropriate balance of safety margin, price and performance.

The LED surface temperature will present a thermal shock to the window and so the coupling method between the LED and the window should introduce a sufficient thermal break to avoid window damage. One such method may be the use of a thick layer of high temperature coupling grease, keeping in mind any modified ray distributions from the LED when passing through the grease, such as that due to bubbles in the grease and the expanded area of the grease compared to the LED. Another may be to interpose a layer of shock-resistant glass (e.g., borosilicate) whose optical properties are consistent with the application (e.g., wavelength transmittance, low haze, etc.). In both instances, the heat from the LED is preferentially conducted away from the window (to a thermally bonded heatsink), thereby lowering the surface temperature of the LED and minimizing the thermal shock to the window, especially important when the window has thermally stabilized at a low temperature (e.g., uninsulated window pane during a cold winter day) where a thermal shock (from the concentrated heat load of the LED) might cause the window to crack.

Light can be extracted from any point or area or the window by applying to the window something that scatters light that impinges on it. For example, as shown in FIG. 13, one may write on the window with a fluorescent marker (see extraction feature EF1), such as those used with illuminated menu boards in restaurants (e.g., P/N WO2000MKR4 from International Patterns) or affix a window film (see WF1) with computer-printed graphics (with the appropriate light scattering ink or diffusing feature, EF2, such as matte finished Scotch™ tape) or simply abrading the surface (EF4), or even procure windows that have scattering features embedded therein (EF3). The Detailed Description hereof shows other techniques. Some other known techniques are described in the Background section hereof.

In addition to windows, it is contemplated that the invention can be used with signboards, tabletops, mailboxes, glass doors, toys, etc., that is any object which acts as a light guide. A table is set forth below indicating standard rural mailbox dimensions for various sizes and series of rural mailboxes, the letters representing the dimensions corresponding to the letters appearing in FIG. 20B-1.

| | | A | B | C | D | E | |
|---|---|---|---|---|---|---|---|
| E11 Series | Standard (T1) Size | 8.75 | 6.75 | 19.00 | 5.38 | 10.60 | in |
| E16 Series | Large (T2) Size | 10.88 | 8.50 | 20.25 | 6.63 | 13.35 | in |
| ST20 Series | Jumbo (T3) Size | 15.00 | 11.50 | 23.50 | 9.25 | 18.06 | in |
| | Standard (T1) Size | 222.25 | 171.45 | 482.60 | 136.53 | 269.31 | mm |
| | Large (T2) Size | 276.23 | 215.90 | 514.35 | 168.28 | 339.13 | mm |
| | Jumbo (T3) Size | 381.00 | 292.10 | 596.90 | 234.95 | 458.83 | mm |

FIG. 20B-2, which shows a flattened view of a T2 size mailbox, indicates that the mailbox shown includes two 4.25"×20.25" seasonal/personalized decal areas 72, two PT15-150 flexible solar cells connected in parallel 74, a window decal 76, a laminated extraction film 78, a reflector film 80, and an LED/prism 82. The window decal can be non-coupling (e.g., cling-type or low index coupled). The window decal can also be coupled (e.g., back-side water coupled with front-side scattering ink, or back-side coupled via selectively placed adhesive dots with front-side scattering ink). Both the laminated extraction film and the reflector film can optionally be provided with a coupled decal. It should be noted that the front-side scattering ink can also work in sunlight; the ink can be a combination of white, fluorescent, and colored materials. Areal density of the ink and/or the coupling materials can be distributed to ensure uniform illumination, (both in sunlight and when the LED is illuminated). Any suitable ray trace program, such as Lighttools from Optical Research Associates, can assist in the design. Such computer assisted designs can provide a marketing edge in the sale of decals. It should also be noted that the curvature of the mailbox will cause rays from the LED/prism to alter their angular properties, and, thus, should be considered in an overall design of the optical approach (refractive indices, prism dimensions, LED collimations, etc.) which can be optimized by any suitable ray trace program. The LEDs can be integrated within the glass clamps that support the window or signboard (e.g., from CR Laurence and NovaDisplay, respectively), or some other feature (e.g., the support for a rural mailbox flag). Alternatively, they can be supported by a window decal (similar to the half-baseballs in the fake broken-window decals, and optically coupled using e.g., water). Window decals can also be laminated.

Some or all of the extraction features can also scatter light and/or glow in response to external light sources such as the sun, a spotlight, etc such that the LEDs might be used only at night, or might be illuminated continuously and/or pulsed as an accent.

Different wavelength LEDs may be used (UV, visible, IR) and their intensity may can be varied to attract attention within a single window, or may be coordinated between an array of windows e.g., mall storefronts or the facade of a high-rise or be otherwise disposed on the window(s).

The LEDs can be flashed on-and-off in order to act, in part or in full, as a communication medium via extraction patterns on the window. For example, in a mall-setting, one store's window can communicate with another's, thereby providing wireless links to coordinate special effects, further enhancing the retrofit opportunities. As is well known in the art, the LEDs can be flashed at high frequencies unperceivable by the human eye.

As more extracting features are placed across a window, more LEDs coupled at one location to the surface of the substrate or coupled at several locations across the substrate surface may be necessary to maintain a consistent brightness level, all other things being equal.

In order for the light from the LED to travel across the span of the window, the window material must be very clear and have high light transmission. Altuglas International's Plexiglas MC, an acrylic sheet, rated highest for visible light transmission ($T_{vis}$) among available windows (glazing), followed by low-iron glasses such as PPG's Starphire and Pilkington's Optiwhite. For optimal transmittance of UV light in a plastic sheet, Spartech's Solacryl SUVT is suitable. In addition to transmittance, other properties must be carefully considered, such as haze, surface finish, impact resistance, and cost. For example, a mailbox was fabricated (by California Quality Plastics Inc.) from a high impact resistant plastic (Acrylite Plus), but the transmittance was lower than one fabricated from Acrylite GP.

Commercially available acrylic sheets (e.g., CYRO Industries' ACRYLITE EndLighten, Altuglas' Elit II, and Lucite International's Perspex Prismex) that are designed to be edge-lighted from a fluorescent lamp, and are known to already have small extraction features precisely distributed across their surface(s) (e.g., via an array of printed dots on their surface; see, e.g., U.S. Pat. No. 4,937,709, filed August-1989) provide uniform illumination. Such a dot pattern may be optimized for use with the instant invention. In fact, there are large-bed inkjet printers that can dispense white ink and it is contemplated that other materials (e.g., micron-sized glass beads and/or fluorescent inks in a UV curable adhesive that matches the refractive index of the window) can be dispensed, silk-screened, etc., and that would cause light to exit the window in a predetermined pattern.

The LEDs require a suitable source of electrical power as is known in the art and these range from simple (continuous DC current) to sophisticated (computer-controls for arrays of LEDs).

The LED power source may be located a distance from the LED. It has been found that microphone cable (manufactured by Mogami) provides excellent flexibility and can handle the typical current (e.g., 700 mA) of a string of high brightness LEDs. Should the LED be placed towards the center of a window, it may be desirable to use very thin wires (LEDs typically require 700 milliamps or less) or transparent conductors (e.g., vacuum deposited layer of Indium Tin Oxide (ITO) on optically clear film) to carry the current to the LED without being obtrusive.

High brightness LEDs typically consume between 1 and 5 watts, and due to their small size require heat sinking. Suitable heatsinks and thermal-grade adhesives & greases can be found from hobbyist parts distributors. One suitable heatsink used was P/N G15275. These heatsinks can also be anodized in different colors and patterns. The LED's anode and cathode leads can be electrically isolated from the heatsink via polyimide tape.

Another approach to thermal management is to use the heatsinking capacity of the end-device. For example, the LED can be thermally bonded to the inside of the glass clamps previously mentioned. CR Laurence P/N Z412BN is cast zinc, and its thermal efficiency vs. aluminum is discussed in "Efficiency and Cost Tradeoffs between Aluminum and Zinc-Aluminum Die Cast Heatsinks". LEDs have also been thermally bonded to aluminum L-shaped extrusions (available from Home Depot) and fabricated into the shape similar to the abovementioned glass clamp. Another embodiment used the twisted (and flexible) aluminum shafts used to support the 'lollipop' style driveway markers (also available from Home Depot). The LED was thermally bonded to one end of the shaft, and the other end was hung from a suction cup attached to a window. It is contemplated that the shaft can be bent into decorative shapes while the heat is transferred along the length of the shaft and dissipated into the air (the shaft advantageously has a cross-shaped cross-section, adding additional surface area thereby enhancing heat dissipation). Heat pipes can also be used.

The optic is placed around the side emitting LED and directs the light into the substrate. As previously mentioned, the initial embodiment was formed in the shape of a thick flat washer with a countersunk interior hole, but made from clear acrylic and polycarbonate (see FIG. 1). Additional embodiments are shown in FIGS. 2 and 4.

Various types of coupling media for filling any gap between the optic that delivers light to the substrate and the substrate have been successfully utilized, including tap water, hair-gel, food-grade grease, Vaseline petroleum jelly, double-stick tape, acrylic based sealant, mineral oil and microscope coupling fluid. Some coupling media, like 3M Scotch-brand double stick tape, can also support the weight of the LED/heatsink assembly. Greases and sealants are especially useful when used with glass clamps as they do not run-off like mineral oil and tap water. The key aspects of this media are its refractive index and its clarity. The index must be high enough so that light can exit the optic and enter the window at the appropriate angles. High clarity ensures high coupling efficiency. Note that other properties of the media also should be considered, such as thickness (vis-à-vis clarity and its effect on the path of light rays), thermal insulation, compliance to accommodate mismatches between the coefficient of thermal expansion between the optic and the window or substrate, adhesion over environmental conditions, ease of removal during servicing or repositioning, and stability under prolonged exposure from ultraviolet light (either from the LED or sunlight). Further, the overall design approach should avoid contributing to excessive stress or strain on the window pane to minimize the risk of breakage (during normal operation, and considering, for example, someone pulling on the device after it is optically coupled to the window).

BRIEF DESCRIPTION OF THE DRAWINGS

FIG. 4 shows reflective optic filled with coupling media with no separate coupling medium layer coupling the reflective optic to the window. However, the LED is shown as being coupled to the window with a separate coupling medium layer.

FIG. 4B shows the reflective optic filled with coupling media and not coupled to the window by a separate coupling medium layer. Furthermore, FIG. 4B shows the LED as not being optically coupled to the window.

FIG. 4C shows both the reflective optic and the LED being coupled to the window by separate coupling medium layers.

FIG. 6 shows analysis results for light guide of FIG. 5 having a refractive index of 1.51. Note that the light rays for all angles reflect off the sidewalls S2 and S4 via total internal reflection (TIR). However, all angles also exit surface S3, opposite entrance surface S1. Note also that the incident angles at surface S2, identified as $(90-\theta 2)$ are restricted to angles between 48.53 and 90 degrees. As discussed previously, for the geometry shown in FIG. 5, it is physically impossible for rays to strike surface S2 between the critical angle, a sin(n3/n2)=41.47 degrees, and its complement, (90−41.47)=48.53 degrees. This physical limitation does not exist for the inventive approach shown in FIG. 7, discussed directly below.

FIGS. 8A and 8B show analysis results for approach in FIG. 7 having a refractive index of 1.51, a prism refractive index of 1.49, and a prism angle, $\alpha$, of 7 degrees. FIG. 8B continues the table shown in FIG. 8A from the bottom of the table shown in FIG. 8A. Note that the light not only TIRs off of side S2 for $\psi=0$ to +90 degrees (see column for $\theta 3$), but much of the higher intensity light also TIRs off of side S3, opposite entrance surface S1, for $\psi=0$ to +20 degrees. This is because incident angles at surface S2, identified as $(90-\theta 2)$ can go as low as 42.09 degrees for $\psi\geq 0$ in the configuration shown in FIG. 7 (as opposed to 48.53 degrees in FIG. 6), and thus there exists a range of incident angles, $(90-\theta 2)$, at S2 between the critical angle, 41.47 degrees, and its complement, 48.53 degrees. The table shows that rays can TIR off of both surface S2 and S3, allowing light to propagate through a rectangular slab light guide (with polished faces for maximum efficiency) until the light has been extracted or dissipated. This is both significant and unexpected, and is further exemplified in FIGS. 9A-11B, wherein TIR is achieved at both S2 and S3 when the incident angle at S2 is between the critical angle and its complement. Finally note that in FIGS. 8A and 8B, the last column in the table identifies that the extreme angles of ψ (25 to 90 degrees) will leak out of surface S3 (and S1), thereby requiring, e.g. a specular reflector on surface S3 (and S1) if these rays must be preserved with the light guide.

FIGS. 9A and 9B show analysis results for the approach in FIG. 7 for a prism angle, α, of 14 degrees. FIG. 9B continues the table shown in FIG. 9A from the bottom of the table shown in FIG. 9A. Note the differences in angles of ψ by which TIR can be achieved at surfaces S2 and S3 (and their opposing faces due to symmetry) when compared to other angles of α.

FIGS. 10A and 10B show analysis results for the approach in FIG. 7 for a prism angle, α, of 21 degrees. FIG. 10B continues the table shown in FIG. 10A from the bottom of the table shown in FIG. 10A. Note the differences in angles of ψ by which TIR can be achieved at surfaces S2 and S3 (and their opposing faces due to symmetry) when compared to other angles of α.

FIGS. 11A and 11B show analysis results for the approach in FIG. 7 for a prism angle, α, of 28 degrees. FIG. 11B continues the table shown in FIG. 11A from the bottom of the table shown in FIG. 11A. Note the differences in angles of ψ by which TIR can be achieved at surfaces S2 and S3 (and their opposing faces due to symmetry) when compared to other angles of α.

FIGS. 13E and 13F show that exemplary mosquito netting can act as an excellent optical isolation layer since the netting has large voids and since the fibers tend to be rounded, only making point contact with the inner layer film, thereby also minimizing the potential for optical contact. The netting is typically polyester. Further, a daytime non-illuminated image may be imparted to the netting if desired, such as via dye sublimation printing, known for its compatibility with polyester. FIG. 13F shows a window cling optically coupled to a window.

In addition to the use of cling vinyl films and electret films, other methods separately or in combination, are contemplated by which the light guide and inner/outer layers of an extraction mechanism can be held in a predetermined spatial relationship (static or relative translation/rotation), such as mechanical fastening, chemical bonding, and forces induced by gravity, magnetism, surface tension, suction, etc. Such methods can be distributed across the surfaces of the layers in periodic/aperiodic fashion. Optical losses may be considered as certain methods will induce haze, absorption or otherwise seemingly lossy attributes. Note that in some instances, what might seem to be a lossy attribute actually imparts a desired effect, aesthetic or otherwise.

It is also contemplated that when there are inner and outer layers, they can be optically isolated (at one or more points) such as a dual pane thermal window, or by such use of air-spaced (or other low refractive index) structures as demonstrated in microstructured adhesives, bubble wrap, corrugated plastic sheets, thermal formed plastic sheets, transparent insulation such as honeycomb structures, placement of an intervening mesh or netting, spacer beads/rods/fibers, printed spacers, foams, adhesive dots, or simply ink dots dispensed using the same ink and inkjet printer as used for the inner/outer layers ensuring a cured dot height sufficient for optical isolation.

The inner layer may be optically coupled to the window (light guide) via an adhesive (continuous layer or distributed over preselected areas), or simply as a function of its smooth surface (cf. the ’221 referenced above) and static cling. Similarly, the inner layer can be optically isolated from the window (light guide) in selected areas by a low index material (e.g., TEFLON) and/or by physical separation to avoid evanescent coupling (e.g., via surface roughness, printed dots, mechanical deformation, etc.).

Light redirecting optical films are known (see e.g., U.S. Pat. No. 7,090,389). It is contemplated that these structures, or derivatives thereof, can be optically coupled to the surface of a window in order to redirect light within the window to guide it more towards an area of interest.

Figure 7:
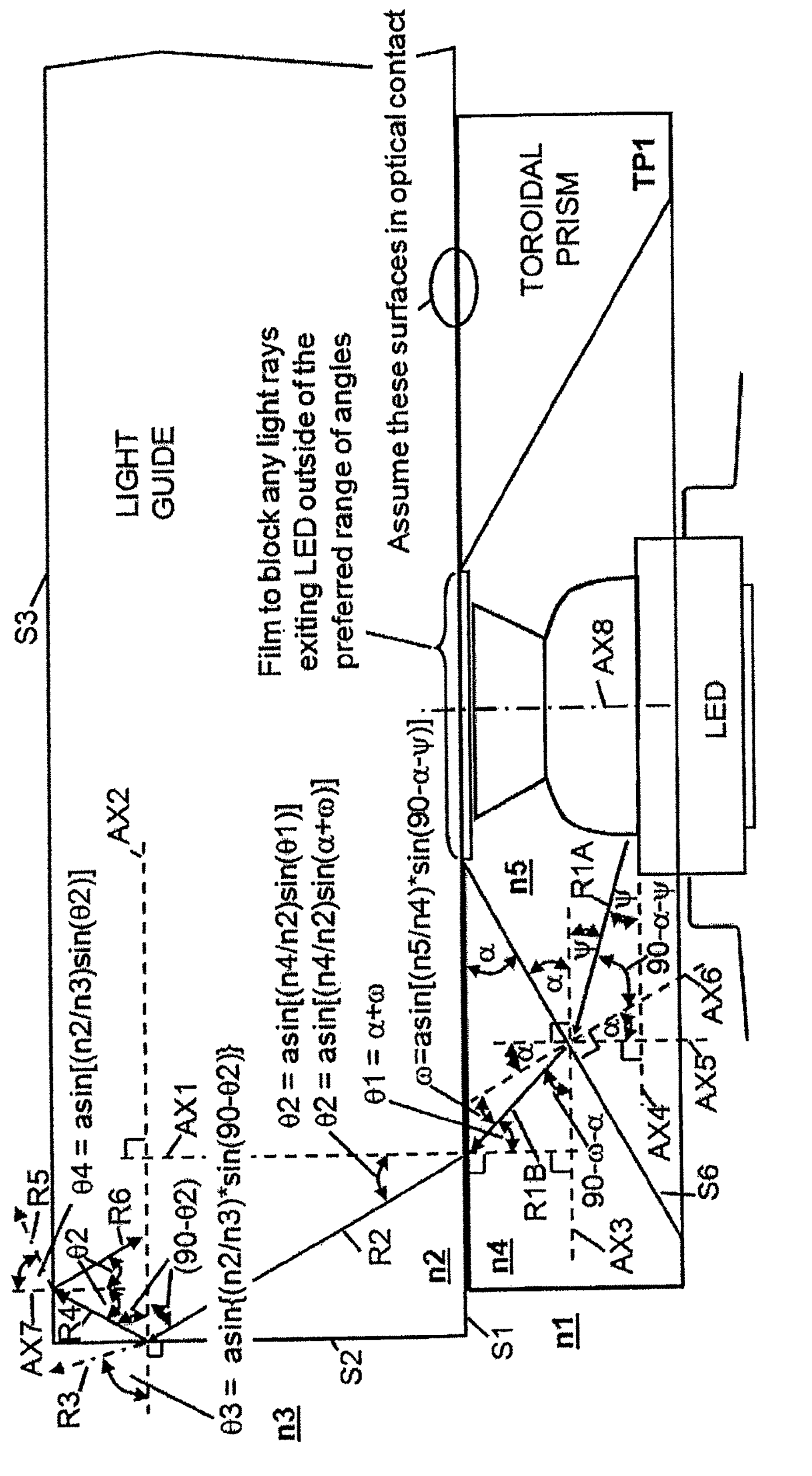
FIG. 7 shows equations used in analysis of prism-coupled approach for a light guide, receiving light into its entrance surface S1 from a side-emitting LED having, such as those available from Lumileds. Note that the angular distribution chart from Lumileds shows a small proportion of the light exiting the LED in the vertical direction (corresponding to 0 degrees on the chart), and the amount gets progressively higher as the angle gets closer to 90 degrees on either side of the vertical axis. Therefore, $\psi=0$ degrees on the drawing corresponds to +/−90 degrees on the Lumileds chart, and is so-annotated.
Figure 14:
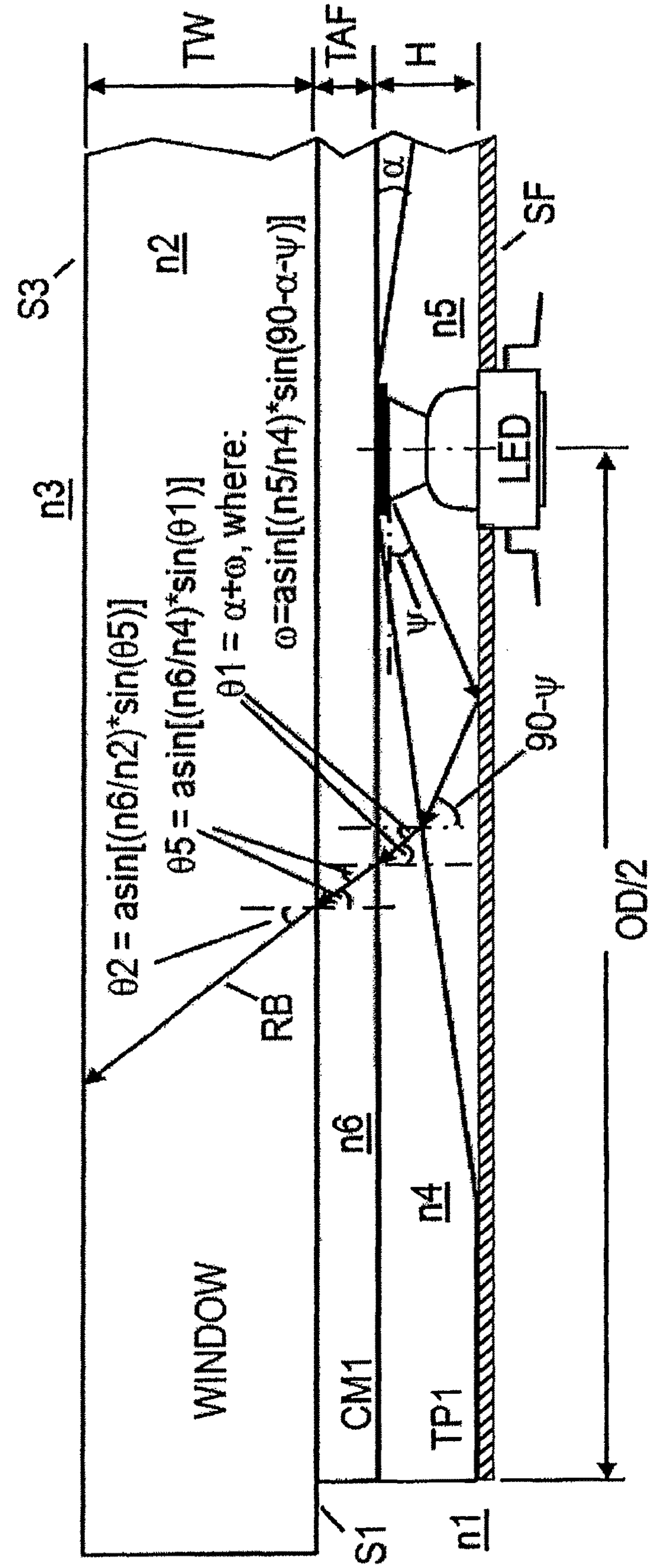

FIG. 14 shows equations used in analysis of prism-coupled approach for a light guide, similar to that shown in FIG. 7, except a coupling material, CM1, of refractive index n6, is included in the analysis.

Figure 1:
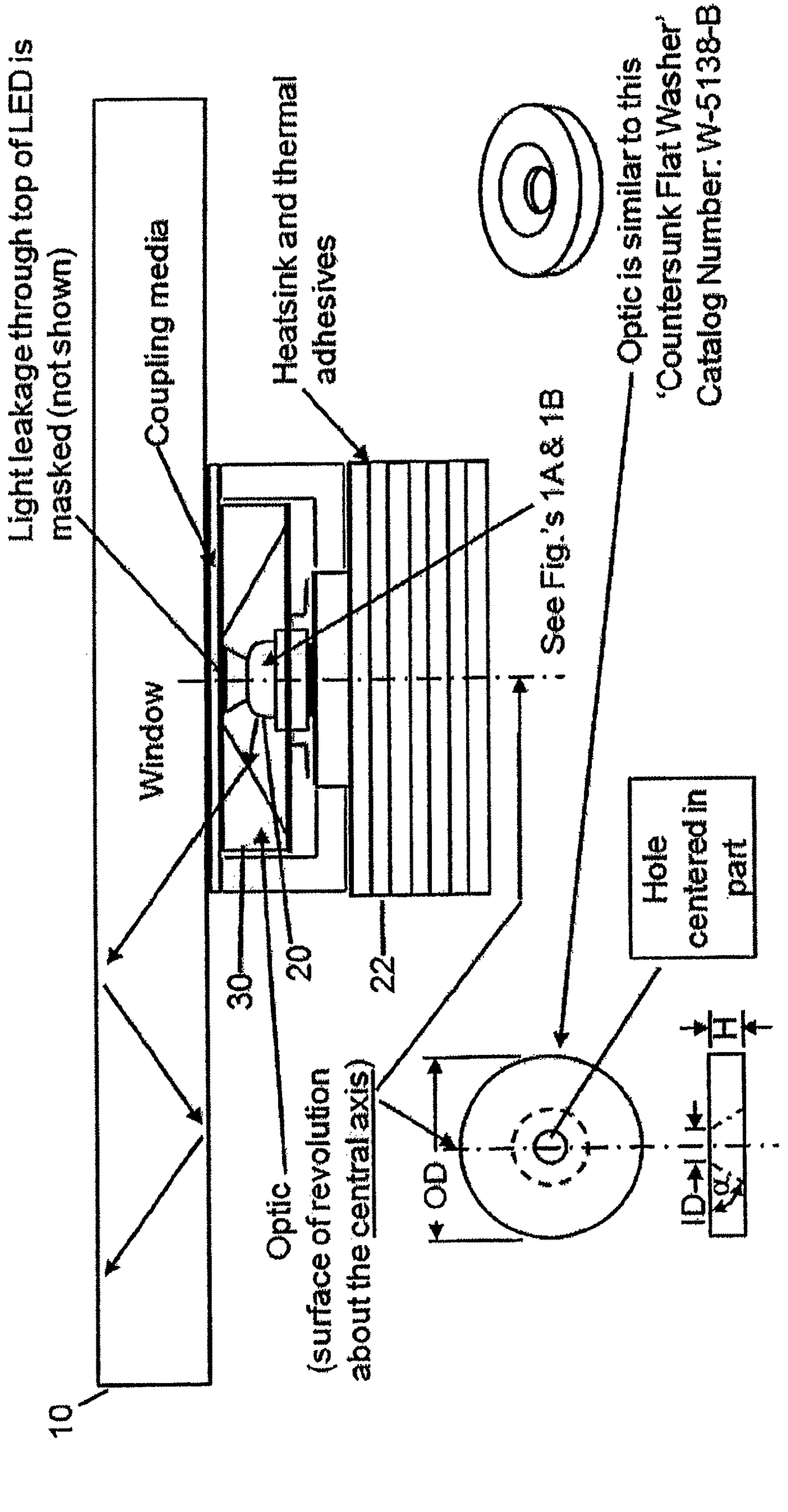
FIG. 1 shows orthogonal views of a toroidal prism, and its location in an end-application that utilizes a side-emitting LED.
Figure 1A:
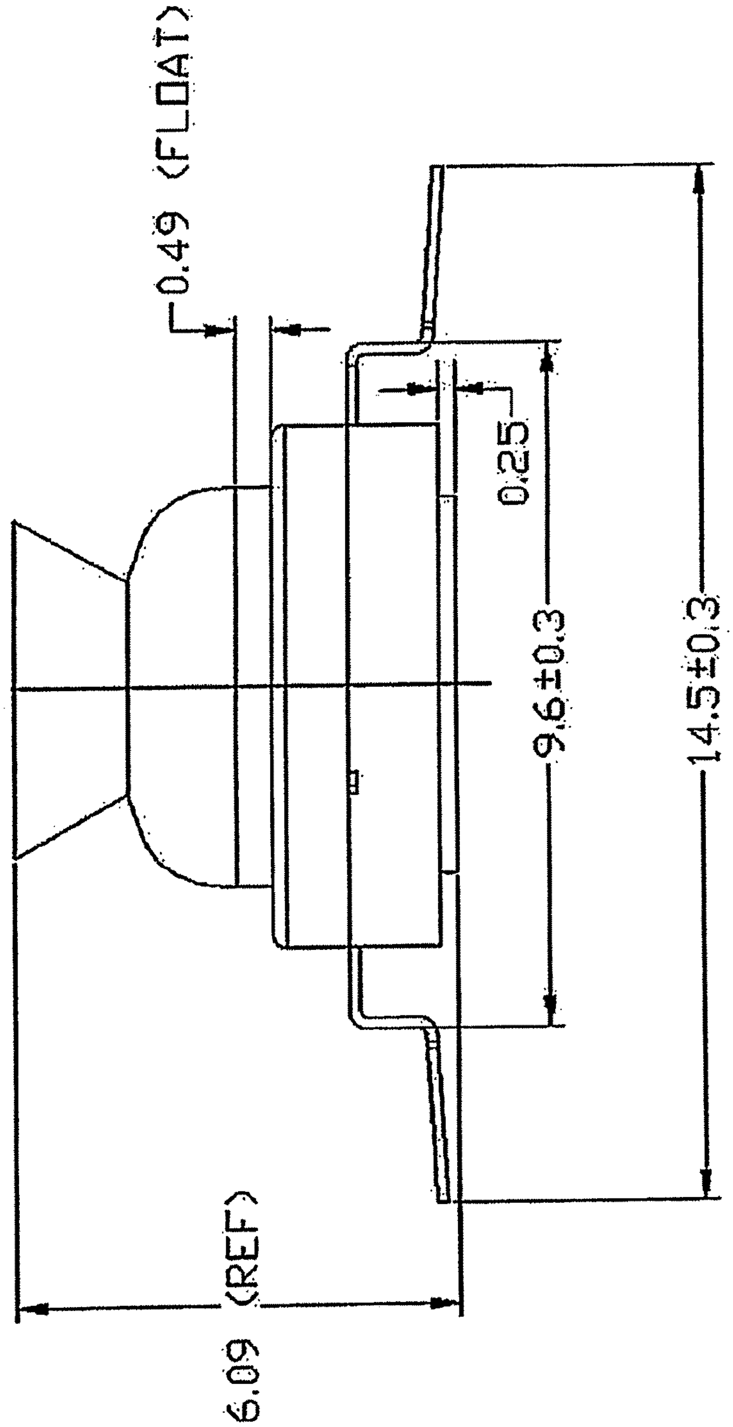
FIG. 1A is an enlarged elevation view of the side-emitting LED shown in FIG. 1, which is a Luxeon III side-emitting LED.
Figure 1B:
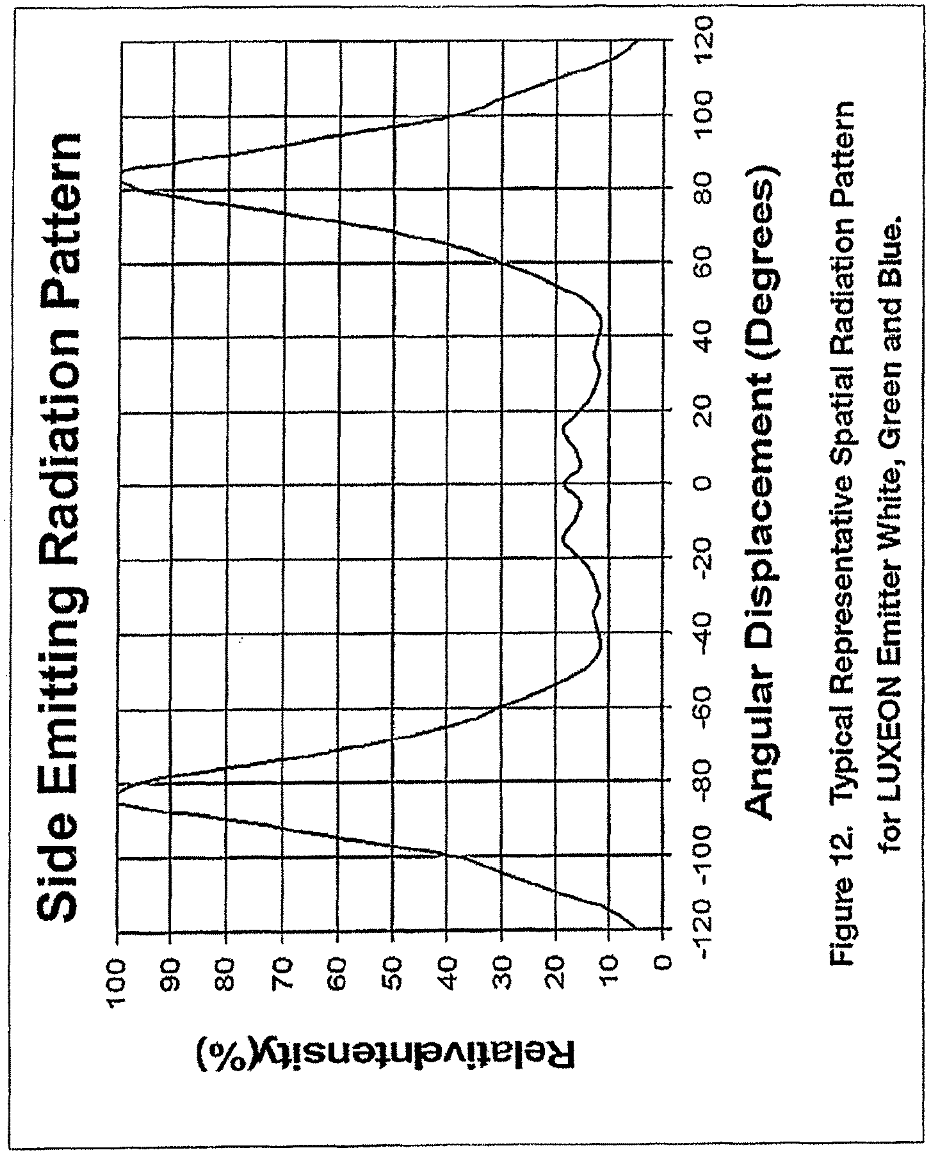
FIG. 1B is a graph of a typical spatial radiation pattern of the side-emitting LED shown in FIG. 1A.
Figure 2:
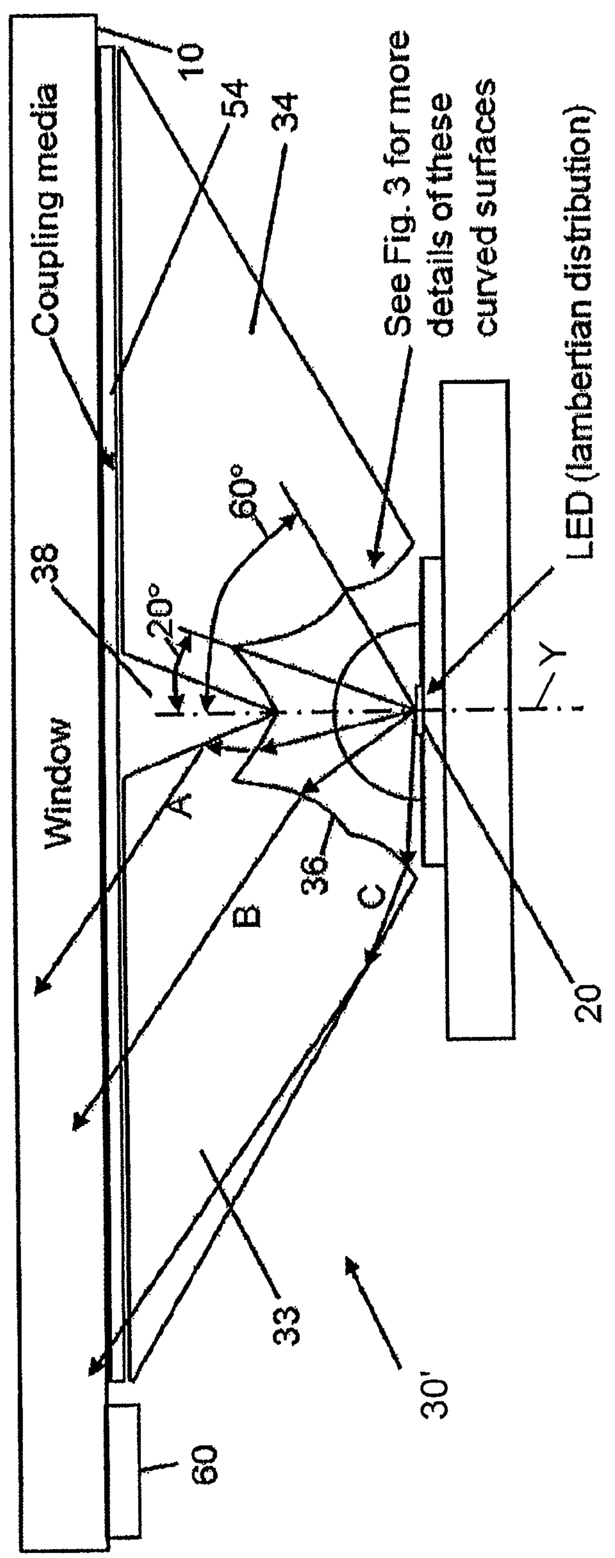
FIG. 2 shows a prism symmetrical about an axis central with respect to the prism specifically designed for use with a LED having a lambertian angular distribution.

FIGS. 15A-1 and 15A-2 show the influence on the refractive indices of a first material (e.g., prism) and a second material (e.g., coupling material) to determine whether light rays of a given incidence angle at the boundary between the materials will TIR. Steps 1 through 3 are described on the Figures. FIG. 15A-2 continues the table shown in FIG. 15A-1 from the bottom of the table shown in FIG. 15A-1.

Figure 3:
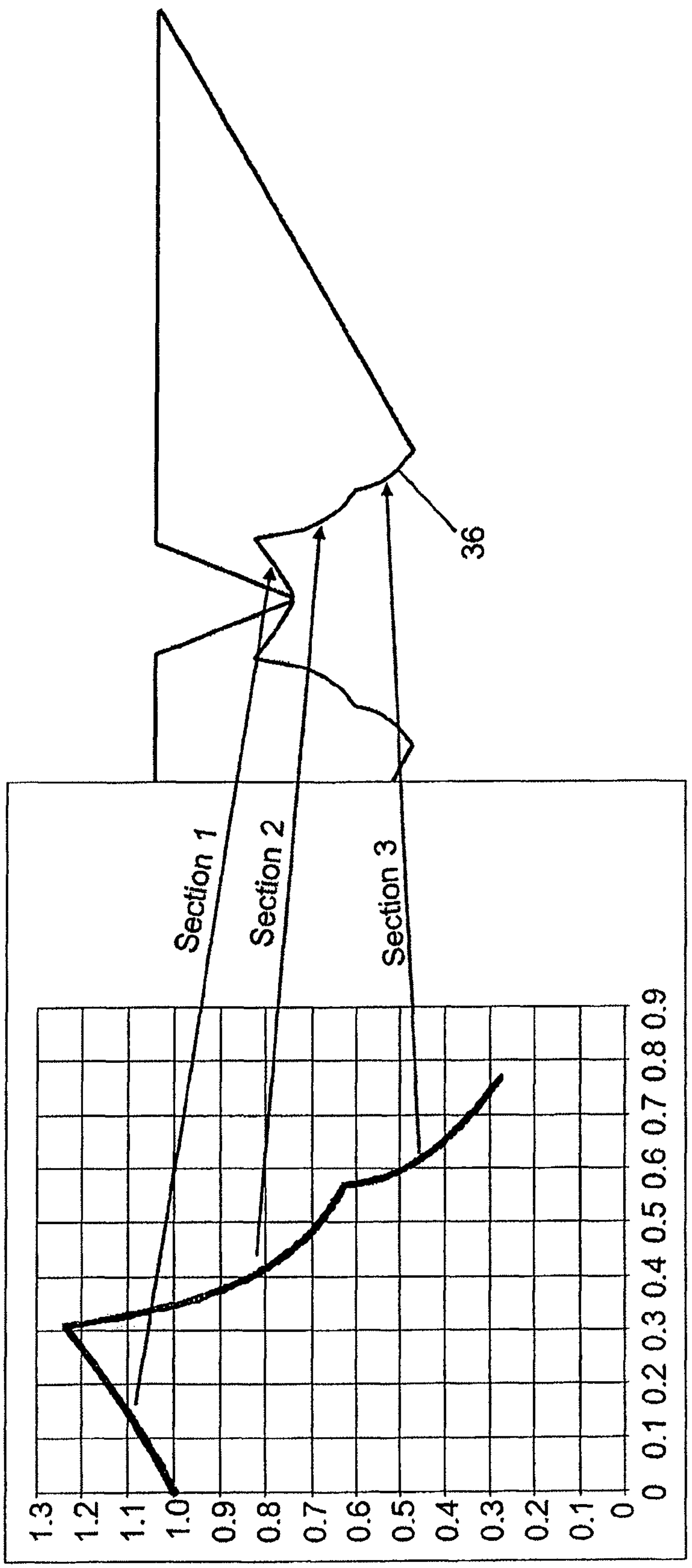
FIG. 3 shows the x-y coordinates of the curvature of the optical surface of the prism in FIG. 2.
Figures 3, 15B:
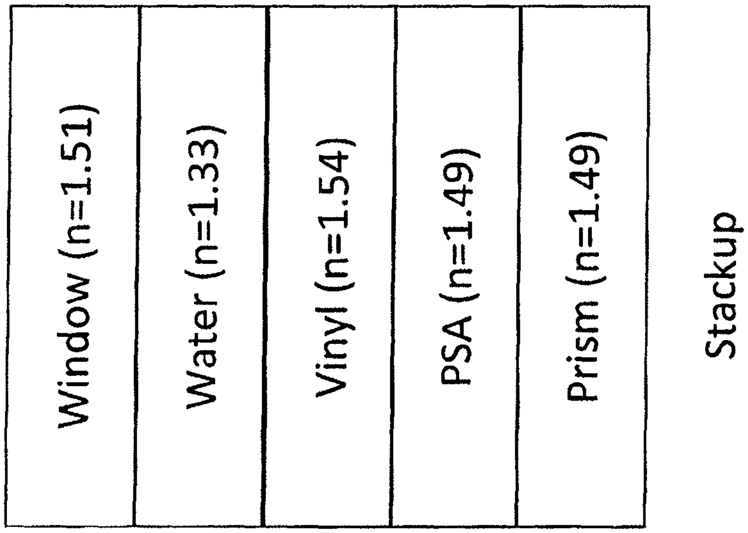

FIGS. 15B-1 and 15B-2 provide an analysis of the relative angles when a vinyl window film is deployed in the stackup arrangement shown in FIG. 15B-3. Note that the analysis of water coupling is referenced in FIG. 15A-2 (step 4). FIG. 15B-2 continues the table shown in FIG. 15B-1 from the bottom of the table shown in FIG. 15B-1.

Figure 16:
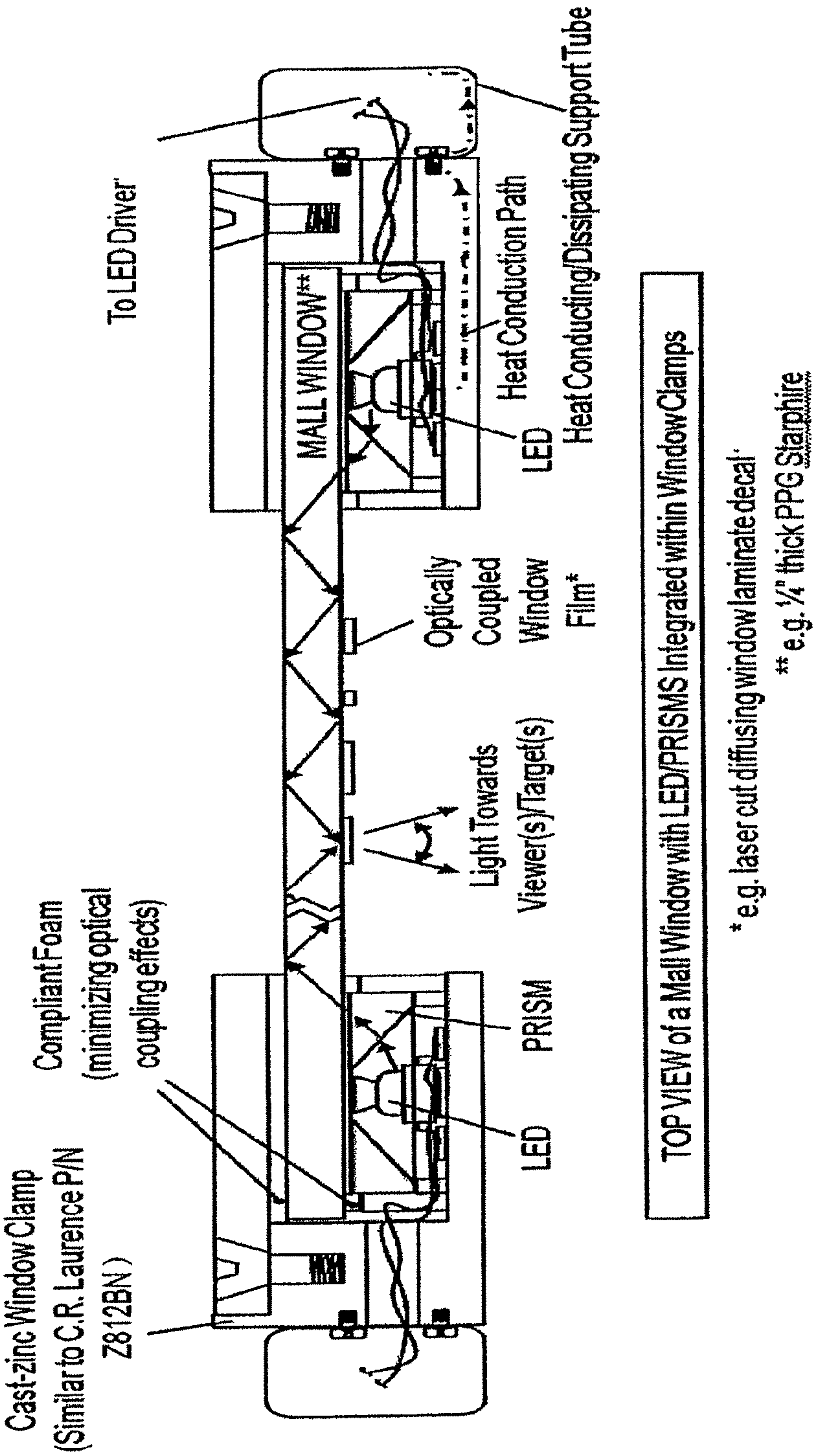

FIG. 16 shows detailed cross-sectional view of a mall window application, with prisms and LEDs integrated into window clamps.

Figure 17A:
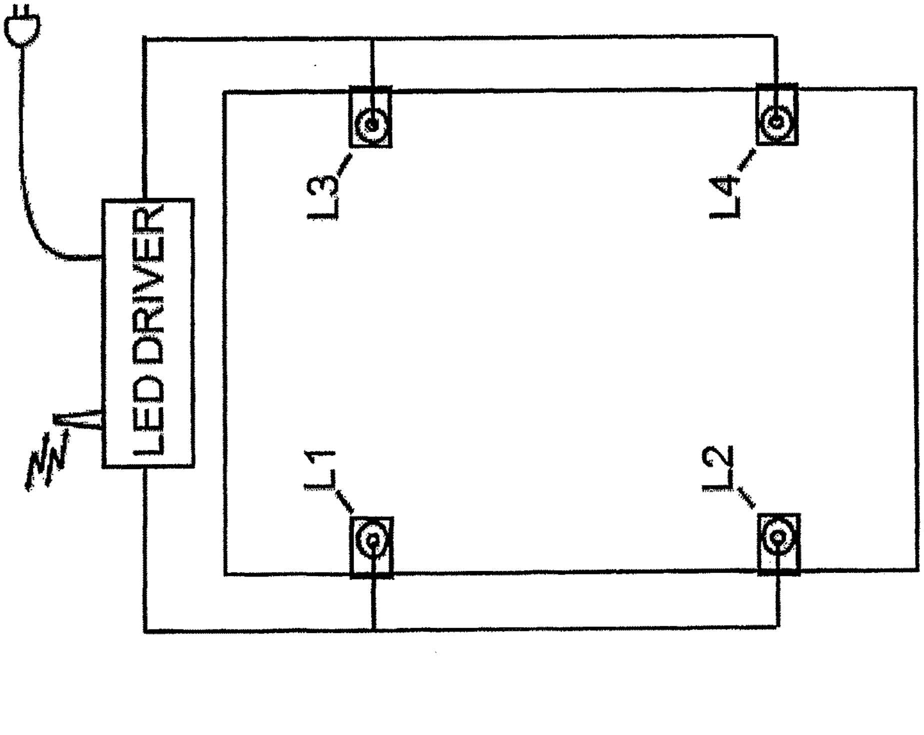

FIG. 17A shows a front view of a mall window in FIG. 16, also showing a LED driver, with a wireless communications link to a remote PC, which can be used to control the intensity vs. time profile of the LEDs. In one exemplary embodiment, the profile is coordinated between a plurality of windows (and other sources of light and sound).

FIGS. 17B-17E show front views of four adjacent mall windows, each with a unique number of LEDs illuminated using prism coupling.

FIGS. 17F-17I show front views of four adjacent mall windows, each with a unique number of LEDs illuminated using traditional edge coupling.

FIGS. 18A-1, 18A-2, 18A-3, 18A-4, 18B-1, 18B-2, 18B-3, 18B-4, 18C-1, 18C-2, 18C-3, 18C-4, 18D-1, 18D-2, 18D-3, 18D-4, 18E-1, 18E-2, 18E-3, 18E-4, 18F-1, and 18F-2 show x/y coordinates (and intermediate calculations) of the surface profile shown in FIG. 3. Each of FIGS. 18A-2, 18B-2, 18C-2, 18D-2, 18E-2, and 18F-2 continues the table shown in FIGS. 18A-1, 18B-1, 18C-1, 18D-1, 18E-1, and 18F-1, respectively, from the right side of the table shown in FIGS. 18A-1, 18B-1, 18C-1, 18D-1, 18E-1, and 18F-1, respectively. Each of FIGS. 18A-3, 18B-3, 18C-3, 18D-3, and 18E-3 continues the table shown in FIGS. 18A-1, 18B-1, 18C-1, 18D-1, and 18E-1, respectively, from the bottom of the table shown in FIGS. 18A-1, 18B-1, 18C-1, 18D-1, and 18E-1, respectively. Each of FIGS. 18A-4, 18B-4, 18C-4, 18D-4, and 18E-4 continues the table shown in FIGS. 18A-2, 18B-2, 18C-2, 18D-2, and 18E-2, respectively, from the bottom of the table shown in FIGS. 18A-2, 18B-2, 18C-2, 18D-2, and 18E-2, respectively, and each of FIGS. 18A-4, 18B-4, 18C-4, 18D-4, and 18E-4 continues the table shown in FIGS. 18A-3, 18B-3, 18C-3, 18D-3, and 18E-3, respectively, from the right side of the table shown in FIGS. 18A-3, 18B-3, 18C-3, 18D-3, and 18E-3, respectively. Note that other profiles than that shown in FIG. 3 are contemplated, and are influenced by the material properties discussed herein, and tradeoffs imposed by design constraints (e.g., size vs. coupling efficiency, etc).

Figure 19A:
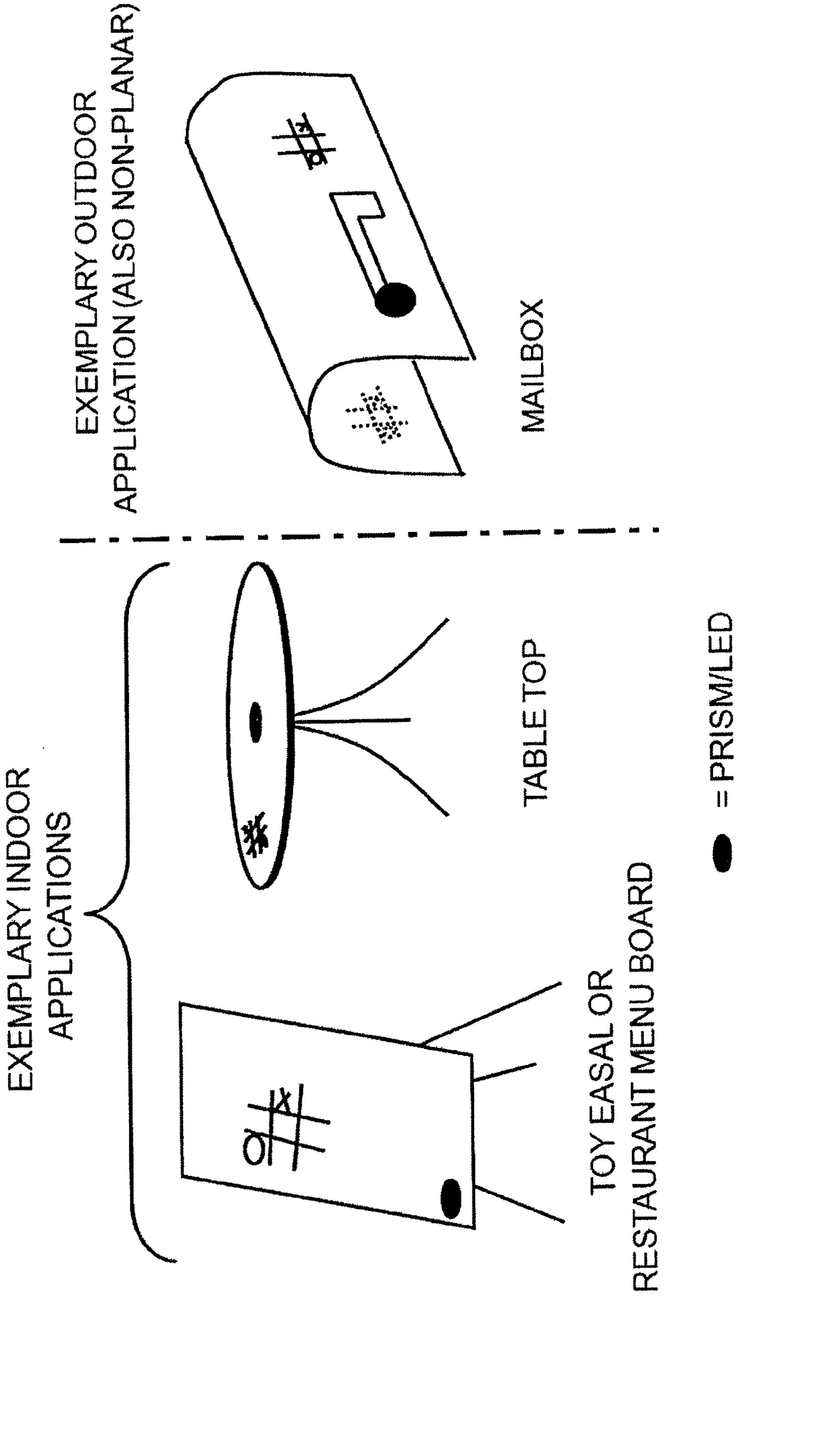
Figure 19B:
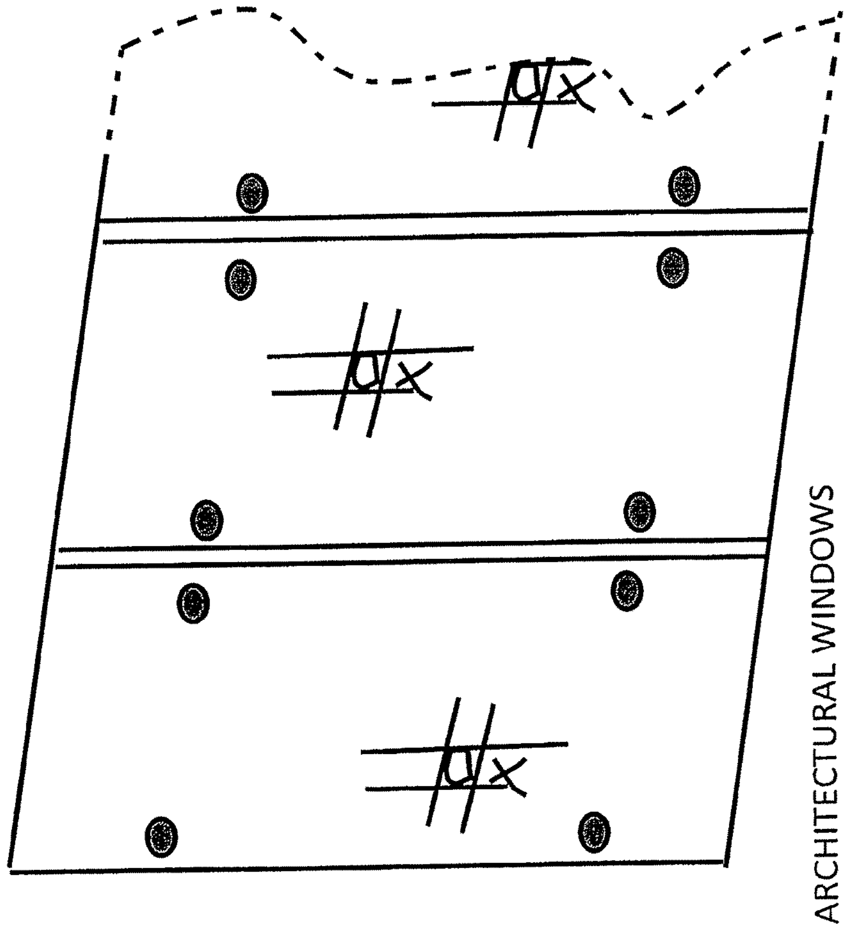

FIGS. 19A and 19B show objects illuminated with the instant invention, detailing a variety of indoor and outdoor applications. Note that the tic-tac-toe annotations on each object indicate where the light is extracted. Note that the mailbox is a formed sheet of a transparent polymer.

Figures 2, 20A:
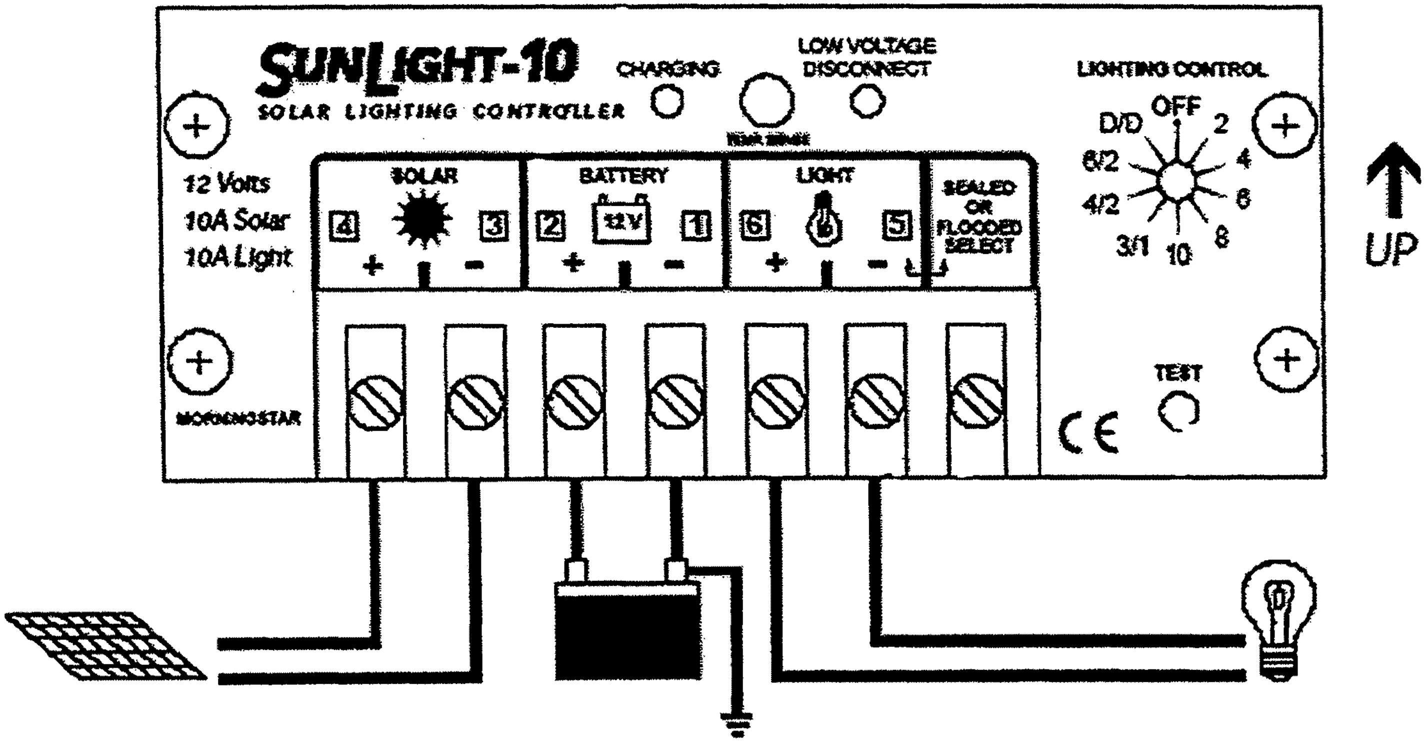
Figures 1, 20B:
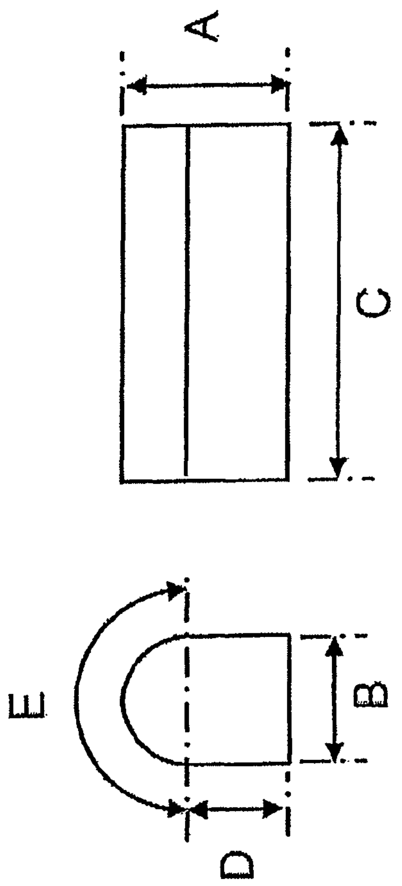
Figures 2, 20B:
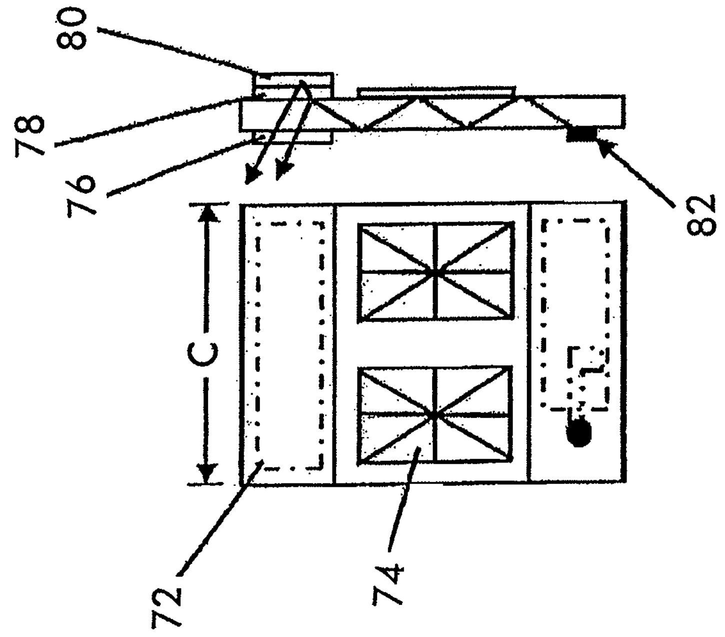

FIGS. 20A-1 and 20A-2 show an exemplary flexible solar-cell and an exemplary solar-cell based light controller, respectively, for use in a remote mailbox application further detailed in FIGS. 20B-1 and 20B-2.

FIG. 20B-1 shows a rural mailbox with representative dimensions shown thereon. FIG. 20B-2 is a large size mailbox shell in a flattened condition in order to detail the position of various elements as detailed in the drawing.

Figure 21B:
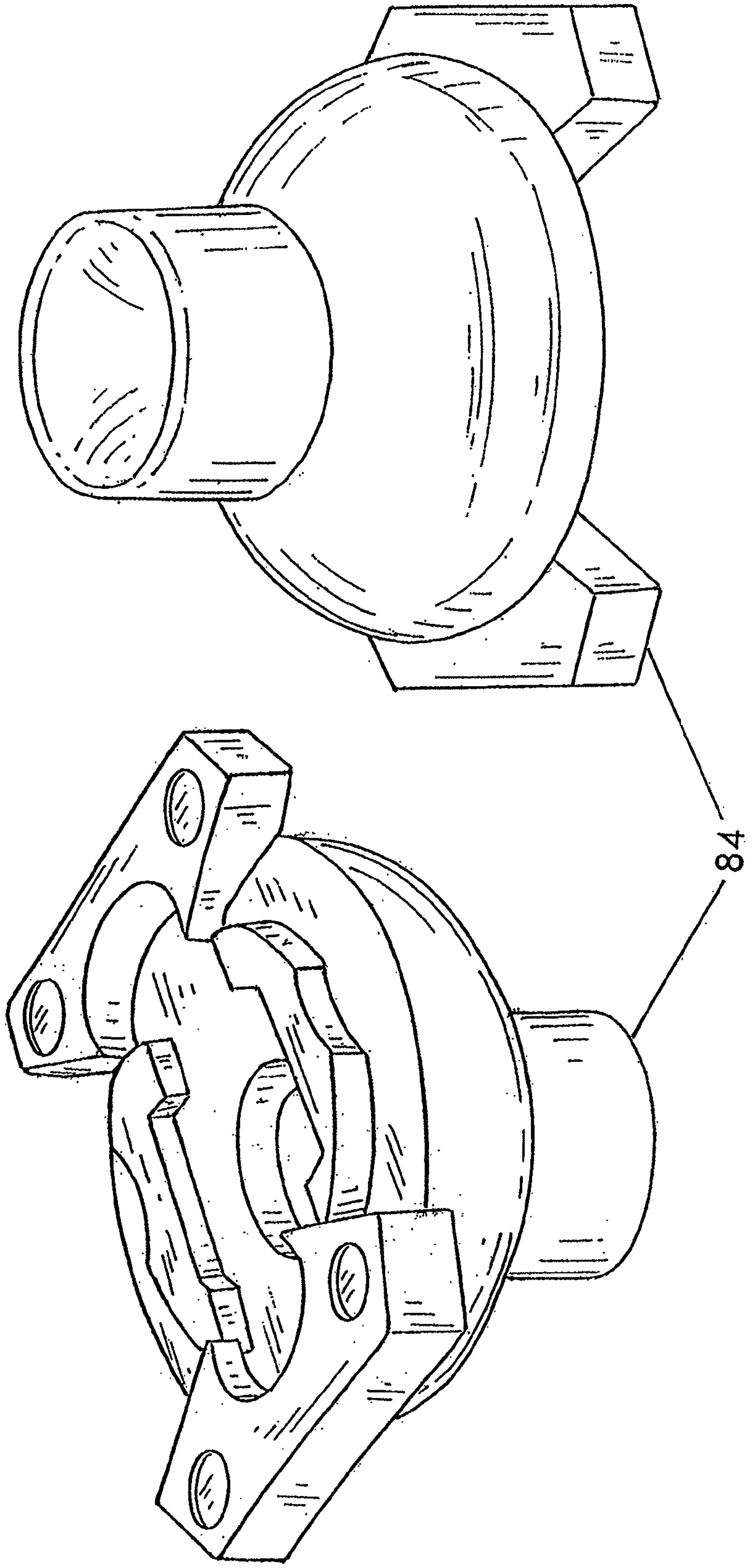
Figure 21C:
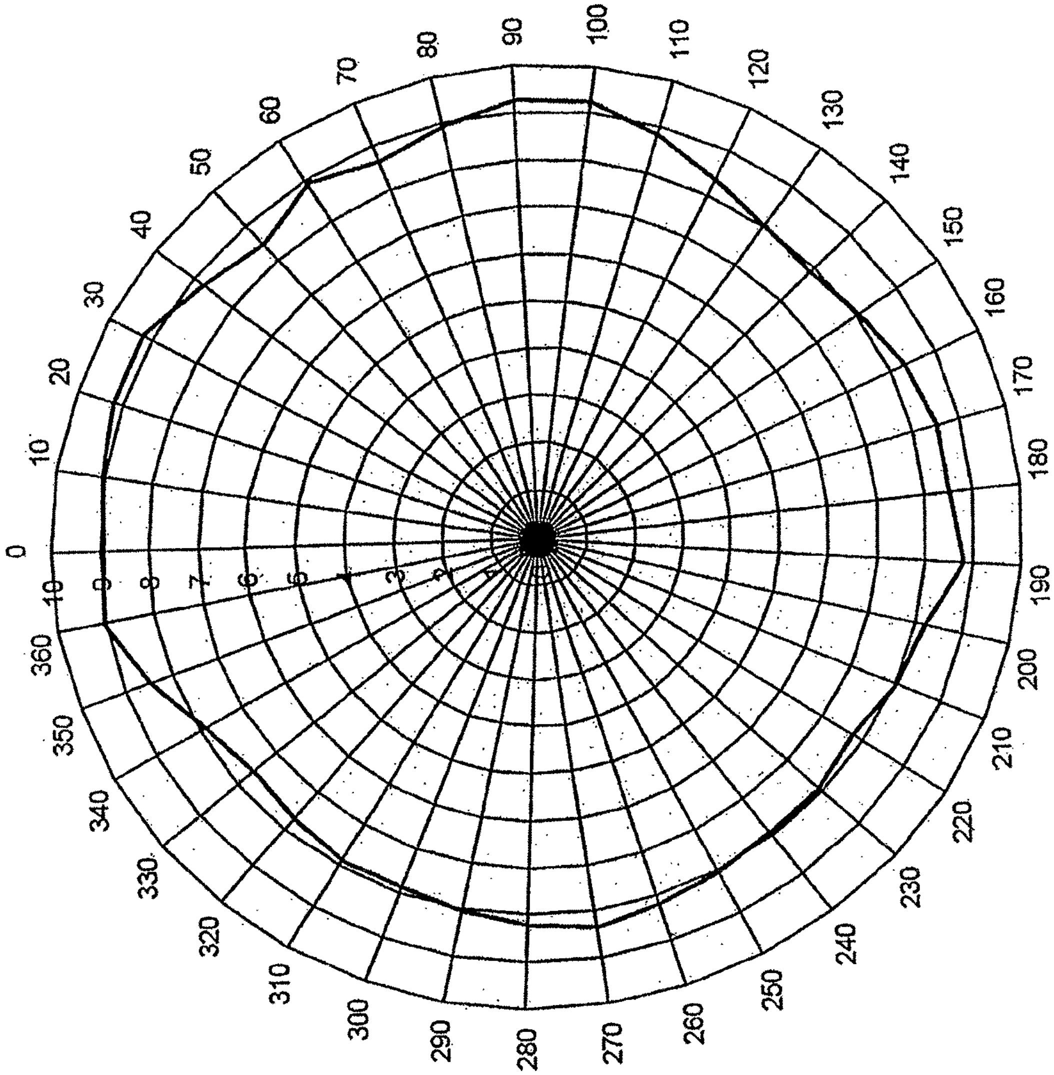
Figure 21D:
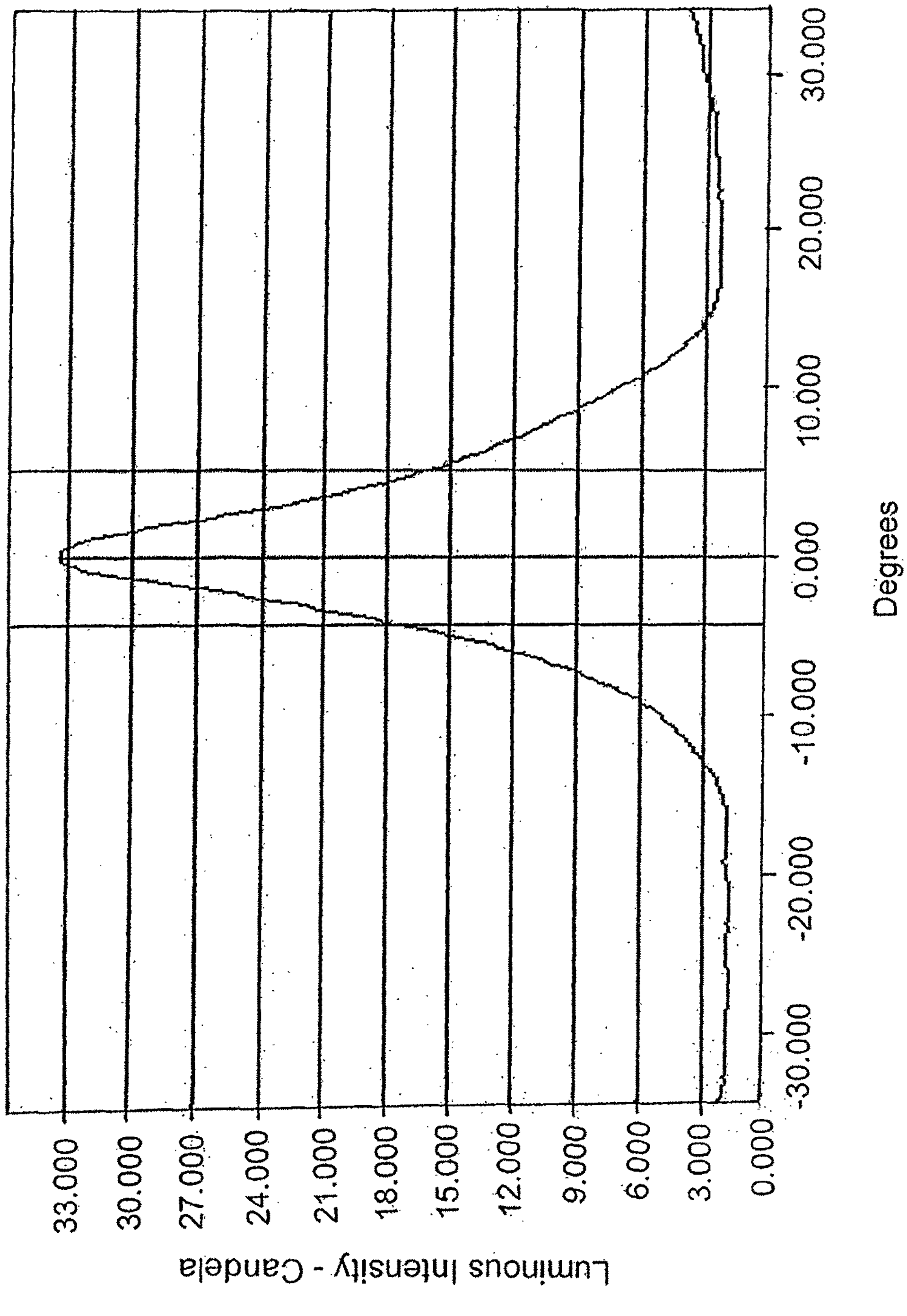
Figure 22A:
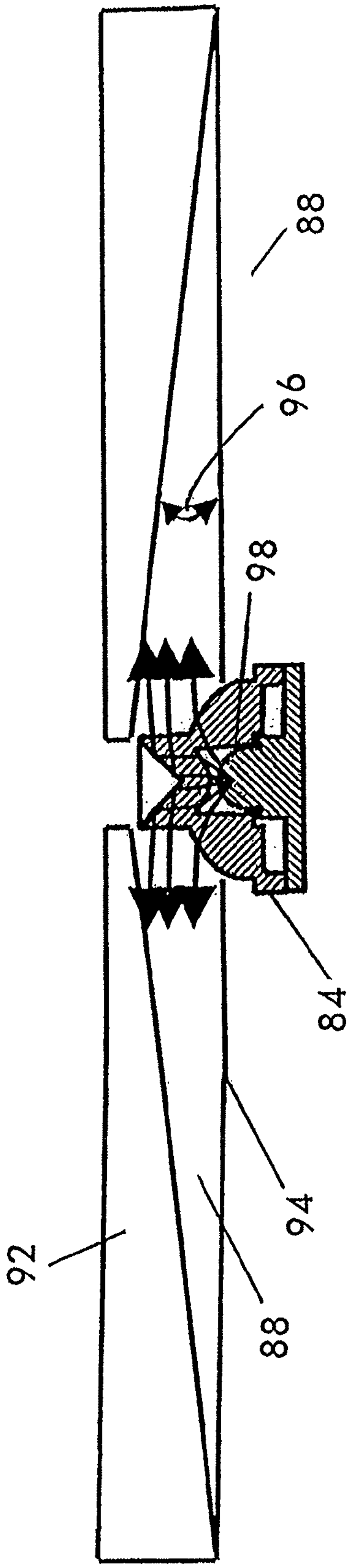
Figure 22B:
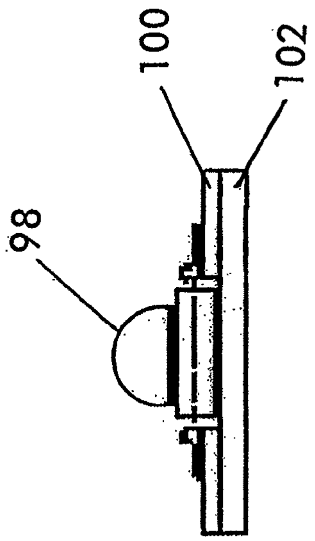

FIG. 21A shows the use of a commercially available secondary lens for LEDs that converts a lambertian distribution into a side-emitting distribution. FIG. 21B shows enlarged perspective views from the bottom and the top of the commercially available secondary lens for LEDs. FIG. 21C shows a plot of the full width at half maximum (FWHM) divergence versus side emitter rotation angle (azimuthal) for the commercially available secondary lens for LEDs shown in FIGS. 21A and 21B. FIG. 21D shows the luminous intensity in Candela (Cd) at a side emitter rotation angle of zero degrees azimuth for the commercially available secondary lens for LEDs shown in FIGS. 21A and 21B. The minimum luminous intensity shown in FIG. 21D is 1.592 Cd, the maximum luminous intensity shown in FIG. 21D is 33.4 Cd, the average luminous intensity is 6.55 Cd, and the FWHM in FIG. 21D is 8.95 degrees. FIG. 22A shows the use of the commercially available secondary lens for LEDs that converts a lambertian distribution into a side-emitting distribution for use by a toroidal prism. FIG. 22B is an enlarged view of the LED and its mounting shown in FIG. 22A.

Figure 23A:
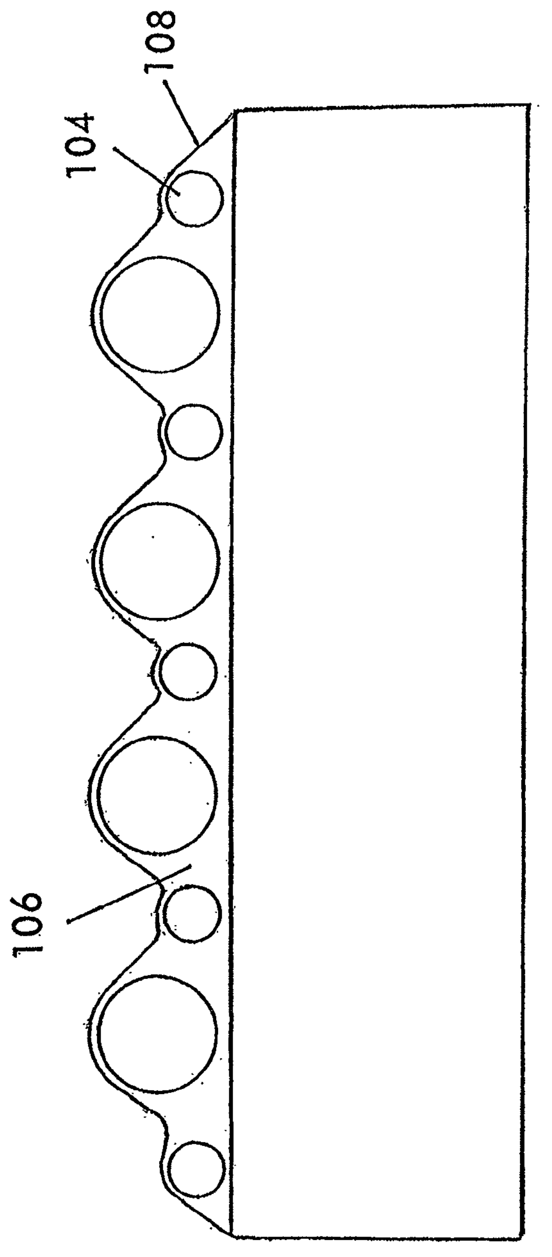

FIG. 23A shows a prior art diffusing film comprising resin particles in a binder. As the resin dries, it forms an undulating surface, following the contours of the bead-like particles.

Figure 23B:
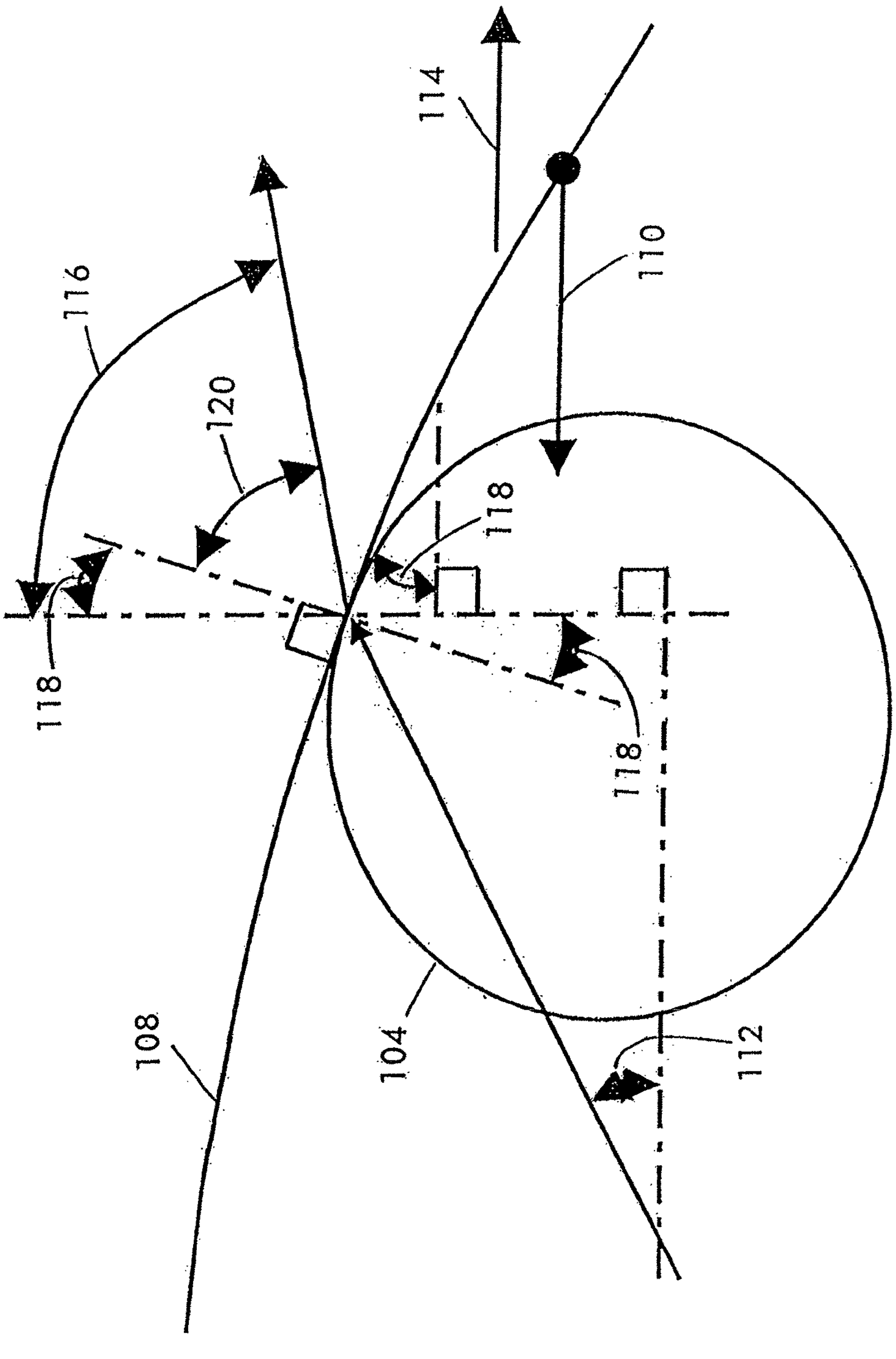

FIG. 23B provides a first order optical analysis of the effects of the diffusing film in FIG. 23A when receiving light at an angle of δ (relative to the horizontal axis shown) via a window (not shown).

Figure 24A:
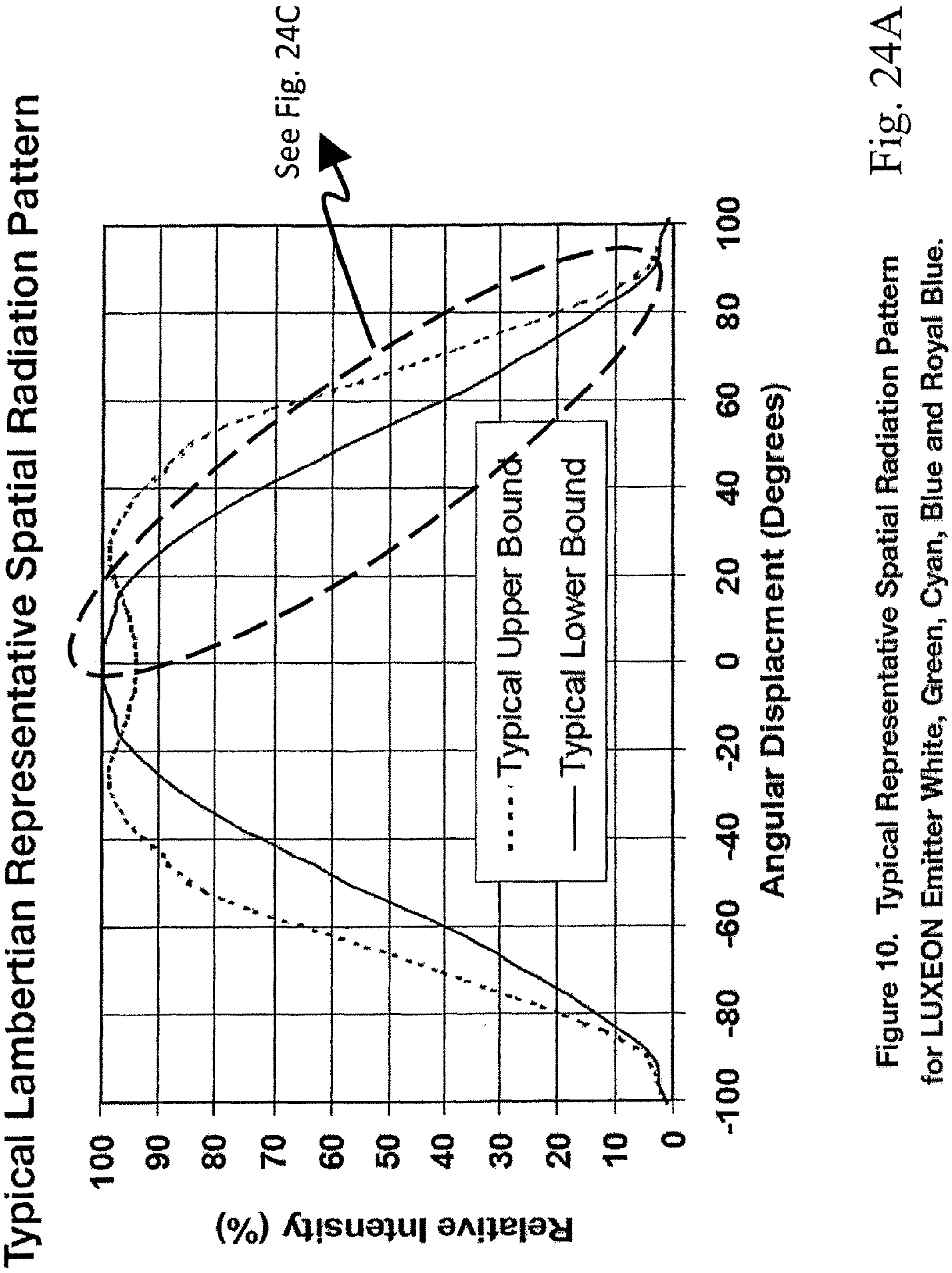
Figure 24B:
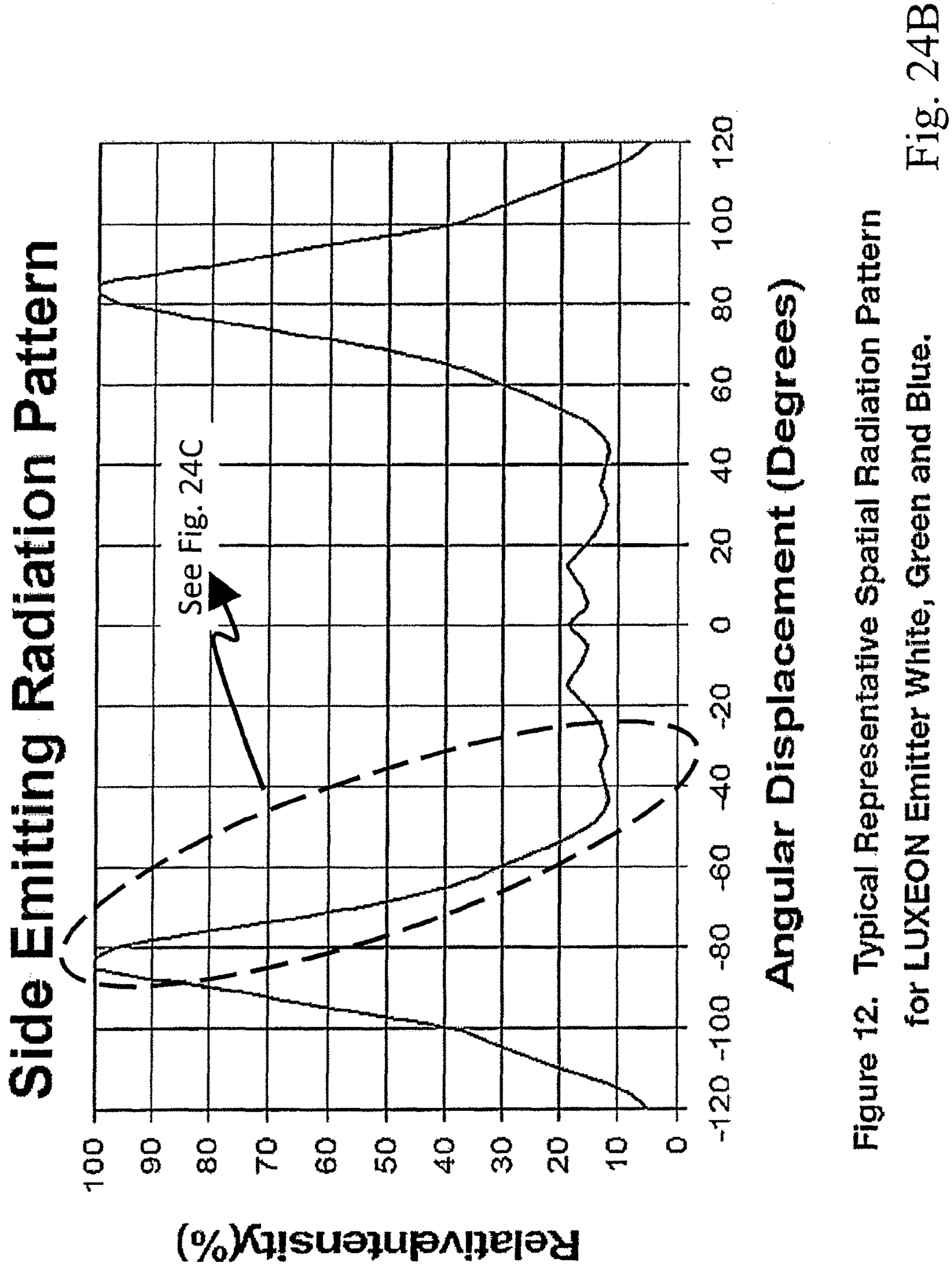
Figure 24C:
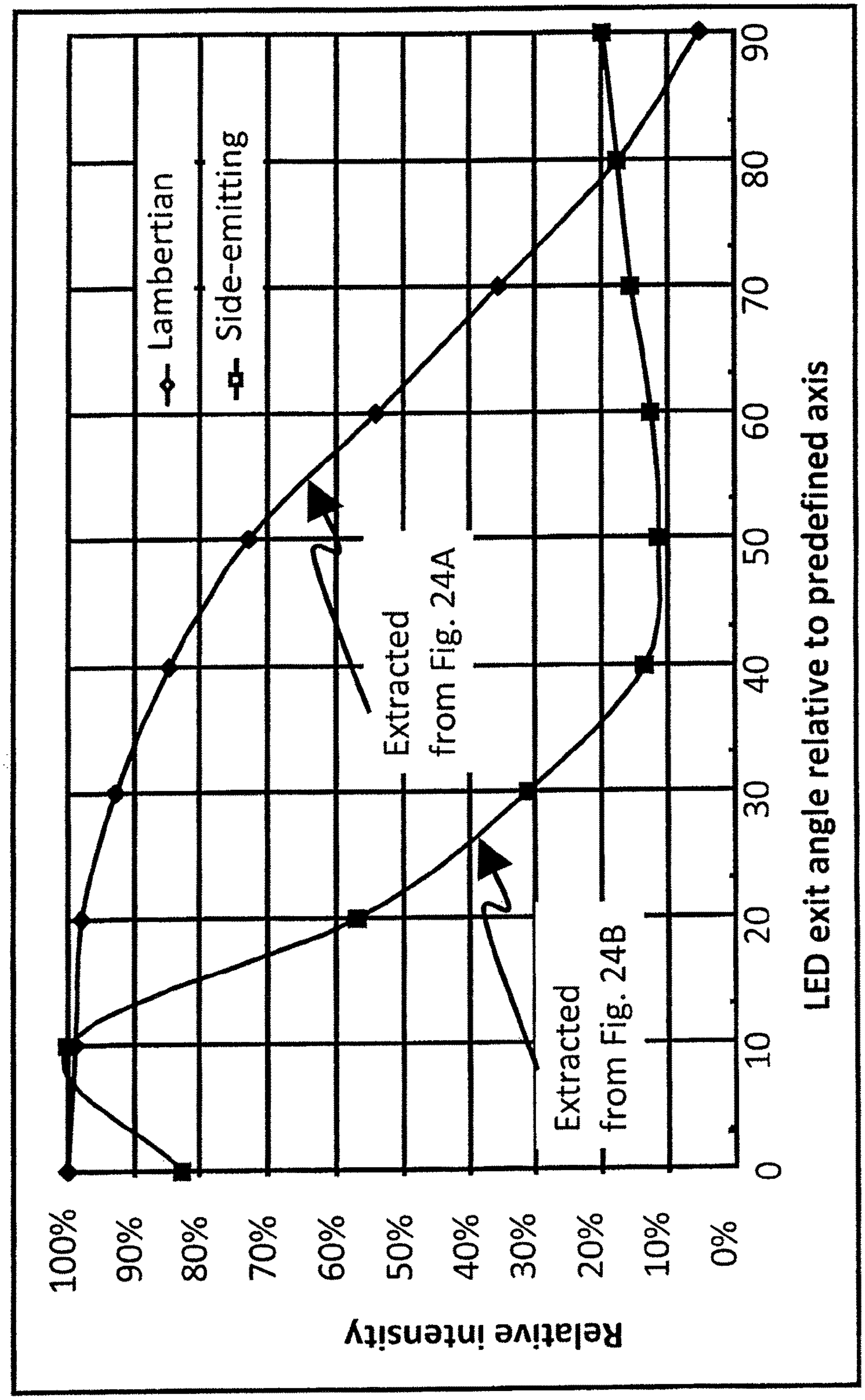

FIGS. 24A and 24B show the relative intensity out of a Lumileds lambertian and side emitting LED, respectively. Portions of these intensity curves were modeled in Excel as shown in FIG. 24C.

FIGS. 25A-1 and 25A-2 detail the angle, φ, that light leaves the diffusing screen in FIG. 24B as a function of the incident angle, δ, and the slope of the diffusing surface, γ, as detailed in FIG. 23B. Note that the incident angle, δ (third column of FIGS. 25A-1 and 25A-2) maps to (90−θ2) in FIGS. 5 and 7, respectively, which maps to θ1 and ψ (second column of FIGS. 25B-1 and 25B-2, respectively) coming from the LEDs in those figures, respectively. Also shown in the first column of FIGS. 25A-1 and 25A-2 is the relative intensity of the LEDs in FIGS. 5 and 7, respectively, as a function of angles θ1 and ψ, respectively. Note that for certain combinations in the table (denoted by ##TIR##), the light striking the undulating surface of the diffuser cannot exit, and is reflected back into the diffuser via TIR. The ultimate fate of these rays can be determined by any suitable ray trace program as is known in the art.

FIGS. 25B-1 and 25B-2 are similar to FIGS. 25A-1 and 25A-2, respectively, except that they provide additional granularity around those conditions causing TIR at the undulating surface of the diffusing film.

Figure 26A:
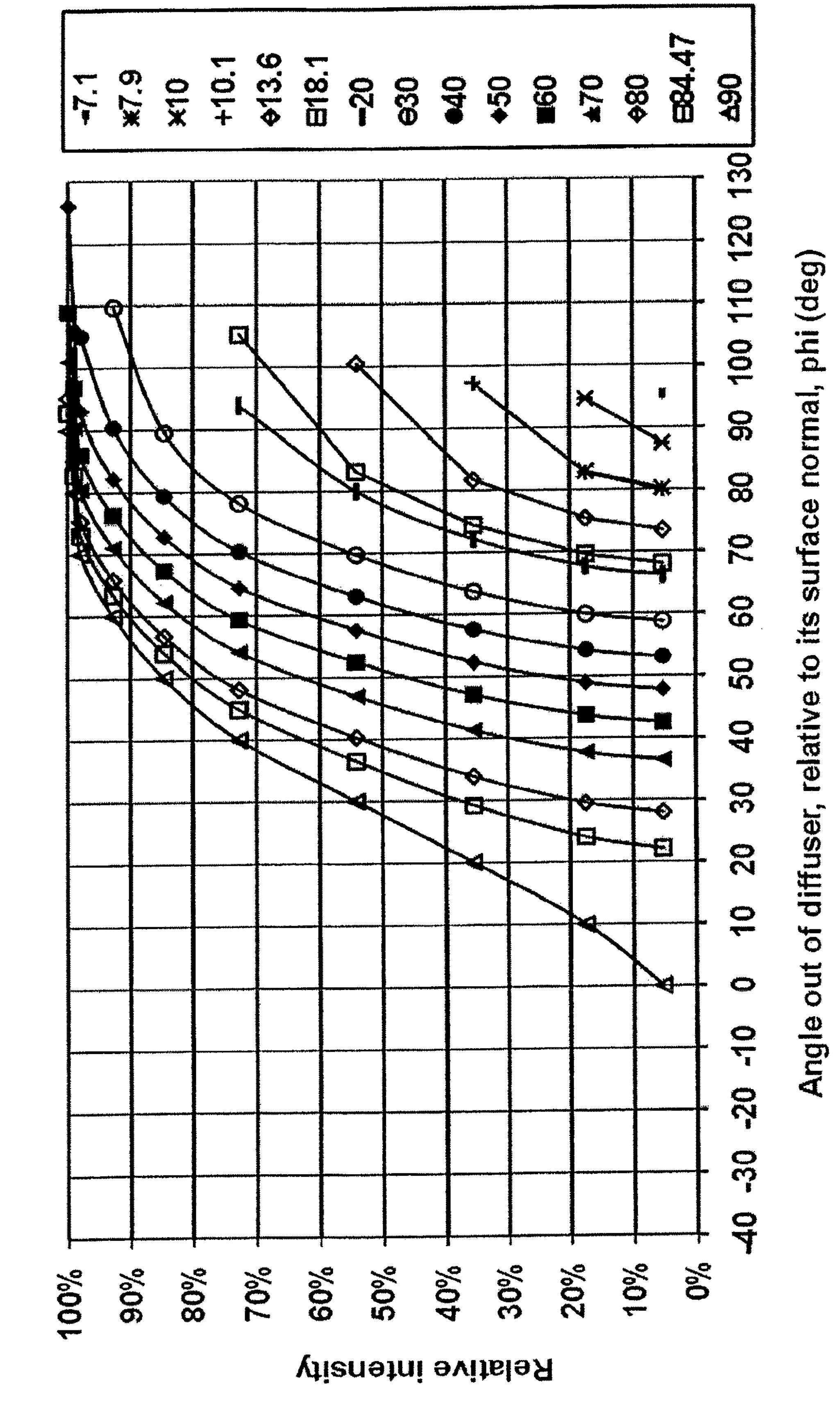

FIG. 26A demonstrates the intensity of those rays exiting the diffuser film for a traditional edge light approach, with each successive curve indicating a different slope, γ, at the exit surface of the diffuser. Slope values are annotated for γ values of 7.1 degrees, 7.9 degrees, etc.

Figure 26B:
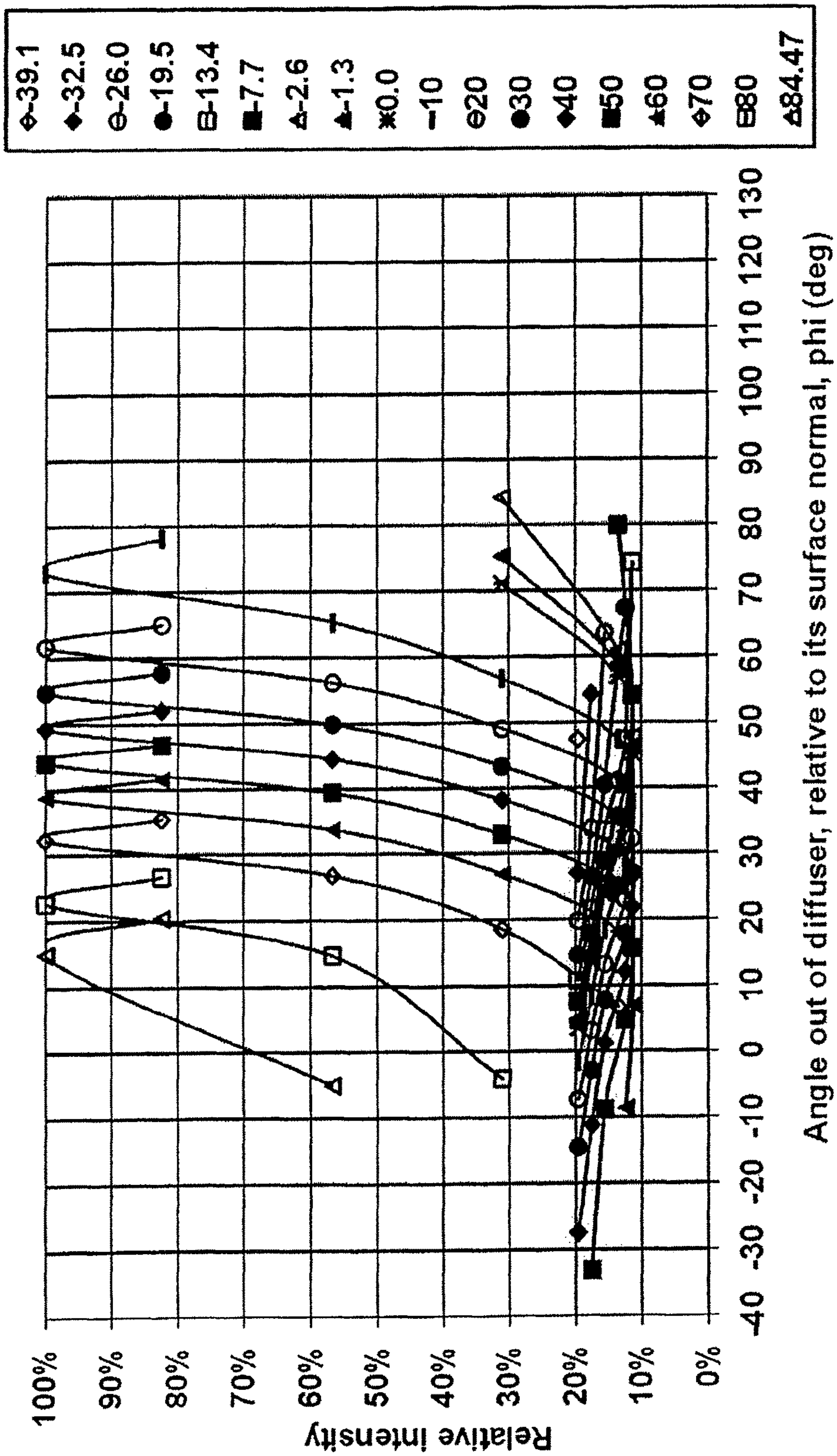

FIG. 26B demonstrates the intensity of those rays exiting the diffuser film for the prism coupling approach, with each successive curve indicating a different slope, γ, at the exit surface of the diffuser. Slope values are annotated for γ values of −39.1 degrees, −32.5 degrees, etc.

DESCRIPTION OF PREFERRED EMBODIMENT

Referring to FIG. 1, a window or other transparent substrate 10 is to have light from an LED 20, which is a semiconductor that emits light in response to electrical stimulation transmitted into the transparent substrate at angles related to the material of the substrate so that the light is "trapped" within the substrate as a result of total internal reflection (i.e., TIR) off the inside of the exterior surfaces of the substrate. Propagation of the light continues within the transparent substrate until it has been fully absorbed/extracted.

In a preferred form, an LED 20 preferably of the side-emitting type is positioned on a support and heat sink 22 near to a side surface of the substrate 10 to deliver the light that is to enter the substrate. Additional sources of light might include a fluorescent material or a photoluminescent material, which are conventionally stimulated to emit light.

In order to cause the light from the LED to enter the substrate (i.e., window pane), an optical coupling arrangement 30 is provided. As shown, it comprises what has been termed a toroidal prism due to its central through-hole and circular shape.

FIG. 2 shows a prism 30' symmetrical about an axis central with respect to the prism specifically designed for use with a LED having a lambertian angular distribution. The rotationally symmetrical prism 30' has two portions 33, 34 arranged symmetrically with respect to an axis Y about which symmetrical prism 30' is symmetric. Portions 33, 34 have a gap 38 between them.

FIG. 3 shows the x-y coordinates of the curvature of the optical surface of the prism in FIG. 2

FIGS. 18A-1, 18A-2, 18A-3, 18A-4, 18B-1, 18B-2, 18B-3, 18B-4, 18C-1, 18C-2, 18C-3, 18C-4, 18D-1, 18D-2, 18D-3, 18D-4, 18E-1, 18E-2, 18E-3, 18E-4, 18F-1, and 18F-2 show x/y coordinates (and intermediate calculations) of the surface profile shown in FIG. 3.

As not all LED manufacturers offer side emitting LEDs, and secondary side emitting lenses may not be acceptable for a variety of reasons, a custom optic like the cross-section shown in FIG. 2 can be constructed for use with any LED, obviating the need for a side emitting LED and separate prism. In FIG. 2, the optic has been designed to accept any LED and bend the rays at the required angles into the window. In this particular embodiment, rays from the LED were analyzed to minimize Fresnel reflections, account for draft angles to allow for molding, maintain a compact size, etc.

FIG. 1 demonstrates a one-zone planar input surface; i.e., a constant surface tangent bounded by the top and bottom surfaces that form discontinuous surface tangents.

FIG. 2 demonstrates three zones, each having a smoothly changing surface tangent and each bounded by at least one discontinuity in the surface tangent.

The particular design embodiment in FIG. 2 has been subdivided in three regions or zones—0°~20°, 20°~60°, and 60°-90°, with representative rays shown as A, B, and C, respectively. Note that the reflections within this circular prism for rays A and C have been accommodated via TIR, although reflective coatings can be employed as desired. Note that the circular prism needs to be coupled to the window with coupling media.

FIG. 3 shows the profile as calculated in Excel, with the detailed coordinates and interim calculations shown in FIGS. 18A-1, 18A-2, 18A-3, 18A-4, 18B-1, 18B-2, 18B-3, 18B-4, 18C-1, 18C-2, 18C-3, 18C-4, 18D-1, 18D-2, 18D-3, 18D-4, 18E-1, 18E-2, 18E-3, 18E-4, 18F-1, and 18F-2.

The prism arrangement has, as its entire surface at 36 facing the LED, a series of radius curves of the prism, and the radius curves are selected by one of skill in the art to bend the light emitted by the LED and entering the transparent substrate 10 at angles, for example as in FIG. 3, for the light to remain trapped within the substrate between the internal surfaces. This is shown schematically in FIG. 2. Light from the LED entering the substrate at too large an angle with respect to the surface of the transparent substrate would pass through the substrate rather than being trapped within. It may be blocked by an opaque mask over that part of the substrate.

Figure 3A:
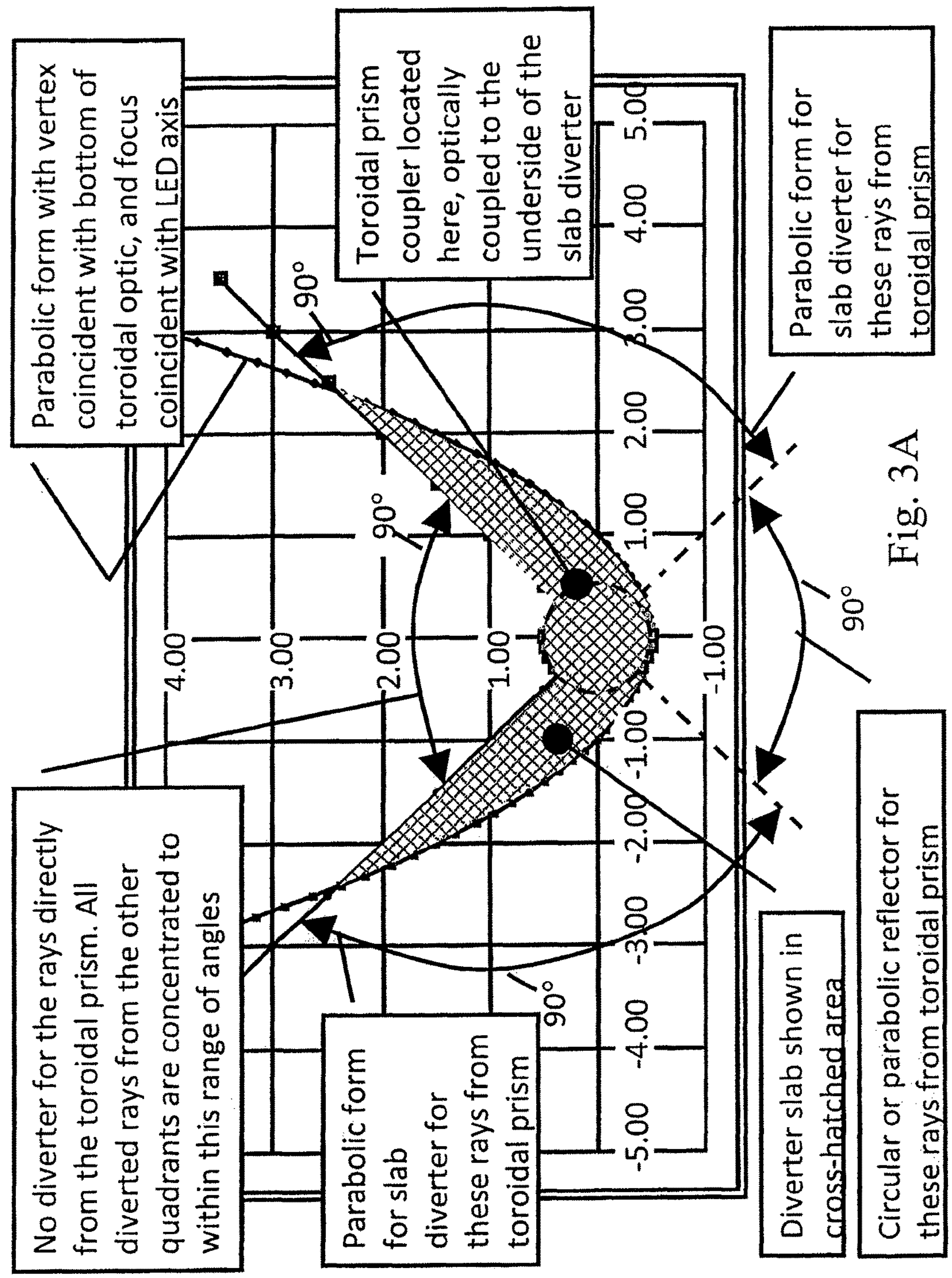
FIG. 3A shows an exemplary slab diverter approach to focus the omnidirectional light from the toroidal prism with a 90 degree arc as highlighted in the Figure.

FIG. 3A shows an exemplary slab diverter approach to focus the omnidirectional light from the toroidal prism with a 90 degree arc as highlighted in the Figure. When placed on a surface of a window at each corner of the window or each corner of rectangular indicia within the window, this type of diverter optic concentrates the light to the areas where it is needed. Other arc angles can be selected to obtain a desired effect. While FIG. 3A shows a parabolic diverter for use with certain rays, other forms are contemplated, such as linear, multifaceted, elliptical, circular, CPC (compound parabolic concentrator, a generic reference herein to non-imaging optics), or some combination thereof.

The diverter can be constructed so that it can be rotated when optically coupled through the window (e.g., via optical grease or oil, similar to an optical slipring) or alternatively, coupled via an air gap or lens (array) from a rotating diverter through a secondary optic (e.g., circular prism) that is affixed and optically coupled to the window. This allows the light distribution within the glass to be optimized for the desired aesthetic effects; e.g., uniform illumination of new indicia that are optically coupled to a window, where the extraction of light through prior indicia is markedly different than the new indicia. Note that instead of a single side-emitting LED with a mechanically rotating optic, an array of (semi) collimated LEDs can be substituted herein for temporally directing the beam through a surface coupled optic.

The attachment to the window can be engineered to allow the diverter to rotate in order to adjust the direction of light within the window to best suit an application. For example, a clear vinyl can be coupled first to the window, and then coupled to the diverter via optical grease to allow movement without losing the optical coupling. Further, faceted structures can be added to the toroidal prism (the one shaped like a thick, countersunk flat washer). For example, the outer circumference can comprise facets over certain portions, redirecting light as appropriate. The outer circumference can also be coated or surrounded by a specular reflector. Certain portions of the top surface can comprise prismatic-like features to redirect light as needed. These features can be subtractive-from and/or additive-to to the top surface of the toroidal prism. The top can also be de-coupled (optically) in select locations to allow reflections from the opposing side to propagate into the window without bouncing back into the diverter.

The side-emitting optic itself can be partially surrounded by a specular reflector, intercepting certain rays and redirecting them to another canted prism input face. This could be of use if an application uses a thin window, and the light is to be concentrated within a certain angular zone.

Figure 4:
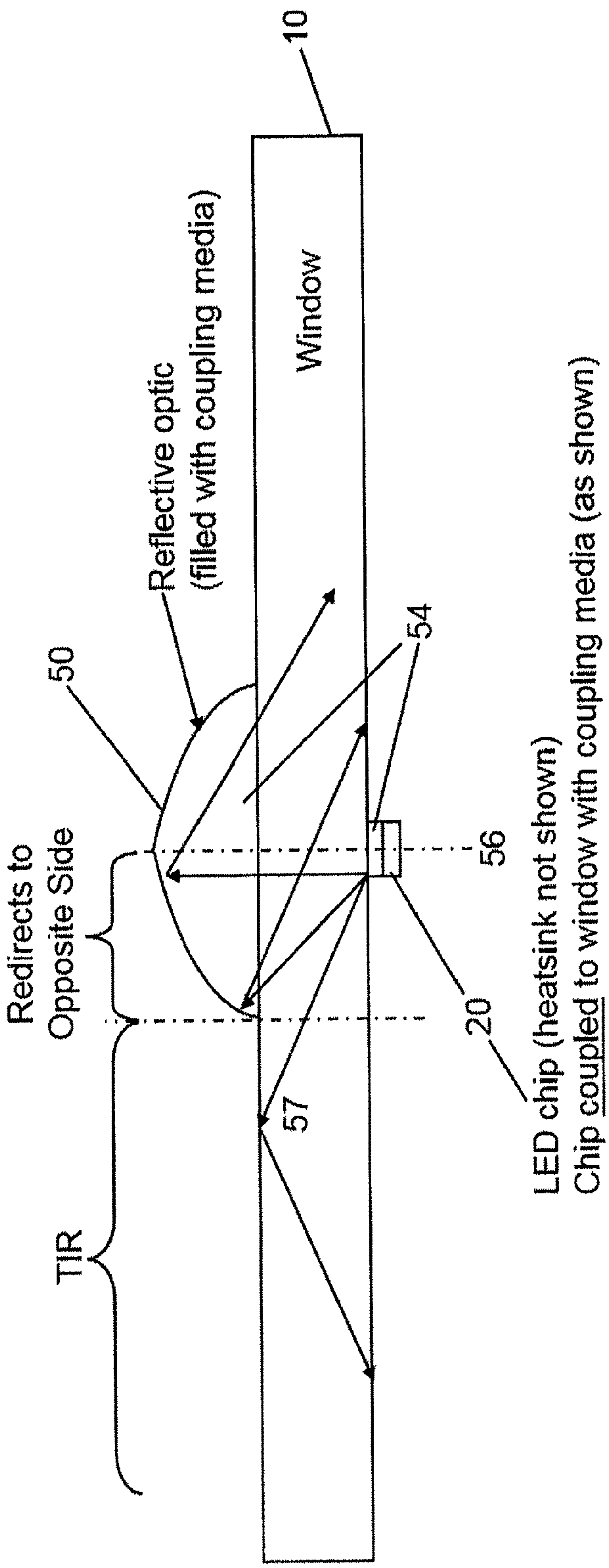
FIG. 4 shows an alternate embodiment, whereby a LED is placed on one side of a window, and a reflective optic is aligned and optically coupled to the opposite side.
Figure 4A:
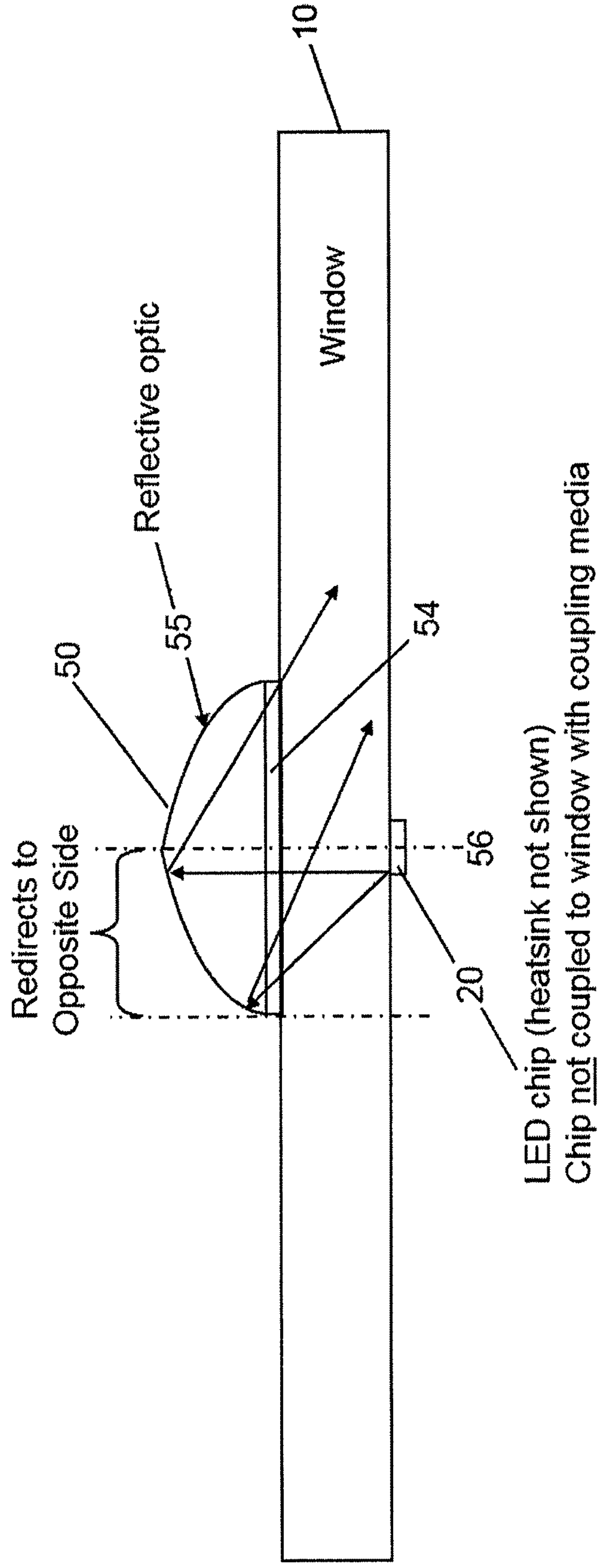
FIG. 4A shows an alternative variation of FIG. 4 where the reflective optic is connected to the window by a separate coupling medium layer and the LED is not optically connected to the window.
Figure 4B:
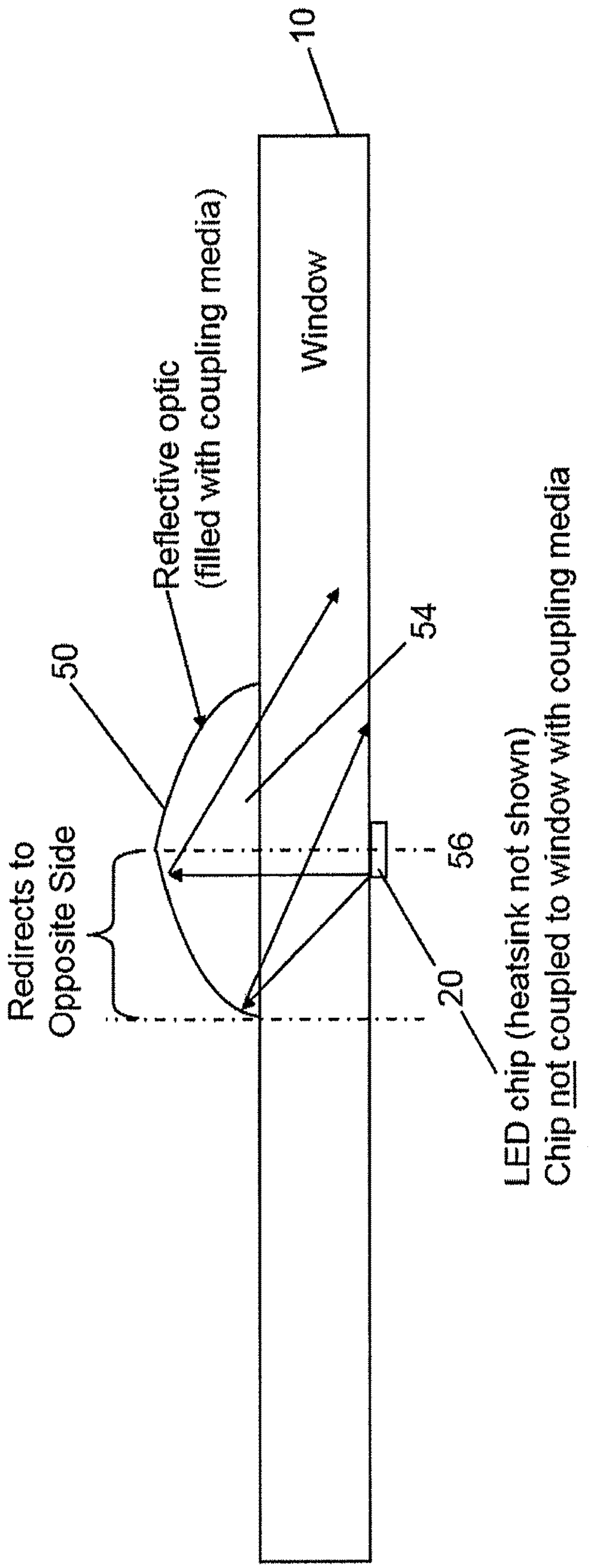
FIG. 4B is an alternative variation of FIGS. 4 and 4A.
Figure 4C:
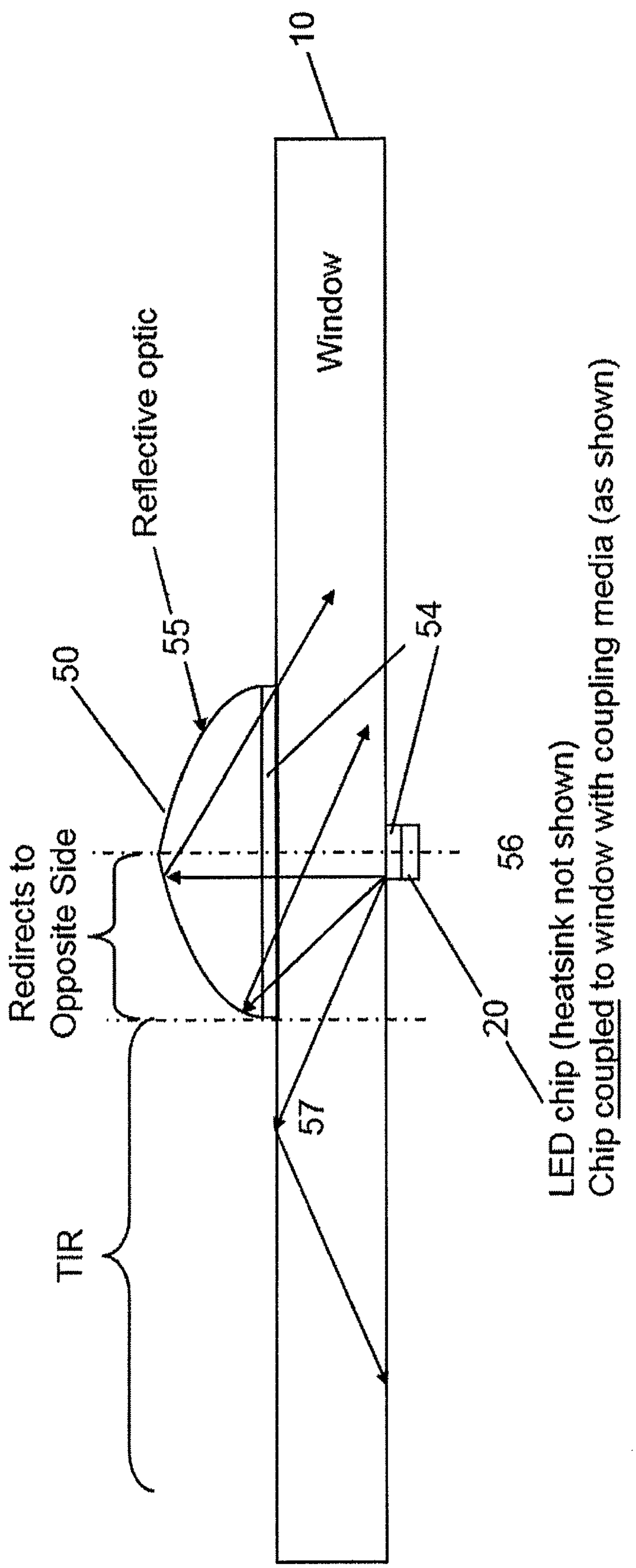
FIG. 4C shows an alternative variation to FIGS. 4, 4A, and 4B.

The light that passes straight up from the LED 20 through the substrate 10 at a too large angle to be trapped inside the substrate may be used in the substrate by positioning a coupling arrangement in the form of a reflective optic 55, of the type shown in FIGS. 4A-4C, at the other surface of the substrate from the LED. The reflective surface 50 is shaped so that the optic will reflect impinging light back into the substrate and at an angle where that light would then be trapped within the substrate as well. Reflective optic 55 is optically coupled to the substrate 10 by either filling the optic with a coupling medium 54 that extends out into contact with the substrate 10, as shown in FIGS. 4 and 4B, or by a separate coupling medium layer 54, as shown in FIGS. 4A and 4C. In both instances, the coupling medium has a refractive index greater than that of air. LED 20 is either optically coupled to substrate 10 by a separate coupling medium layer 54 having a refractive index greater than that of air, as shown in FIGS. 4 and 4C, or is not optically coupled to substrate 10, as shown in FIGS. 4A and 4B.

FIGS. 4-4C shows an alternate embodiment, whereby a LED is placed on one side of a window, and a reflective optic is aligned to the opposite side.

In order to show breadth of the invention, the approach in FIGS. 4 and 4C optically couple an LED chip on one face of a window, and optically couple a reflective optic on the opposing face. The coupled LED, as previously discussed, allows all angles to exist within the window. Those angles that would naturally TIR from the opposing face of the window are not intercepted by the reflective optic. Those angles that would pass through the window naturally are redirected by the optically coupled reflective optic into angles that TIR between the opposing faces. No effort has been made to optimize the angles to maximize the opportunity for TIR at the end faces of the window (not shown). Such a design is contemplated and can be fashioned by one of skill in the art.

An advantage to this approach is that the reflective optic naturally blocks all light that would leak through the opposing face (note the additional light blocking layer above the LED in FIG. 7).

Figure 12A:
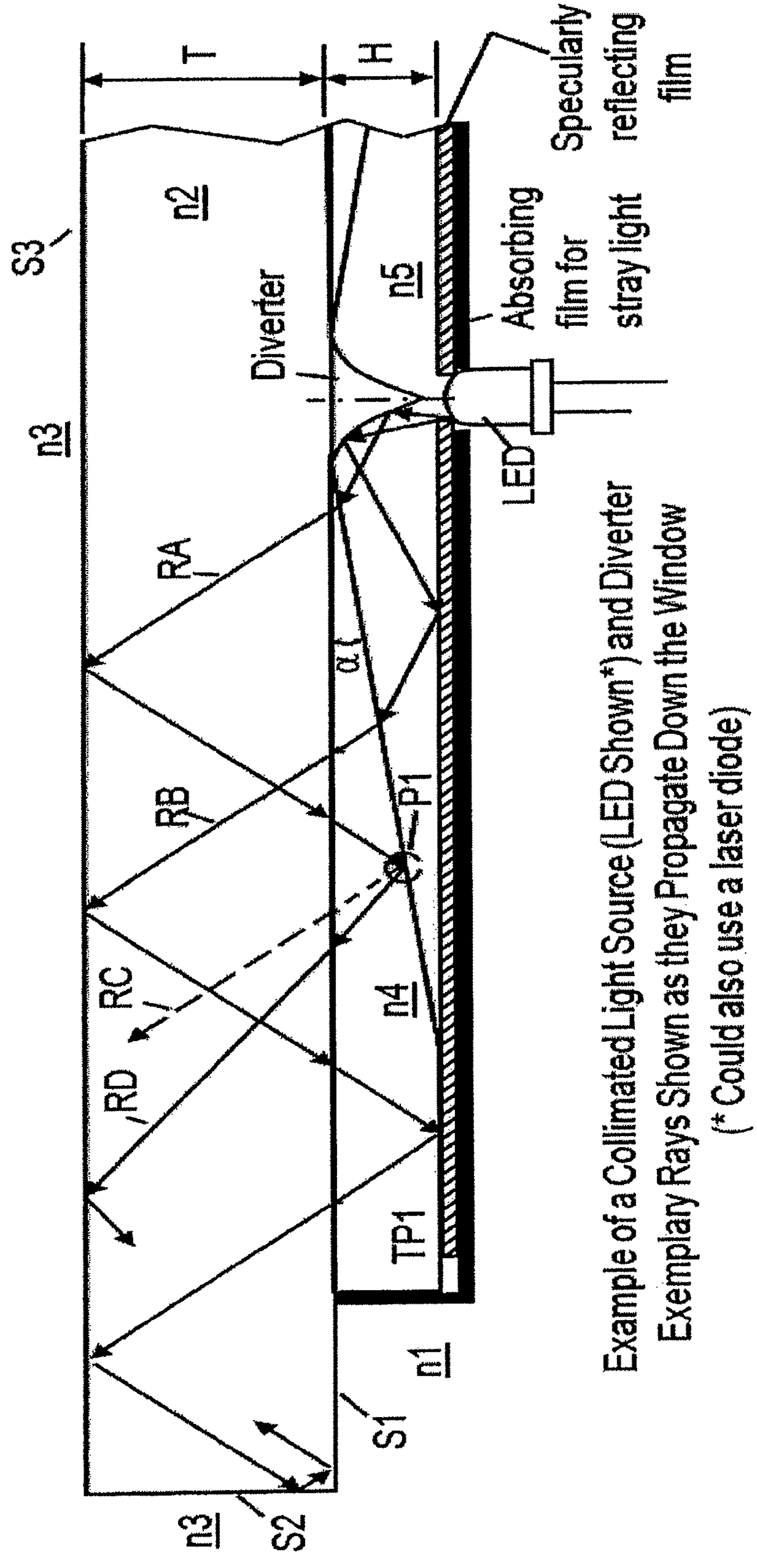
FIG. 12A shows an alternate embodiment using a collimated LED with an auxiliary ‘diverter’ used to transform the angles into appropriate angles for use by the prism. The term ‘diverter’ connotes a functional representation, wherein the actual optical element can be reflective (as shown), refractive, diffractive, etc.

FIG. 12A shows an alternate embodiment using a collimated LED with an auxiliary 'diverter' used to transform the angles into appropriate angles for use by the prism. The term 'diverter' connotes a functional representation, wherein the actual optical element can be reflective (as shown), refractive, diffractive, etc.

An advantage of this approach is that widely available collimated LEDs (and laser diodes) can be used, and a reflective diverter can be employed to change the beam's direction to that of a side-emitting LED. A reflective diverter also acts to block any light from leaking through opposing face, S3.

Figure 12B:
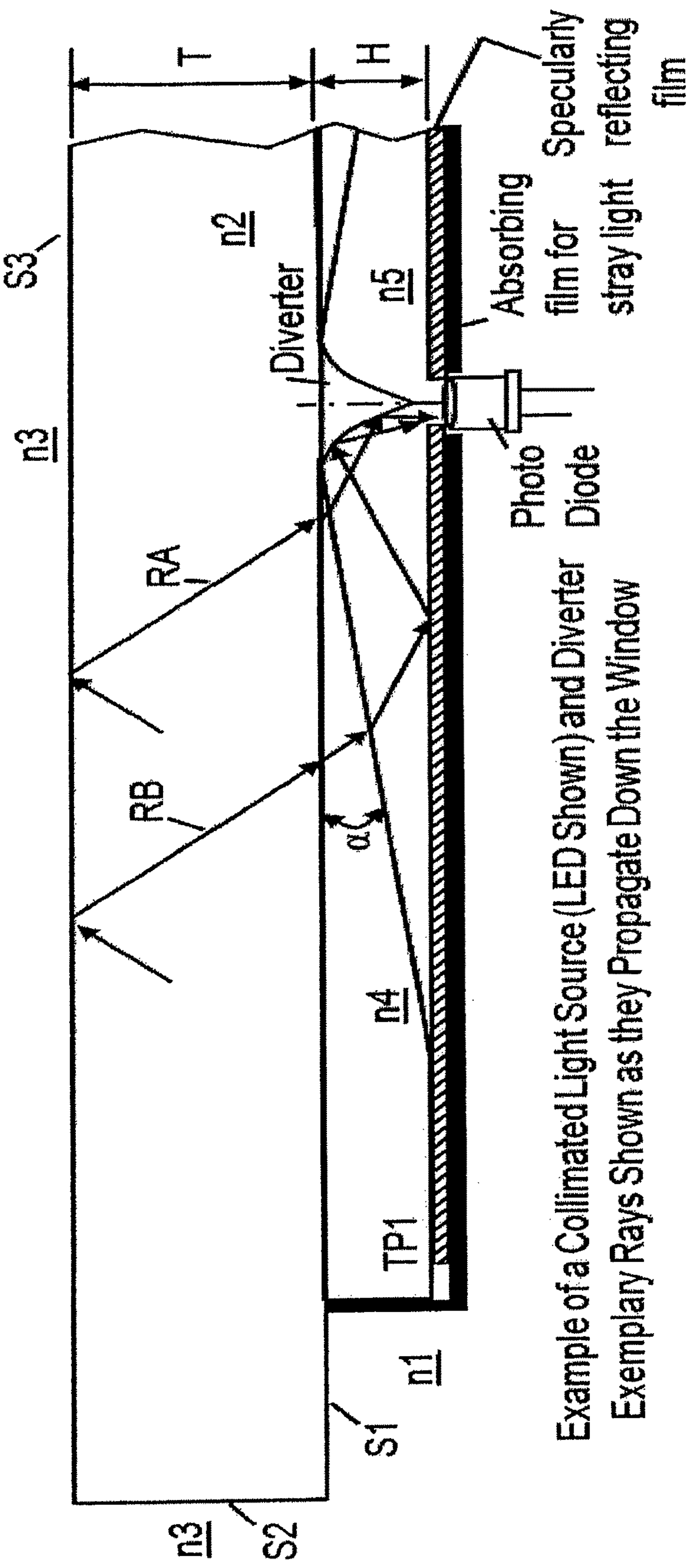
FIG. 12B shows essentially the same arrangements as in FIG. 12A, except that the ray propagation is reversed, with the prism used to collect light from the light guide and funnel into a photodiode.

FIG. 12B shows essentially the same arrangements as in FIG. 12A, except that the ray propagation is reversed, with the prism used to collect light from the light guide and funnel into a photodiode.

As previously mentioned, non-imaging concentrators can be used in reverse as collimators. The same is true here, where the circular prism is used in the reverse sense to collect light trapped within the window. Note that the other toroidal and circular prism couplers can be used in the sensor mode as well. It is also contemplated that combination source/sensors can be deployed (e.g., via beamsplitters). For example, light from an external communications source can be coupled into the window via a holographic optical element (HOE) as taught in U.S. Pat. No. 6,724,508, and sensed by the instant invention via toroidal/circular prism couplers.

Figure 12C:
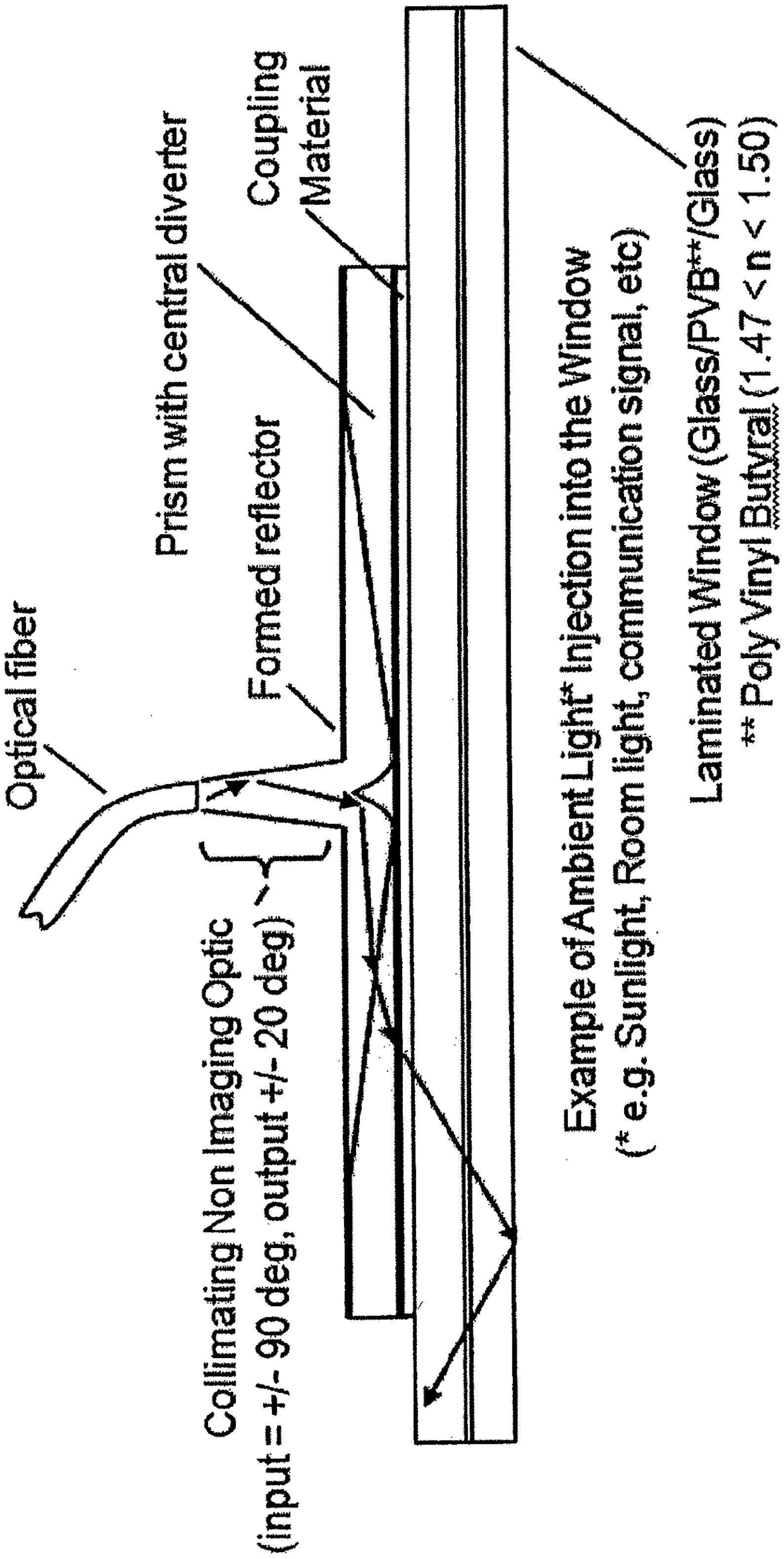
FIG. 12C shows the use of a non-imaging optic (shown as a formed sheet metal reflector, but can also be refractive) to collimate ambient light (provided via an optical fiber) to be used as the source instead of a LED (or laser diode, etc). The Figure also shows the use of laminated glass window, consisting of two sheets of ¼" glass (such as low-iron Starphire from PPG) bonded via a layer of poly vinyl butyral (PVB). The refractive index of PVB must be considered in determining whether light will traverse the PVB layer, or reflect via TIR.

FIG. 12C shows the use of a non-imaging optic (shown as formed sheet metal reflector, but can also be refractive) to collimate ambient light to be used as the source instead of a LED (or laser diode, etc). The figure also shows the use of laminated glass window, consisting of two sheets of ¼" glass (such as low-iron Starphire from PPG) bonded via a layer of poly vinyl butyral (PVB). The refractive index of PVB must be considered in determining whether light will traverse the PVB layer, or reflect via TIR.

As shown in FIG. 12C, remote sources of light such as sunlight, room light, an optical communications signal, light from an optical fiber, etc. can be coupled into the window. Other optical approaches are contemplated, either as a substitute or complement to the collimating non-imaging optic shown in FIG. 12C.

FIG. 4 illustrates the optic 50 at the substrate without the arrangement 30. They may be used as separate alternatives or may be used in combination at a particular installation. In the latter situation, the light passing across the substrate is not masked, but is permitted to impinge on the optic 50.

FIG. 7 shows equations used in analysis of prism-coupled approach for a light guide, receiving light into its entrance surface S1 from a side-emitting LED having, such as those available from Lumileds. Note that the angular distribution chart from Lumileds shows a small proportion of the light exiting the LED in the vertical direction (corresponding to 0 degrees on the chart), and the amount gets progressively higher as the angle gets closer to 90 degrees on either side of the vertical axis. Therefore, $\psi=0$ degrees on the drawing corresponds to +/−90 degrees on the Lumileds chart, and is so-annotated.

FIG. 14 shows equations used in analysis of a prism-coupled approach for a light guide, similar to that shown in FIG. 7, except that a coupling material, CM1, of refractive index n6, is included in the analysis.

FIGS. 15A-1 and 15A-2 show an analysis of the influence on the refractive indices of a first material (e.g., prism) and a second material (e.g., coupling material) to determine whether light rays of a given incidence angle at the boundary between the materials will TIR. Steps 1 through 3 are described on the Figures.

FIGS. 15A-1 and 15A-2 detail an exemplary approach in the choice of appropriate coupling media for an acrylic prism (n=1.49) trying to pass angles up to 75 degrees off-normal through the coupling media, and thus requiring a minimum refractive index of 1.44 for the coupling media (e.g., acrylic PSA, n=1.47, P/N ARClear 8154 from Adhesives Research).

An interesting application is the case of a vinyl window decal that is water-coupled to a window. Water has a refractive index of about 1.37 at 300 nm, down to 1.33 at 670 nm. Clear vinyl window cling is a PVC material, and PVC has a refractive index of 1.54. As shown in FIGS. 15B-1 and 15B-2, the angle within the clear vinyl, $\theta 2$, from an acrylic prism ($\alpha=7°$), and coupling media of the same index, is <50° (to ensure TIR at both S2 and S3). As shown in callout box #4 in FIG. 15A-2, the minimum index for the coupling media between the vinyl and the window glass must be about 1.18, and therefore water satisfies the constraint (for the wavelengths for which 1.54 is the index of vinyl). This non-limiting example demonstrates that water can couple light from a clear vinyl window cling into window glass when a prism is coupled into the vinyl as shown in the stackup in FIG. 15B-3. A significant advantage of the window cling approach is the simplicity of installation (and removal), allowing use of the invention by both novice and professional installers.

Figure 7A:
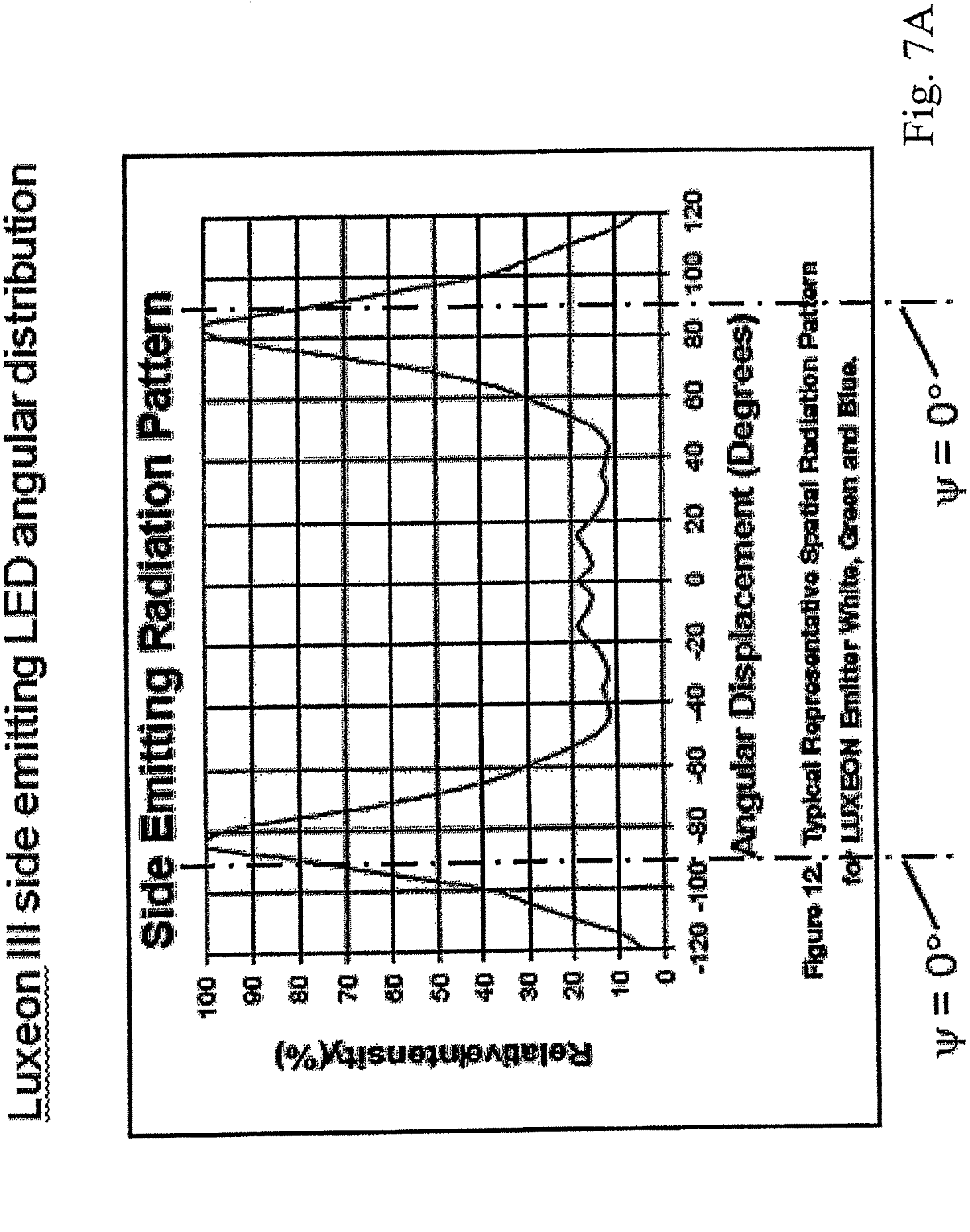
FIG. 7A shows a Luxeon III side emitting LED angular distribution.

The toroidal prism, TP1, shown in FIG. 7 has smooth surfaces, and is in the general shape of a thick flat washer with a countersunk central through-hole. The side emitting LED provides a semi-collimated beam about a plane orthogonal to the vertical axis through the center of the LED as shown in the graph of FIG. 7A (based on a Luxeon LED). Note from the graph that there is some residual light at all other angles, some of which will not TIR and thus leak through the window. Note in FIG. 7 that directly above the top side of the LED there is a reference to a blocking film.

As stated previously, for a window with n=1.51, light will TIR from both faces S2 and S3 if $-48.53°<\theta 2<-41.47°$ and $41.47°<\theta 2<48.53°$ (where the negative angles indicate those angles reflected about the axis normal to S2 or S3). This is detailed in FIGS. 8A and 8B, which are based on a configuration of a toroidal prism like that in FIG. 7 with $\alpha=7°$ and $0°\leq\psi\leq 20°$. Note that the designer must be mindful of Fresnel reflections of ray R1A relative to prism face S6 as the incident angles can be close to grazing where the Fresnel reflections become substantial.

Note also that this type of side emitting LED is not offered by every LED manufacturer. There are secondary lenses, e.g., P/N 10267 available from Carclo Technical Plastics, 111 Buckingham Avenue, Slough, Berkshire SL1 4PF England/600 Depot Street, Latrobe, Pa. 15650 USA, telephone UK: 0044 (0) 1753 575011, Telephone USA: 00 (1) 724 539 6982, 84 shown in FIGS. 21A and 21B. Note, however, the size is much larger than that of the integrated lens in the Lumileds part, and so it may be more difficult to deploy, either from a mechanical packaging perspective or from the optical principle of etendue (describes the fundamental limit governing the amount of light that can be coupled from a given source into a system; see for example, US 2008/0212328). So, a window of a given thickness and refractive index can only accept a certain amount of light via prism coupling based upon the etendue of the optical system (LED+optics). FIG. 21A shows side-emitting optic 84 assembled on luxeon LED 86, a clear acrylic or polycarbonate sheet 90 being positioned on both sides of the assembly of the side-emitting optic 84 and the luxeon LED 86. The average FWHM of the side-emitting secondary optic 84 is 8.4 degrees, the minimum FWHM is 7.45 degrees, and the maximum FWHM is 9.3 degrees. The efficiency of the side-emitting secondary optic 84 is 87% and Cd/lm is 38/46=0.8 @ 350 mA (based on an average of eight readings). FIG. 22A shows the commercially available secondary lens 84 for LEDs that converts a lambertian distribution from LED 98 into a side-emitting distribution for use by a toroidal prism 92. The commercially available secondary lens 84 is bounded by a specular reflector 94, the toroidal prism 92, and air 88 between the specular reflector 94 and the toroidal prism 92, the toroidal prism 92 having an underside angle 96 with the horizontal of 7 degrees. Air 88 is also present below the specular reflector 94. As shown in FIG. 22B, LED 98 is mounted on a FR4 board 100 and aluminum board 102.

FIGS. 7 through 11B demonstrate the effects of the prism angle, $\alpha$, on the angles of $\psi$ for which TIR can be achieved at both S2 and S3.

In FIGS. 8A and 8B, $\alpha=7°$, and assuming the LED emission is contained within $0°\leq\psi\leq20°$, TIR is achieved, quite unexpectedly, at both surfaces S2 and S3. This provides a significant boost in efficiency, as TIR is effectively lossless. It thus precludes light leakage at the edges of the window (if that is a requirement as opposed to an effect that is desirable for a given application).

In FIGS. 9A and 9B, 10A and 10B, and 11A and 11B, $\alpha$ is set to 14°, 21°, and 28°, respectively. The tables show, amongst other things, the tradeoffs between leakage and reflection at S2 and S3 depending upon the range of angles from the LED, $\psi$.

Finally, other factors can be optimized via ray trace programs, such as Fresnel reflections, skew rays, etc. Further, it is contemplated that the prism surfaces can deploy faceted geometric features, diffractive features, etc, in order to direct the beams into the window in one or more preferred directions, increase coupling efficiency into the window, or optimize any other price/performance target. It is also contemplated that an element can be placed on the opposite side of the window from the prism in order to block light (can be air gapped), redirect the beam (optically coupled), or become illuminated by any light leakage for effect or other predetermined purpose. Examples appear in FIG. 4. Note also that the prism angle, $\alpha$, can be varied within the same part in order to optimize performance for a given application. Also, a portion of the prism can be replaced with a reflective optical feature to redirect light in one or more preferred directions. An example of such as system is taught in U.S. Pat. No. 6,565,235. For example, a reflector can surround 270° of a side-emitting LED, redirecting incident light towards the opposing side so that light side-emits around only a 90° swath. This would be useful in an application where the prism is coupled near the corner of a window, directing the light within the window through a 90° sweep, from rays parallel to one edge of the window to those parallel to the adjacent (orthogonal) edge (in the case of a rectangular window). In other applications, a collimated LED can be prism-coupled to direct light along a preferred narrow path within the window. In fact, an array of LEDs can be so-coupled and arranged along a line, in a radial pattern, or any other configuration to achieve the price/performance so desired. Such an array (UV LEDs for fluorescent films, visible LEDs for diffusing films, and combinations thereof) can be time-sequenced (intensity and/or color) to achieve interesting visual effects.

FIGS. 8A and 8B show analysis results for the approach in FIG. 7 having a refractive index of 1.51, a prism refractive index of 1.49, and a prism angle, $\alpha$, of 7 degrees. Note that the light not only TIRs off of side S2 for all values of $\psi$, (see column for 03), but significantly, and quite unexpectedly, light also TIRs off of side S3, opposite entrance surface S1, for $\psi$=0 to +20 degrees. This is because incident angles at surface S2, identified as $(90-\theta 2)$ can go as low as 42.09 degrees (as opposed to 48.53 degrees in FIG. 6). For those rays that can TIR off of both surface S2 and S3, light will propagate through a rectangular slab light guide (with polished faces to avoid TIR-defeating scattering sites) until the light has been extracted or dissipated.

FIGS. 9A and 9B show analysis results for the approach in FIG. 7 for prism angle, $\alpha$, of 14 degrees. Note the differences in angles of $\psi$ by which TIR can be achieved at surfaces S2 and S3 (and their opposing faces due to symmetry) when compared to other angles of $\alpha$.

FIGS. 10A and 10B show analysis results for the approach in FIG. 7 for prism angle, $\alpha$, of 21 degrees. Note the differences in angles of $\psi$ by which TIR can be achieved at surfaces S2 and S3 (and their opposing faces due to symmetry) when compared to other angles of $\alpha$.

FIGS. 11A and 11B show analysis results for the approach in FIG. 7 for prism angle, $\alpha$, of 28 degrees. Note the differences in angles of $\psi$ by which TIR can be achieved at surfaces S2 and S3 (and their opposing faces due to symmetry) when compared to other angles of $\alpha$.

In order for light to pass through the prism and into the window, the prism must be optically coupled to the window surface via a coupling medium 54 therebetween. Examples of optical coupling media are provided above. The coupling medium fills any minimal gap between the opposing surfaces of the prism or other optic and the substrate so that all light emerging from the prism or other optic will pass through that medium to the substrate.

The light is transmitted along the transparent substrate and does not emerge and is not visible outside the substrate. The purpose of this invention is to enable illumination of locations 60 on the substrate, to create letters or images or the like (i.e. indicia). At locations where the transparent substrate should have a visible illuminated area, something is placed on or performed on the substrate as at 60 to scatter light that impinges upon it from inside the substrate. As noted above, this may comprise dots printed on the substrate at locations to create an image, glass beads, fluorescent inks, roughened area of the surface, etc., whatever would cause light to scatter and exit the substrate by defeating TIR. This enables the substrate or window to be used for providing information, decoration, etc. by characters, figures, etc. that appear to be illuminated at the transparent substrate. This is an esthetically interesting and pleasing way of providing information or decoration.

Figure 13:
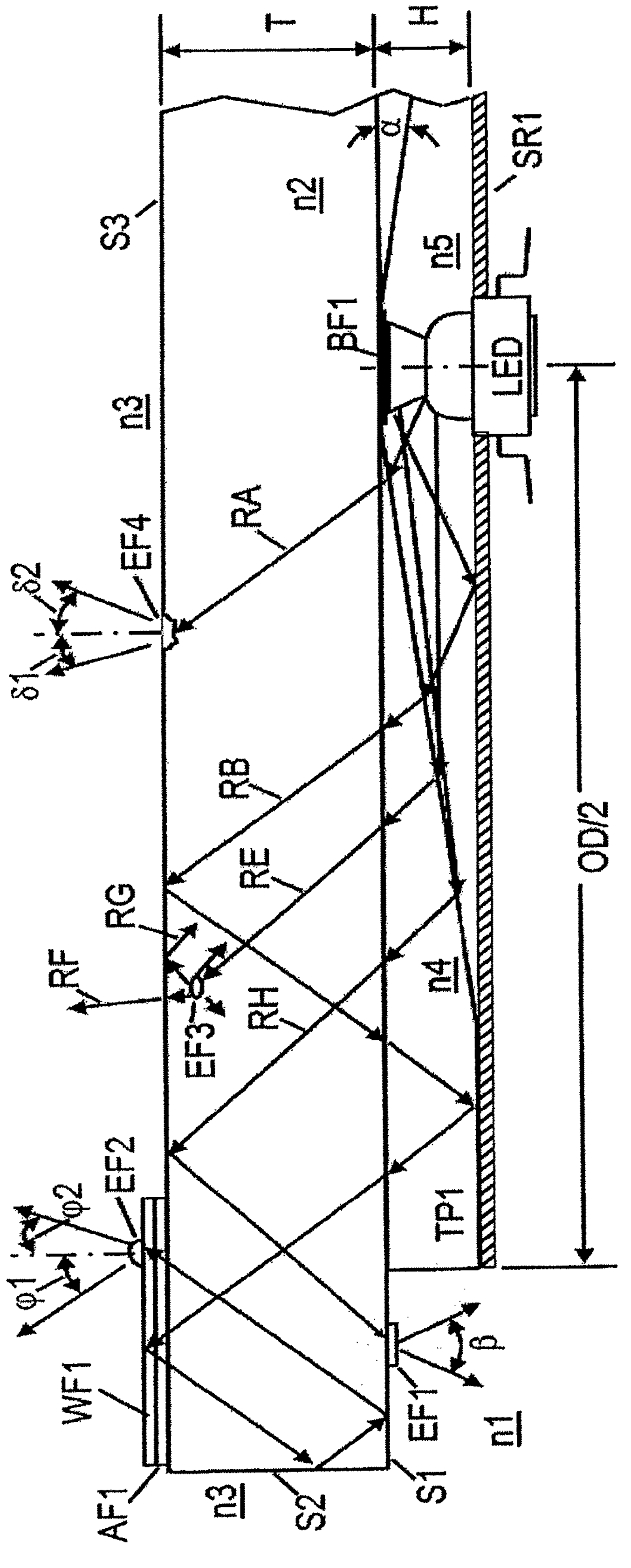
FIG. 13 demonstrates various methods by which rays can be extracted from the window or light guide. The first extraction feature, EF1, could be the ink from a fluorescent marker. EF2 is a lens-like diffusing element attached to window film WF1, coupled to the window via adhesive film, AF1. EF3 is a scattering particle or a void with the bulk of the light guide. Some scattered rays will exit the window like ray RF, while others will TIR, like ray RG. EF4 is a surface divot that could be achieved via etching, sandblasting, or other methods used to remove material from the surface of the window.
Figure 13A:
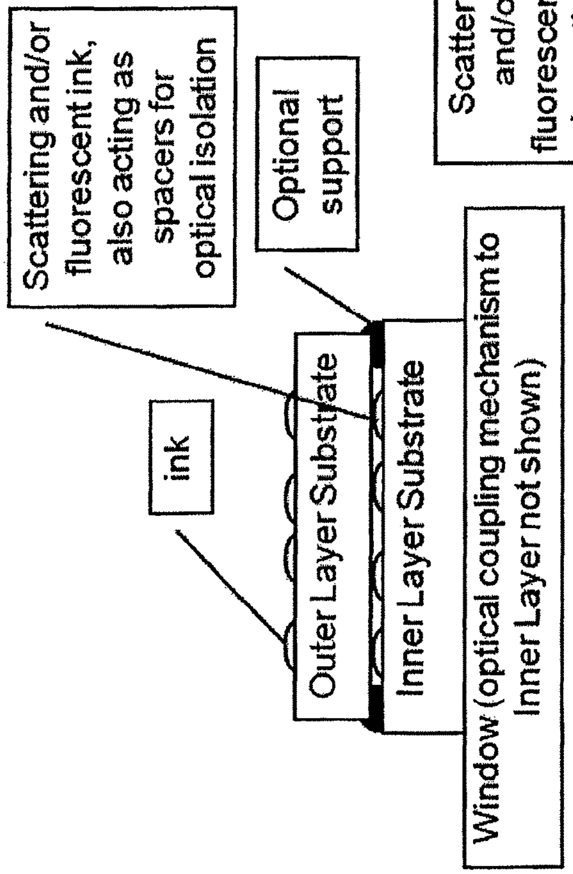
FIGS. 13A-13F show and describe various extraction mechanisms that provide indicia illuminated by the window (via an optically coupled inner layer) and optionally indicia on an optically isolated (to a predefined degree, not necessarily 100% isolated) outer layer. In particular.
Figure 13B:
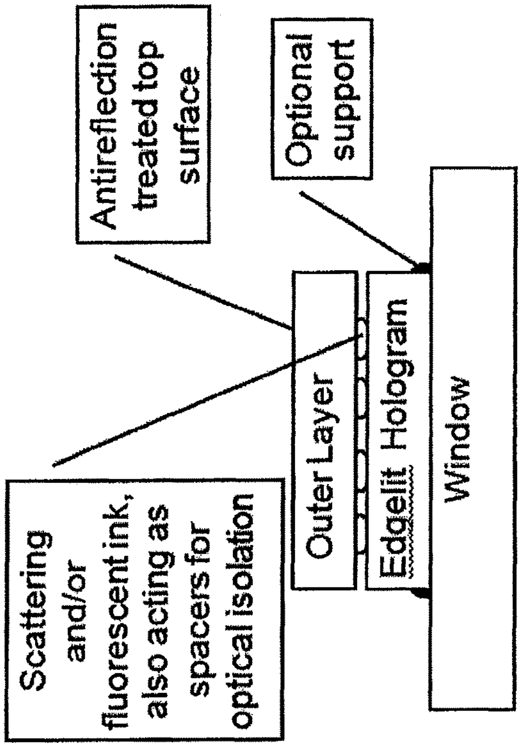
Figure 13C:
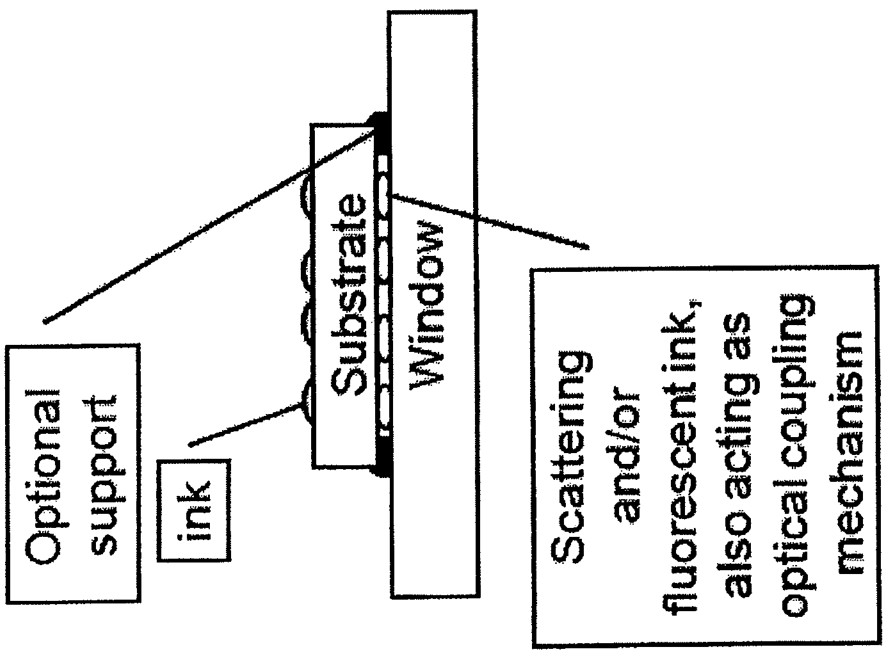
Figure 13D:
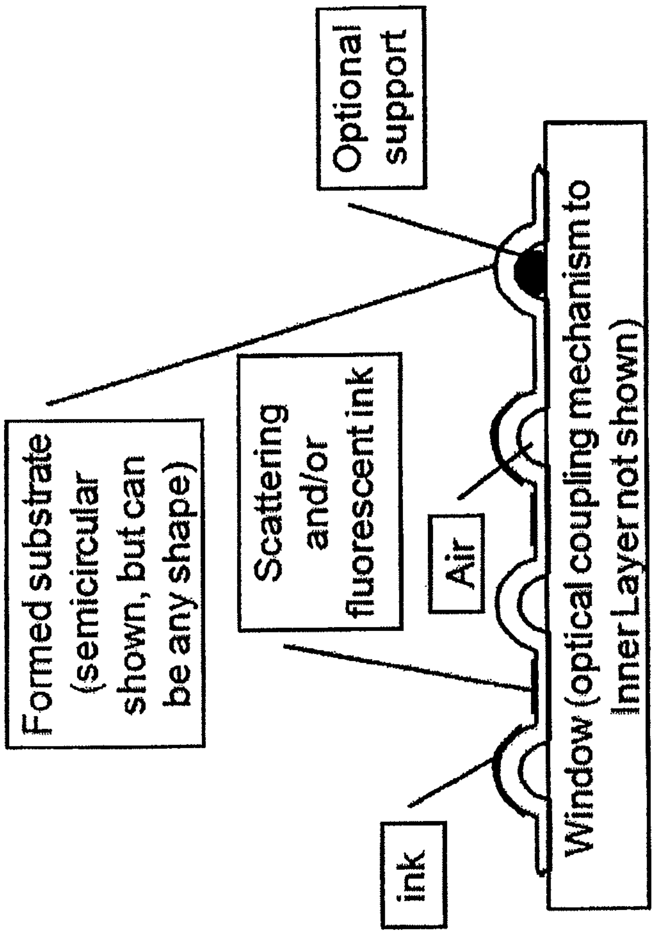
Figure 13E:
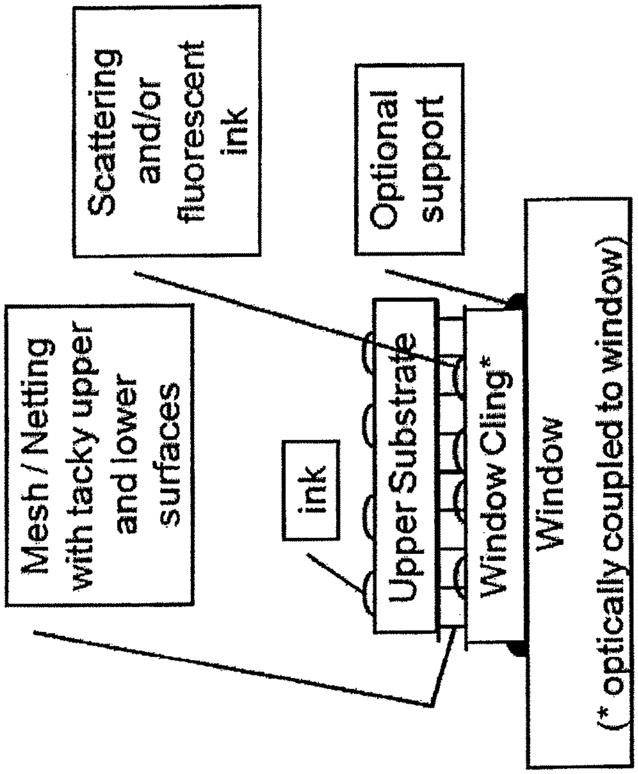
Figure 13F:
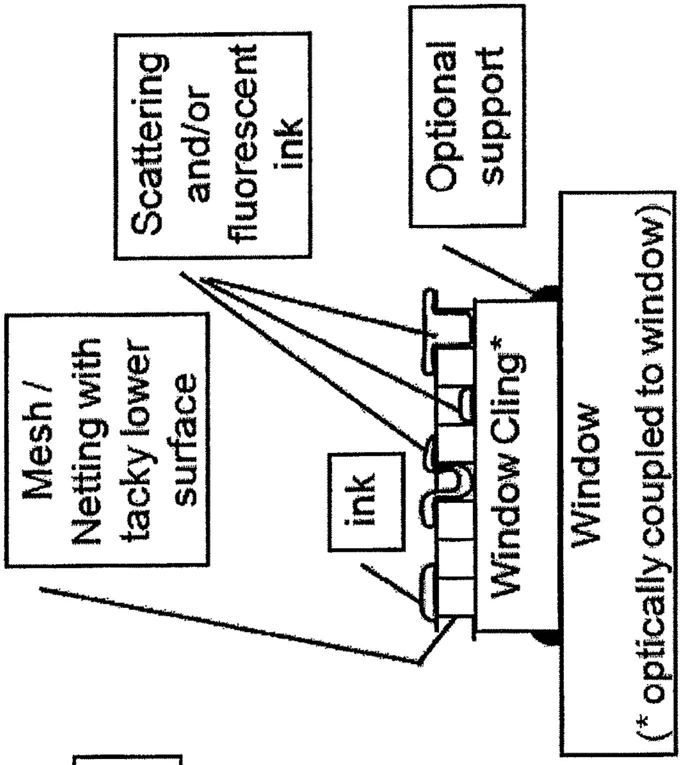

FIG. 13 demonstrates various methods by which rays can be extracted from the window or light guide. The first extraction feature, EF1, could be the ink from a fluorescent marker. EF2 is a lens-like element attached to window film WF1, coupled to the window via adhesive film, AF1. WF1 can also be a grazing incidence hologram as taught in U.S. Pat. No. 5,710,645. EF3 is a scattering particle or a void with the bulk of the light guide. Some scattered rays will exit the window like ray RF, while others will TIR, like ray RG. EF4 is a surface divot that could be achieved via etching, sandblasting, or other methods used to remove material from the surface of the window.

FIG. 16 is a detailed cross-sectional view of a mall window with prisms and LEDs integrated into window clamps.

Note from this figure that optical coupling into the compliant foam within the window clamps should be minimized to avoid defeating TIR and causing absorption into the foam. This foam is used to better distribute the clamping pressure to the glass, avoiding any excess pressure on the glass that might lead to fracture. Also note that heat from the LEDs need to be considered, and can be conducted away through the window clamp and into the support tube. The transient and steady state temperatures can be predicted by suitable thermal analysis programs such as ANSYS Thermal Analysis System, and the general analytic approaches are taught in "Cooling Techniques for Electronic Equipment, 2nd Edition", D. Steinberg, ISBN 0471524514.

An optically coupled window film shown in FIG. 16 is subdivided in pieces. This represents, as a non-limiting example, computer cut window decals that are optically coupled to the window. These decals preferably comprise a scattering property such that light can be extracted from the window at selected points/areas, such as the lines of text, or a graphic image. The gaps between the film pieces assist in ensuring uniformity of the illuminated image as the light is not quickly extracted from one end of the decal without enough left to reach the center.

FIG. 17A is a front view of a mall window as in FIG. 16, also showing a LED driver, with a wireless communications link to a remote PC, which can be used to control the intensity vs. time profile of the LEDs. In one exemplary embodiment, the profile is coordinated between a plurality of windows (and other sources of light and sound).

FIGS. 17B-17E are front views of four adjacent mall windows using circular/toroidal prism coupling, each window with a unique number of LEDs illuminated.

FIGS. 17F-17I are front views of four adjacent mall windows using traditional edge lighting, each window with a unique number of LEDs illuminated. Note that the angles shown within the windows are limited to $-41.47° < \theta 2 < 41.47°$ in accordance with what's shown in FIG. 6 and discussed previously relative to FIGS. 5 and 6. The effects of this limited angular extent within the window is clearly seen when comparing the distribution of rays between FIG. 17E and FIG. 17I. The lack of uniformity in FIG. 17I suggests that additional LEDs are required to distribute the LED flux more evenly across the span of the glass. Further, since edge lighting by definition is confined to sources around the edge, as the window span gets wider, losses within the window (absorption, scatter, etc) makes it more difficult to get enough light to reach the opposing edge in order that beams from opposing LEDs to overlap to ensure uniform flux within the window across the span.

Figures 17B, 17C, 17D, 17E:
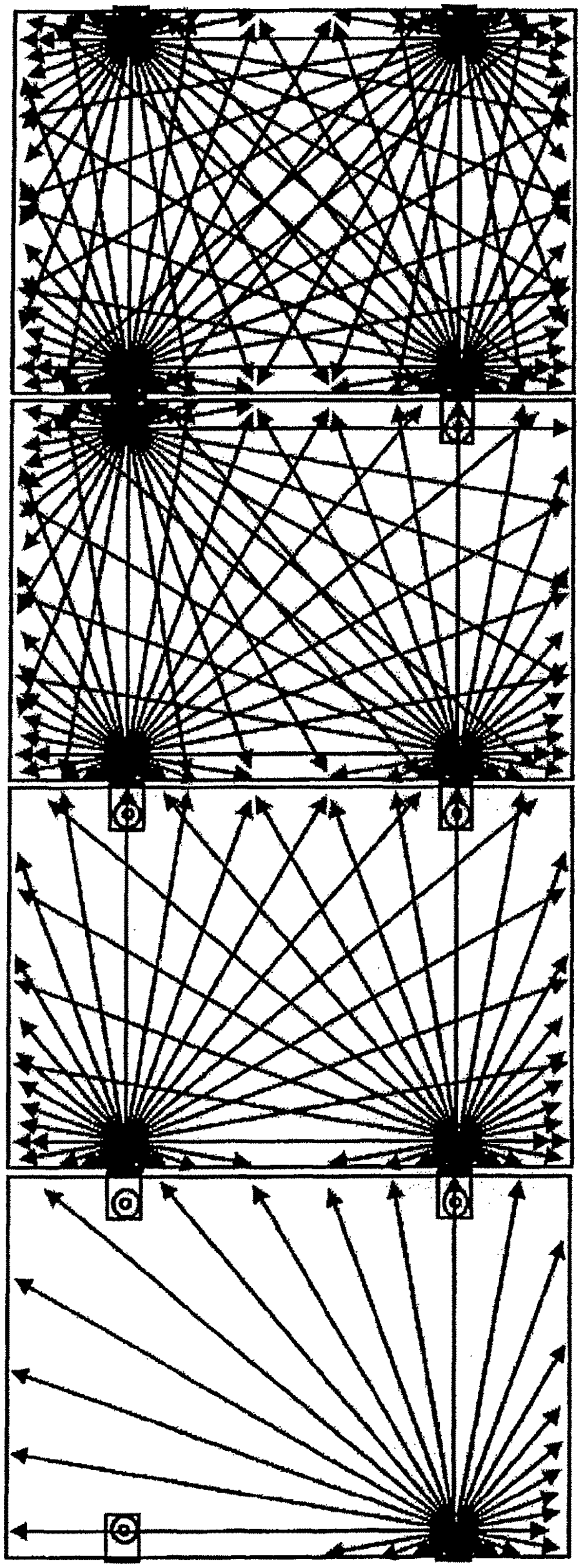
Figures 17F, 17G, 17H, 17I:
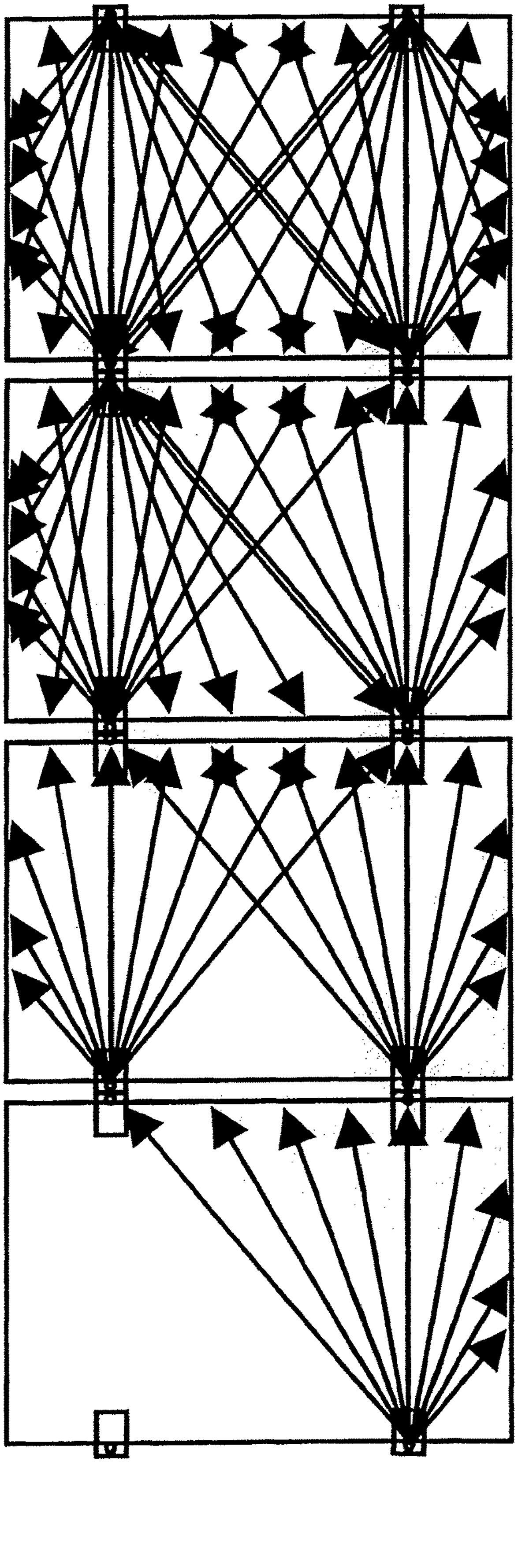

In contrast, compare the overlap in beams between FIG. 17C and FIG. 17G, and the void in FIG. 17G between the illuminated LEDs. The edgelit approach is thus very sensitive to both the height and width of the window span. To compensate, additional LEDs can be placed along the edge, assuming that the light can travel across the span with sufficient intensity. The prism approach, conversely, can be placed anywhere on the window span—near the edge, in the middle, etc., minimizing the number of LEDs needed, and therefore minimizing both the installation cost, and the cost of energy supplied to the LEDs.

The general direction of the rays in FIGS. 17F-17I go from left-to-right and right-to-left, with no rays within the window above or below 45° from the horizontal (prior to extraction). This limited angular diversity ultimately translates into a limited diversity of rays upon extraction using commonly available (and low cost) diffusing type films. Conversely, the angular diversity of rays within the approach shown in FIGS. 17B-17E provide a more widely viewable indicia when extracted via the same diffusing film.

As an example, consider a diffusing film of the prior art as shown in FIG. 23A, based on FIG. 1 of Kimura et al., U.S. Pat. No. 6,771,335. This film comprises resin particles 104 dispersed in a resin binder 106 with a top surface 108, both having similar refractive indices. The diffusing properties mainly result from the undulated surface profile since it is assumed, based on Kimura et al., that an incident ray of light is not deflected by the resin particles 104, (Kimura et al. provides in column 2, lines 11-13, that, "[f]urther, in the light diffusion sheet of the present invention, the difference between refractive indices of the binder resin and the resin particles is preferably 0.05 or less."). In FIG. 23B, there is a magnified section of FIG. 23A along with the geometric implications following Snell's Law. It shows that for a ray traveling within the plane of the window, striking the diffusing surface (e.g., n1 110 being equal to 1.51, the same as the window, for simplicity) at an angle, δ 112, it will be redirected into the air (n2 114 being equal to 1.0) at an angle, relative to the surface normal of the window, of φ 116 being equal to γ 118 plus β 120 which is equal to $\{\gamma + a \sin[(n1/n2)\sin(90-\delta-\gamma)]\}$, where γ 118 is the slope of the diffusing surface relative to the plane of the window.

The light coupled into the window can also be made to vary in time using a timing device connected to the LED, for example, by an adjustable shade on the optic or rotating the optic for example and over different areas of a window.

Another variable to consider is the intensity of the rays. FIG. 24A shows the intensity distribution of light rays exiting a lambertian LED (Lumileds Luxeon III). The highest intensity is at 0° (perpendicular to the LED die), and it then falls off in a ~ cosine distribution. For this example, the distribution from 0° through 90° has been approximated by that indicated in FIG. 24C, which is identified as θ1 in FIG. 5. Similarly, the intensity distribution of light rays exiting from a side emitting LED (also Lumileds Luxeon III), is shown in FIG. 24B. As with the lambertian LED, 0° represents the angle perpendicular to the LED die. In this case, the peaks are near ±80° (hence the term side-emitter), and the distribution from −90° to 0° has been approximated by that indicated in FIG. 24C, except the angular displacement has been shifted to start at 0° to be consistent with ψ in FIG. 7A.

Figure 5:
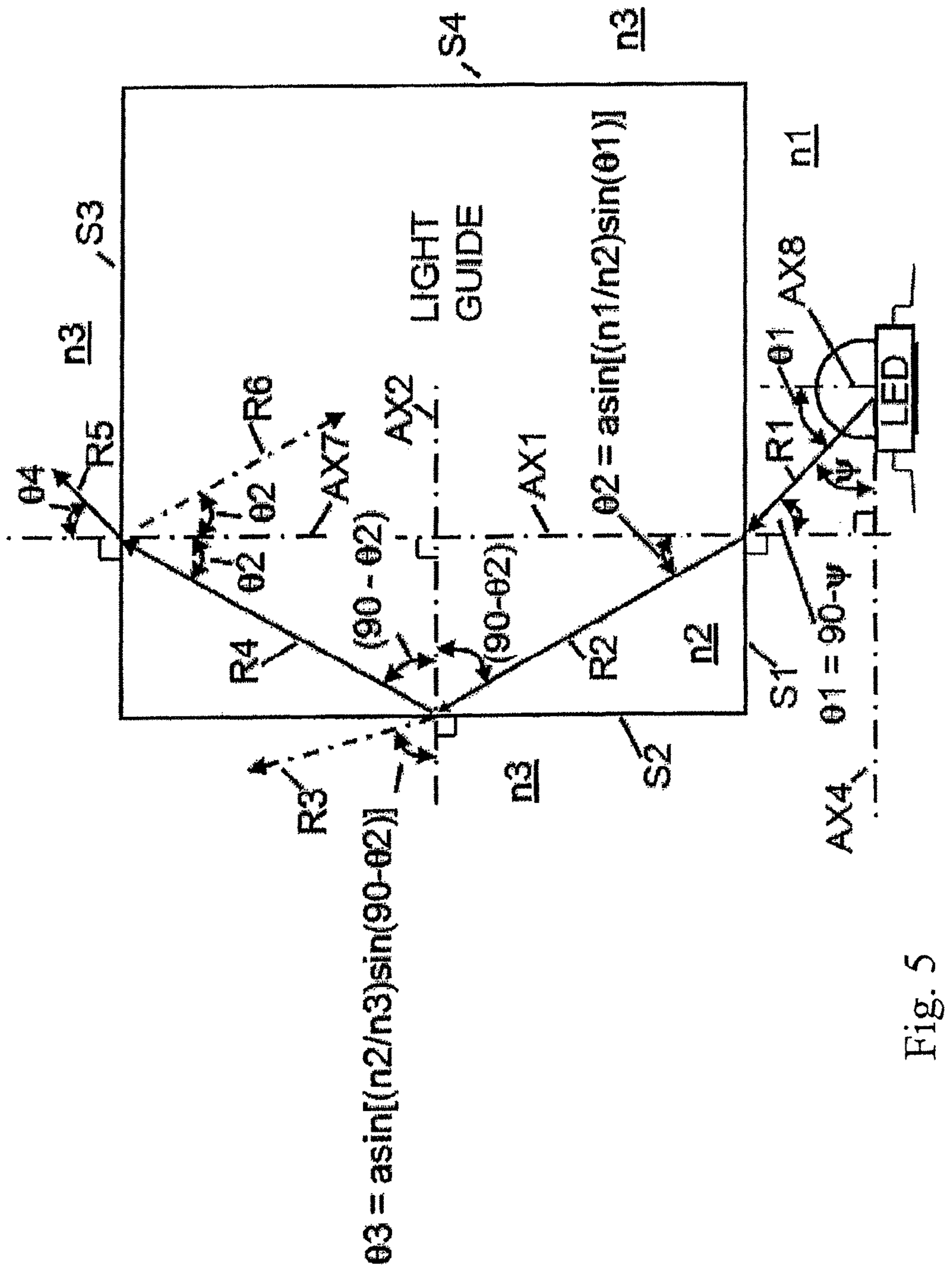
FIG. 5 shows equations used in analysis of traditional edge-lighting approach for a light guide, receiving light into its entrance surface S1 from a LED having a lambertian angular distribution.

Looking back to FIG. 23B, 8 represents (90−θ2) in both FIG. 5 and FIG. 7 (angle within the window, relative to axis AX2, at which the light ray is incident on surface S3, upon which the diffuser is affixed).

FIGS. 25A-1 and 25A-2 detail both the angle, φ (columns 5, 7, 9, . . . 21, 23), and intensity of the rays exiting into air (n1=1.0) from the diffuser (n=1.51) as a function of the incident angle, δ (column 3), and the slope, γ (columns 4, 6, 8, . . . 20, 22), of the diffuser exit surface.

FIG. 25A-1 is the solution for the lambertian LED with an air gap to an edgelit window (i.e., FIG. 5), and FIG. 25A-2 is the prism solution utilizing a side-emitting LED (i.e., FIG. 7).

Column 1 of FIGS. 25A-1 and 25A-2 indicates the normalized intensity profiles, shown in FIG. 24C, for both the lambertian and side-emitting LEDs, respectively. Recall that the angle δ in column 3 of FIGS. 25A-1 and 25A-2 represents the angle of the LED shown in FIG. 24C after propagating into the refractive media of the window; i.e., (90−θ2) in both FIGS. 5 and 7. Particularly noteworthy is the larger angles available with the prism approach as evidenced by Column 3.

FIG. 25B-1 shows that rays from the edgelit approach require a minimum 7.9° surface slope, γ, of the diffuser before light begins to emerge within 90° of normal. FIG. 25B-2 shows that rays from the prism approach require a minimum −39.1° surface slope, γ, of the diffuser before light begins to emerge.

Note that the ##TIR## entries indicate that for the specified incident ray angle, δ, in column 3, the ray cannot exit the diffuser film at the specified slope, γ, of the diffuser (it will reflect via total internal reflection).

The data in FIGS. 25A-1, 25A-2, 25B-1, and 25B-2 has been plotted in FIG. 26A for the edgelit approach and FIG. 26B for the prism approach. It is especially noteworthy, and quite unexpected, that the exit angles out of the diffuser for the prism approach are closer to the surface normal than that of traditional edge lighting approach. In fact, this off-normal direction has required the use of an additional prismatic film in order to straighten-out the exiting rays (Cf. U.S. Pat. No. 5,126,882).

Note that in FIG. 26A there is substantial energy outside of φ=90°. Angles beyond 90° will be redirected back towards the plane of window surface. Depending upon the system, the rays may travel through the film and re-emerge either out of the film again, out the opposing side of the window, or back into the collection of rays that TIR through the window. Conversely, in FIG. 26B, no energy is outside of φ=90°, which was quite unexpected.

Therefore, with the prism coupling approach, whether circular, toroidal, or other geometric form, the light introduced into the window will be tilted closer to the normal of the window than is possible with edge lighting, thus able to exit via a simple diffusing element (e.g., a translucent window graphic film) closer to normal.

As a practical example, consider an illuminated graphic on a mall storefront window located on the second floor of a three floor mall having a center atrium. It is desirable to have the graphic viewable from shops on all three floors. However, FIGS. 17I and 26A demonstrate that the edgelit approach has less angular diversity within the window than the prism approach shown in FIGS. 17E and 26B.

Other uses for the invention besides in a window display might be in an easel, a posted restaurant menu board, a table top, architectural windows, mailboxes, etc., wherever there may be a transparent substrate, an LED and the appropriate coupling arrangement to bring the light from the LED through the prism into the window or substrate.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. An illumination device comprising:

a transparent substrate having a first surface and a second opposing surface;

a member substrate having a first side, a second opposing side, a first indicium portion and a second indicium portion, both the first and second indicium portions formed on the second side, the first indicium portion and second indicium portion being connected differently to the transparent substrate;

a first light source configured to at least periodically couple light into the transparent substrate, such light being trapped by total internal reflection (TIR) between the first surface and the second surface of the transparent substrate;

the first indicium portion optically contacting the first surface of the transparent substrate, including through any intervening refractive media, to defeat the TIR and release light trapped in the transparent substrate and illuminate the first indicium portion and make it detectable from a point external to both the member substrate and the transparent substrate, and at least one preconfigured optical isolation structure formed between the second indicium portion and the transparent substrate to reduce or eliminate the release of TIR light rays from the transparent substrate that illuminates the second indicium portion before illuminating the first indicium portion, the second indicium portion being detectable from the point external to both the member substrate and the transparent substrate when illuminated by a second light source external to both the member substrate and the transparent substrate.

2. The illumination device of claim 1, further comprising at least one TIR defeating feature, such TIR defeating feature being one or more surface features selected from at least one of a cling film, an electret film, a film connected to a front surface of the transparent substrate using electrostatic forces, and a film connected to the front surface of the transparent substrate using suction forces distributed across a surface of the film in at least one of a periodic and an aperiodic fashion.

3. The illumination device of claim 1, wherein the first indicium portion and the second indicium portion include one or more materials from at least one of an ink material, a dye material, a fluorescent material, a scattering material, a diffusing material, a lens shaped material, a material with a matte finished surface, a material with embedded voids, and a grazing incidence hologram.

4. The illumination device of claim 1, wherein the member substrate is held to the transparent substrate, at least in part, by one or more of mechanical fastening, chemical bonding, and forces induced by at least one of gravity, magnetism, surface tension, and suction.

5. The illumination device of claim 1 wherein the member substrate comprises a polyester substrate wherein dye sublimation printing is used to imprint upon the polyester substrate.

6. The illumination device of claim 1 wherein the at least one preconfigured optical isolation structure comprises one or more air gaps formed by one or more preformed surface deformations of the member substrate such that the first indicium portion and the second indicium portion reside on the same side of the member substrate.

7. The illumination device of claim 1 wherein the member substrate comprises:

a first member substrate and a second member substrate, each having opposing first and second surfaces, wherein:

a first surface of the first member substrate is configured to optically contact the first surface of the transparent substrate, including through any intervening refractive media, a second surface of the first member substrate, configured as a first indicium portion surface, is imparted with selectively placed ink dots, a first surface of the second member substrate is in contact with the first indicium portion, and a second surface of the second member substrate, configured as a second indicium portion surface, is imparted with the second indicium portion, wherein the at least one preconfigured optical isolation structure comprises one or more air gaps that are formed adjacent the selectively placed ink dots of first indicium portion.

8. The illumination device of claim 1 wherein the at least one preconfigured optical isolation structure comprises one or more air gaps that are formed adjacent distributed adhesive elements on the first side of the member substrate.

9. The illumination device of claim 1, wherein the first light source is configured to at least periodically flash on-and-off at one or more frequencies higher than can be perceived by the human eye, communicating to one or more devices external to the illumination device.

10. The illumination device of claim 1, wherein the first light source emits light having one or more wavelengths inclusively from ultraviolet to infrared, the first light source comprising one or more of LEDs, laser diodes, optical fibers, fluorescent materials, and photoluminescent materials.

11. The illumination device of claim 1, wherein a graphical content of the first indicium portion is the same as a graphical content of the second indicium portion.

12. The illumination device of claim 1, wherein at least one characteristic of a graphical content of the first indicium portion is the different from characteristics of a graphical content of the second indicium portion.

13. The illumination device of claim 1, further including a third indicium portion defeating TIR including one or more of an ink material, a dye material, a fluorescent material, a scattering material, a diffusing material, a lens shaped material, a material with a matte finished surface, a material with embedded voids, and a grazing incidence hologram.

14. The illumination device of claim 1, further comprising at least one TIR defeating feature located on the first side of the member substrate, the at least one TIR defeating feature comprises at least one of surface features on the first side of the member substrate and a couplant.

15. The illumination device of claim 14, wherein the at least one TIR defeating feature is a couplant selected from at least one of the first indicium portion, adhesive, adhesive dots, selectively placed adhesive dots, water, gel, grease, petroleum jelly, double-stick tape, sealant, oil, and coupling fluid.

16. The illumination device of claim 1, wherein the at least one preconfigured optical isolation structure comprises an air gap.

17. The illumination device of claim 16, wherein the air gap is at least one of air gaps found at a roughened surface, air gaps defining surface deformations, air gaps between spacer elements, air gaps between selectively placed adhesive dots, air gaps between microstructures in microstructured adhesives, air gaps between selectively placed ink dots, air gaps between an areal density of distributed adhesive, air gaps between an areal density of distributed coupling materials, air gaps within a foamed material, and air gaps between walls in walled air cavities.

18. The illumination device of claim 1 wherein the at least one preconfigured optical isolation structure comprises one or more air gaps between walls in walled air cavities and are configured to form one or more apertures enabling imprinting of the first indicium portion through the one or more apertures on the second side of the member substrate.

19. The illumination device of claim 18 wherein the first indicium portion is in direct physical contact with the second indicium portion.

20. The illumination device of claim 1, configured for wireless communications.

21. The illumination device of claim 20, comprising a communicatively coupled remote device adapted for wireless communications, wherein the illumination device is configured to receive one or more commands from the remote device using wireless communications.

22. The illumination device of claim 21, wherein the remote device is further configured to control one or more of other sources of light and sound.

23. A system comprising:

a transparent substrate having a first refractive index and within which light from a first light source is at least periodically coupled into and trapped by total internal reflection (TIR) between a first surface and a second opposing surface of the transparent substrate; and a member having a section imparted with a first indicium portion and a second indicium portion, each providing different illumination properties when the member is connected to the first surface of the transparent substrate, the section of the member comprising a member substrate including a first side and an second opposing side and at least one first indicium portion surface and at least one second indicium portion surface, wherein the first indicium portion is imparted on the at least one first indicium portion surface connected to one of the first side and the second opposing side of the member substrate, wherein the first indicium portion is also connected through refractive media and is configured to optically contact the first surface of the transparent substrate, an optical contact between the first indicium portion and the first surface of the transparent substrate defeating the TIR and releasing at least some trapped light, thereby illuminating the first indicium portion such that the first indicium portion can be detected from a point external to both the member and the transparent substrate, and the second indicium portion is imparted on the at least one second indicium portion surface connected to the opposing second side of the member substrate, a connection between the at least one second indicium portion and the opposing second side of the member substrate including at least one preconfigured optical isolation structure, each of the at least one preconfigured optical isolation structures including a medium of a refractive index lower than the first refractive index and configured to minimize released light from first illuminating the second indicium portion instead of first illuminating the first indicium portion, and wherein the second indicium portion can be detected from a same point when illuminated by light cast from a second light source external to both the member and the transparent substrate.

24. The system of claim 23, further comprising at least one computer, at least one communications link, and at least one light source controller, the at least one communications link configured to connect the at least one computer to the at least one light source controller to control an intensity versus time profile of light from a first source of light that is coupled into the transparent substrate.

25. An illumination system comprising:

a transparent substrate within which light from a first source of light is at least periodically coupled-into and then trapped by total internal reflection (TIR) between a first surface and a second opposing surface of the transparent substrate;

a mesh or netting configured with walled apertures, the mesh or netting having a first side and a second opposing side, wherein the first side of the mesh or netting is connected to the first surface of the transparent substrate;

a first indicium portion connected through refractive media and configured to optically contact the first surface of the transparent medium to defeat the TIR and release at least some trapped light, thereby illuminating the first indicium portion which can be detected from a point external to both the mesh or netting and the transparent substrate; and a second indicium portion connected to the opposing second side of the mesh or netting and configured for detection from the same point when illuminated thereon by light cast from a second source of light external to both the mesh or netting and the transparent substrate.

26. The illumination system of claim 25 further comprising:

at least one computer and at least one communications link, the at least one communications link configured to connect the at least one computer to the first source of light such that the at least one computer can control light emissions from the first source of light.

27. A method of retrofitting a window pane to act as a light guide and cause it to emit illuminated indicium, comprising:

installing a coupling optic on one face of a window to couple light from a light source into the window such that at least some of the light travels through the window via total internal reflection (TIR), and optically coupling to a face of the window a material comprising TIR defeating properties, wherein light travelling through the window via TIR is emitted in the form of the illuminated indicia via the material comprising TIR defeating properties.

* * * * *